(12) United States Patent
Okubo et al.

(10) Patent No.: US 8,898,541 B2
(45) Date of Patent: Nov. 25, 2014

(54) STORAGE CONTROLLER, STORAGE DEVICE, INFORMATION PROCESSING SYSTEM, AND STORAGE CONTROLLING METHOD

(71) Applicant: Sony Corporation, Tokyo (JP)

(72) Inventors: Hideaki Okubo, Saitama (JP); Keiichi Tsutsui, Kanagawa (JP); Kenichi Nakanishi, Tokyo (JP); Yasushi Fujinami, Tokyo (JP); Makiko Yamamoto, Tokyo (JP); Naohiro Adachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 13/675,768

(22) Filed: Nov. 13, 2012

(65) Prior Publication Data

US 2013/0139030 A1    May 30, 2013

(30) Foreign Application Priority Data

Nov. 30, 2011  (JP) ................... 2011-261091
Dec. 20, 2011  (JP) ................... 2011-277777

(51) Int. Cl.
*G11C 29/00* (2006.01)

(52) U.S. Cl.
USPC ............ 714/763; 714/755; 714/797

(58) Field of Classification Search
CPC ................ G06F 11/1076; G06F 11/1008
USPC .............. 714/763, 755, 797, 758, 769, 761
See application file for complete search history.

(56) References Cited

U.S. PATENT DOCUMENTS 5,321,703 A * 6/1994 Weng ........................ 714/797
5,781,565 A * 7/1998 Sako et al. .................. 714/755

FOREIGN PATENT DOCUMENTS

JP    2011-039585    2/2011
JP    2011-081776    4/2011

\* cited by examiner

*Primary Examiner* — Fritz Alphonse
(74) *Attorney, Agent, or Firm* — Rader, Fishman & Grauer PLLC

(57) ABSTRACT

A storage controller includes an error correcting code managing portion, an address managing portion and an error correcting portion. The error correcting code managing portion manages a correspondence relationship between predetermined plural pieces of unit data, and a second error code corresponding to the plural pieces of unit data every entry when plural pieces of unit data and a second error correcting code are stored in a storage portion. The address managing portion manages a correspondence relationship between logical addresses and the entries in the error correcting code managing portion. The error correcting portion acquires the entry in the error correction managing portion corresponding to the logical address as an object of read from the address managing portion, and carries out error correction based on the plural pieces of unit data managed in the entry concerned, and the second error correcting code.

20 Claims, 38 Drawing Sheets

FIG. 4

| | | | | | 341 |
|---|---|---|---|---|---|
| LOGICAL ADDRESS | PHYSICAL ADDRESS | DATA FLAG | SECOND ECC FLAG | SECOND ECC INDEX | |
| 0x00000000 | 0x00000000 | True | False | — | |
| 0x00000001 | 0x00000003 | False | False | — | |
| ... | ... | ... | ... | ... | |
| $x_j$ | $y_j$ | True | False | — | |
| $x_{i0}$ | $y_{i0}$ | True | True | $z_i$ | 710 |
| $x_{i1}$ | $y_{i1}$ | True | True | $z_i$ | 711 |
| $x_{i2}$ | $y_{i2}$ | True | True | $z_i$ | 712 |
| $x_{i3}$ | $y_{i3}$ | True | True | $z_i$ | 713 |

FIG. 5

| | | |
|---|---|---|
| SECOND ECC INDEX | 000 | ⎫ 342 |
| THE NUMBER OF DATA | 0 | |
| SECOND ECC PHYSICAL ADDRESS | – | |
| PHYSICAL ADDRESS OF 0-TH DATA | – | ⎬ ENTRY |
| PHYSICAL ADDRESS OF FIRST DATA | – | |
| PHYSICAL ADDRESS OF SECOND DATA | – | |
| PHYSICAL ADDRESS OF THIRD DATA | – | ⎭ |
| SECOND ECC INDEX | 001 | |
| THE NUMBER OF DATA | 2 | |
| SECOND ECC PHYSICAL ADDRESS | $e_1$ | |
| PHYSICAL ADDRESS OF 0-TH DATA | $y_{00}$ | |
| PHYSICAL ADDRESS OF FIRST DATA | $y_{10}$ | |
| PHYSICAL ADDRESS OF SECOND DATA | – | |
| PHYSICAL ADDRESS OF THIRD DATA | – | |
| ⋮ | | |
| SECOND ECC INDEX | $z_i$ | |
| THE NUMBER OF DATA | 4 | |
| SECOND ECC PHYSICAL ADDRESS | $e_i$ | |
| PHYSICAL ADDRESS OF 0-TH DATA | $y_{i0}$ | |
| PHYSICAL ADDRESS OF FIRST DATA | $y_{i1}$ | |
| PHYSICAL ADDRESS OF SECOND DATA | $y_{i2}$ | |
| PHYSICAL ADDRESS OF THIRD DATA | $y_{i3}$ | |
| ⋮ | | |

FIG. 9

| | LOGICAL ADDRESS | PHYSICAL ADDRESS | DATA FLAG | SECOND ECC FLAG | SECOND ECC INDEX |
|---|---|---|---|---|---|
| | 0x00000000 | 0x00000000 | True | False | — |
| | 0x00000001 | 0x00000003 | False | False | — |
| | ... | | | | |
| 720 — $x_j$ | | $y_{j0}$ | True | False | — |
| 721 — $x_j+1$ | | $y_{j1}$ | False | False | — |
| 722 — $x_j+2$ | | $y_{j2}$ | True | False | — |
| 723 — $x_j+3$ | | $y_{j3}$ | True | False | — |
| 724 — $x_j+4$ | | $y_{j4}$ | False | False | — |
| | ... | | | | |

| LOGICAL ADDRESS | PHYSICAL ADDRESS | DATA FLAG | SECOND ECC FLAG | SECOND ECC INDEX |
|---|---|---|---|---|
| 0x00000000 | 0x00000000 | True | False | — |
| 0x00000001 | 0x00000003 | False | False | — |
| ... | | | | |
| $x_j$ | $y_{j0}$ | True | True | $z_{j0}$ |
| $x_j+1$ | $y_{j1}$ | False | True | $z_{j0}$ |
| $x_j+2$ | $y_{j2}$ | True | True | $z_{j0}$ |
| $x_j+3$ | $y_{j3}$ | True | True | $z_{j0}$ |
| $x_j+4$ | $y_{j4}$ | False | True | $z_{j4}$ |
| ... | | | | |

| ⋮ | |
|---|---|
| SECOND ECC INDEX | $z_{j0}$ |
| THE NUMBER OF DATA | 0 |
| SECOND ECC PHYSICAL ADDRESS | $e_{j0}$ |
| PHYSICAL ADDRESS OF 0-TH DATA | — |
| PHYSICAL ADDRESS OF FIRST DATA | — |
| PHYSICAL ADDRESS OF SECOND DATA | — |
| PHYSICAL ADDRESS OF THIRD DATA | — |
| ⋮ | |
| SECOND ECC INDEX | $z_{j4}$ |
| THE NUMBER OF DATA | 0 |
| SECOND ECC PHYSICAL ADDRESS | $e_{j4}$ |
| PHYSICAL ADDRESS OF 0-TH DATA | — |
| PHYSICAL ADDRESS OF FIRST DATA | — |
| PHYSICAL ADDRESS OF SECOND DATA | — |
| PHYSICAL ADDRESS OF THIRD DATA | — |
| ⋮ | |

| | |
|---|---|
| ⋮ | |
| SECOND ECC INDEX | $z_{j0}$ |
| THE NUMBER OF DATA | 4 |
| SECOND ECC PHYSICAL ADDRESS | $e_{j0}$ |
| PHYSICAL ADDRESS OF 0-TH DATA | $y_{j0}$ |
| PHYSICAL ADDRESS OF FIRST DATA | $y_{j1}$ |
| PHYSICAL ADDRESS OF SECOND DATA | $y_{j2}$ |
| PHYSICAL ADDRESS OF THIRD DATA | $y_{j3}$ |
| ⋮ | |
| SECOND ECC INDEX | $z_{j4}$ |
| THE NUMBER OF DATA | 1 |
| SECOND ECC PHYSICAL ADDRESS | $e_{j4}$ |
| PHYSICAL ADDRESS OF 0-TH DATA | $y_{j4}$ |
| PHYSICAL ADDRESS OF FIRST DATA | — |
| PHYSICAL ADDRESS OF SECOND DATA | — |
| PHYSICAL ADDRESS OF THIRD DATA | — |
| ⋮ | |

FIG. 15

| LOGICAL ADDRESS | PHYSICAL ADDRESS | DATA FLAG | SECOND ECC FLAG | SECOND ECC INDEX |
|---|---|---|---|---|
| 0x00000000 | 0x00000000 | True | False | — |
| 0x00000001 | 0x00000003 | False | False | — |
| ... | | | | |
| $x_j$ | $y_{j0}$ | True | False | — |
| $x_j+1$ | $y_{j1}$ | False | False | — |
| $x_j+2$ | $y_{j2}$ | True | False | — |
| $x_j+3$ | $y_{j3}$ | True | True | $z_{j0}$ |
| $x_j+4$ | $y_{j4}$ | False | True | $z_{j4}$ |
| ... | | | | |

| | |
|---|---|
| ⋮ | |
| SECOND ECC INDEX | $z_{j4}$ |
| THE NUMBER OF DATA | 4 |
| SECOND ECC PHYSICAL ADDRESS | e |
| INTRA-SECOND ECC PHYSICAL ADDRESS OFFSET | i |
| PHYSICAL ADDRESS OF 0-TH DATA | $y_0$ |
| PHYSICAL ADDRESS OF FIRST DATA | $y_1$ |
| PHYSICAL ADDRESS OF SECOND DATA | $y_2$ |
| PHYSICAL ADDRESS OF THIRD DATA | $y_3$ |
| ⋮ | |

FIG.17

| LOGICAL ADDRESS | PHYSICAL ADDRESS | DATA FLAG | SECOND ECC FLAG | SECOND ECC INDEX |
|---|---|---|---|---|
| 0x00000000 | 0x00000000 | True | False | — |
| 0x00000001 | 0x00000003 | False | False | — |
| ... | ... | ... | ... | ... |
| $x_h$ | $y_{h0}$ | True | True | $z_{h0}$ |
| ... | ... | ... | ... | ... |
| $x_j$ | $y_{j0}$ | True | False | — |
| $x_j+1$ | $y_{j1}$ | True | False | — |
| $x_j+2$ | $y_{j2}$ | True | False | — |
| $x_j+3$ | $y_{j3}$ | True | False | — |
| $x_j+4$ | $y_{j4}$ | True | False | — |
| ... | ... | ... | ... | ... |

| ⋮ | |
|---|---|
| SECOND ECC INDEX | $z_{j0}$ |
| THE NUMBER OF DATA | 0 |
| SECOND ECC PHYSICAL ADDRESS | $e_{j0}$ |
| PHYSICAL ADDRESS OF 0-TH DATA | — |
| PHYSICAL ADDRESS OF FIRST DATA | — |
| PHYSICAL ADDRESS OF SECOND DATA | — |
| PHYSICAL ADDRESS OF THIRD DATA | — |
| ⋮ | |
| SECOND ECC INDEX | $z_{h0}$ |
| THE NUMBER OF DATA | 1 |
| SECOND ECC PHYSICAL ADDRESS | $e_{h0}$ |
| PHYSICAL ADDRESS OF 0-TH DATA | $y_{h0}$ |
| PHYSICAL ADDRESS OF FIRST DATA | — |
| PHYSICAL ADDRESS OF SECOND DATA | — |
| PHYSICAL ADDRESS OF THIRD DATA | — |
| ⋮ | |

FIG.19

| LOGICAL ADDRESS | PHYSICAL ADDRESS | DATA FLAG | SECOND ECC FLAG | SECOND ECC INDEX |
|---|---|---|---|---|
| 0x00000000 | 0x00000000 | True | False | — |
| 0x00000001 | 0x00000003 | False | False | — |
| ... | | | | |
| $x_h$ | $y_{h0}$ | True | True | $z_{h0}$ |
| ... | | | | |
| $x_j$ | $y_{j0}$ | True | True | $z_{j0}$ |
| $x_j+1$ | $y_{j1}$ | True | True | $z_{j0}$ |
| $x_j+2$ | $y_{j2}$ | True | True | $z_{j0}$ |
| $x_j+3$ | $y_{j3}$ | True | True | $z_{j0}$ |
| $x_j+4$ | $y_{j4}$ | True | True | $z_{h0}$ |
| ... | | | | |

| | |
|---|---|
| ⋮ | |
| SECOND ECC INDEX | $z_{j0}$ |
| THE NUMBER OF DATA | 4 |
| SECOND ECC PHYSICAL ADDRESS | $e_{j0}$ |
| PHYSICAL ADDRESS OF 0-TH DATA | $y_{j0}$ |
| PHYSICAL ADDRESS OF FIRST DATA | $y_{j1}$ |
| PHYSICAL ADDRESS OF SECOND DATA | $y_{j2}$ |
| PHYSICAL ADDRESS OF THIRD DATA | $y_{j3}$ |
| ⋮ | |
| SECOND ECC INDEX | $z_{h0}$ |
| THE NUMBER OF DATA | 2 |
| SECOND ECC PHYSICAL ADDRESS | $e_{h0}$ |
| PHYSICAL ADDRESS OF 0-TH DATA | $y_{h0}$ |
| PHYSICAL ADDRESS OF FIRST DATA | $y_{j4}$ |
| PHYSICAL ADDRESS OF SECOND DATA | — |
| PHYSICAL ADDRESS OF THIRD DATA | — |
| ⋮ | |

FIG.21

| LOGICAL ADDRESS | PHYSICAL ADDRESS | DATA FLAG | FINAL ACCESS TIME | SECOND ECC FLAG | SECOND ECC INDEX |
|---|---|---|---|---|---|
| 0x00000000 | 0x00000000 | True | $t_0$ | False | — |
| 0x00000001 | 0x00000003 | False | — | False | — |
| ... | ... | ... | ... | ... | ... |
| $x_j$ | $y_j$ | True | $t_j$ | False | — |
| ... | ... | ... | ... | ... | ... |
| $x_{i0}$ | $y_{i0}$ | True | $t_{i0}$ | True | $z_i$ |
| ... | ... | ... | ... | ... | ... |
| $x_{i1}$ | $y_{i1}$ | True | $t_{i1}$ | True | $z_i$ |
| ... | ... | ... | ... | ... | ... |
| $x_{i2}$ | $y_{i2}$ | True | $t_{i2}$ | True | $z_i$ |
| ... | ... | ... | ... | ... | ... |
| $x_{i3}$ | $y_{i3}$ | True | $t_{i3}$ | True | $z_i$ |

| LOGICAL ADDRESS | PHYSICAL ADDRESS | INTRA-PHYSICAL ADDRESS OFFSET | DATA FLAG | SECOND ECC FLAG | SECOND ECC INDEX |
|---|---|---|---|---|---|
| 0x00000000 | 0x00000000 | $offset_0$ | True | False | — |
| 0x00000001 | 0x00000003 | $offset_1$ | False | False | — |
| ... | ... | ... | ... | ... | ... |
| $x_j$ | $y_j$ | $offset_j$ | True | False | — |
| ... | ... | ... | ... | ... | ... |
| $x_{i0}$ | $y_{i0}$ | $offset_{i0}$ | True | True | $z_i$ |
| ... | ... | ... | ... | ... | ... |
| $x_{i1}$ | $y_{i1}$ | $offset_{i1}$ | True | True | $z_i$ |
| ... | ... | ... | ... | ... | ... |
| $x_{i2}$ | $y_{i2}$ | $offset_{i2}$ | True | True | $z_i$ |
| ... | ... | ... | ... | ... | ... |
| $x_{i3}$ | $y_{i3}$ | $offset_{i3}$ | True | True | $z_i$ |

| | |
|---|---|
| SECOND ECC INDEX | 000 |
| THE NUMBER OF DATA | 0 |
| SECOND ECC PHYSICAL ADDRESS | $e_i$ |
| PHYSICAL ADDRESS OF 0-TH DATA | — |
| INTRA-PHYSICAL ADDRESS OFFSET OF 0-TH DATA | — |
| PHYSICAL ADDRESS OF FIRST DATA | — |
| INTRA-PHYSICAL ADDRESS OFFSET OF FIRST DATA | — |
| PHYSICAL ADDRESS OF SECOND DATA | — |
| INTRA-PHYSICAL ADDRESS OFFSET OF SECOND DATA | — |
| PHYSICAL ADDRESS OF THIRD DATA | — |
| INTRA-PHYSICAL ADDRESS OFFSET OF THIRD DATA | — |
| ⋮ | |
| SECOND ECC INDEX | $z_i$ |
| THE NUMBER OF DATA | 4 |
| SECOND ECC PHYSICAL ADDRESS | $e_i$ |
| PHYSICAL ADDRESS OF 0-TH DATA | $y_{i0}$ |
| INTRA-PHYSICAL ADDRESS OFFSET OF 0-TH DATA | $offset_{i0}$ |
| PHYSICAL ADDRESS OF FIRST DATA | $y_{i1}$ |
| INTRA-PHYSICAL ADDRESS OFFSET OF FIRST DATA | $offset_{i1}$ |
| PHYSICAL ADDRESS OF SECOND DATA | $y_{i2}$ |
| INTRA-PHYSICAL ADDRESS OFFSET OF SECOND DATA | $offset_{i2}$ |
| PHYSICAL ADDRESS OF THIRD DATA | $y_{i3}$ |
| INTRA-PHYSICAL ADDRESS OFFSET OF THIRD DATA | $offset_{i3}$ |
| ⋮ | |

| LOGICAL ADDRESS | PHYSICAL ADDRESS | SECOND ECC FLAG | OLD PHYSICAL ADDRESS |
|---|---|---|---|
| 0000 | 0002 | true | null |
| 0001 | 0001 | true | null |
| 0002 | 4000 | true | 0000 |
| ⋮ | ⋮ | ⋮ | ⋮ |

FIG. 34

| LOGICAL ADDRESS | PHYSICAL ADDRESS | DATA FLAG | SECOND ECC FLAG | SECOND ECC INDEX |
|---|---|---|---|---|
| 0x00000000 | 0x00000000 | True | False | — |
| 0x00000001 | 0x00000003 | False | False | — |
| $x_j$ | $y_j$ | True | False | — |
| $x_{i0}$ | $y_{i0}$ | True | True | $z_i$ |
| $x_{i1}$ | $y_{i1}$ | True | True | $z_i$ |
| $x_{i2}$ | $y_{i2}$ | True | True | $z_i$ |
| $x_{i3}$ | $y_{i3}$ | True | True | $z_i$ |

522

710 711 712 713

STORAGE CONTROLLER, STORAGE DEVICE, INFORMATION PROCESSING SYSTEM, AND STORAGE CONTROLLING METHOD

BACKGROUND

The present disclosure relates to a storage controller, a storage device, an information processing system, and a storage controlling method. More particularly, the present disclosure relates to a storage controller which is capable of carrying out error correction based on an error correcting code, a storage device, an information processing system, and a storage controlling method.

When a memory is used, for the purpose of detecting whether or not an error is generated in data stored in the memory and correcting the error when the error is generated in the data stored in the memory, an Error Correcting Code (ECC) is added to the data in some cases. In particular, the ECC is generally used in a non-volatile memory such as a Not AND (NAND) flash memory. Thus, the ECC is added every data unit previously determined and in this state, the data is recorded. As a result, data holding characteristics are reinforced. For example, there is proposed a non-volatile memory system in which for the data recorded in increments of words in a data area, an ECC is stored in an ECC area. This non-volatile memory system, for example, is described in Japanese Patent Laid-Open No. 2011-039585.

SUMMARY

In the related art described in Japanese Patent Laid-Open No. 2011-039585, the ECC is generated for data in which physical addresses continue. However, when a host computer specifies data for which the holding characteristics are desired to be reinforced based on logical address, the data is not necessarily recorded in areas of the non-volatile memory which are continuous on the physical address space corresponding to the logical addresses. For this reason, it is necessary to execute a reinforcing command for the holding characteristics after the data for which the holding characteristics are desired to be reinforced has been copied to the continuous areas in the physical address space. That is to say, it is feared that the performance for the memory system is reduced by the overhead due to the copy.

With the related art described in Japanese Patent Laid-Open No. 2011-081776, by using two kinds of error correcting codes, long-term holding characteristics are improved, and an influence by increasing of the error correcting code is suppressed. In such related arts, it is necessary that when a change is generated only in part of the data becoming an object of the error correcting code, the error correcting code is recalculated after the entire data becoming the object of the error correcting code has been read out. In particular, when plural kinds of error correcting codes are provided, since the data becoming the object of the error correcting code becomes large, a time necessary for the reading-out of the data, and the recalculation of the error correcting code becomes long. Therefore, repeating the recalculation of the error correcting code whenever part of the data is updated becomes a factor by which the remarkable performance reduction is caused and thus is distant.

The present disclosure has been made in order to solve the problems described above, and it is therefore desirable to reinforce holding characteristics of data without being aware of a disposition on a physical address space.

In order to attain the desire described above, according to an embodiment of the present disclosure, there is provided a storage controller including: an error correcting code managing portion configured to manage a correspondence relationship between predetermined plural pieces of unit data, and a second error code corresponding to the predetermined plural pieces of unit data every entry when plural pieces of unit data are stored in a storage portion with data and a first error correcting code for the data as unit data and a second error correcting code for the predetermined plural pieces of unit data is stored in the storage portion so as to correspond to the predetermined plural pieces of unit data in the plural pieces of unit data; an address managing portion configured to manage a correspondence relationship between logical addresses and the entries in the error correcting code managing portion; and an error correcting portion configured to acquire the entry in the error correction managing portion corresponding to the logical address as an object of read from the address managing portion, and carry out error correction based on the predetermined plural pieces of unit data managed in the entry concerned, and the second error correcting code.

As a result, there is offered an operation such that the error correction is carried out with the second error correcting code corresponding to arbitrary plural pieces of unit data on the physical address space.

Preferably, the predetermined plural pieces of unit data may be stored in discontinuous physical addresses in the storage portion.

As a result, there is offered an operation such that the error correction is carried out with the second error correcting code corresponding to the plural pieces of unit data stored in the discontinuous physical addresses.

Preferably, the address managing portion may manage an error correction flag representing whether or not the second error correcting code corresponding to the logical addresses is stored, and the error correcting portion may carry out the error correction only when the error correction code flag represents an effect that the second error correcting code is stored.

As a result, there is offered an operation such that useless error correcting processing is skipped by referring to the error correcting code.

Preferably, the error correcting code managing portion may regulate order of coupling the predetermined plural pieces of unit data; and the error correcting portion may couple the predetermined plural pieces of unit data in accordance with the coupling order, thereby carrying out the error correction.

As a result, there is offered an operation such that the error correction is carried out with the second error correcting code corresponding to the predetermined pieces of data into which arbitrary plural pieces of unit data on the physical address space are coupled in the arbitrary order.

Preferably, the error correcting code managing portion may hold the physical addresses, in the storage portion, of the second error correcting code corresponding to the predetermined plural pieces of unit data; and the error correcting portion may acquire the second error correcting code from the storage portion in accordance with the physical address of the second error correcting code.

As a result, there is offered an operation such that the error correction is carried out with the corresponding second error correcting code in accordance with the physical addresses of arbitrary plural pieces of unit data on the physical address space.

Preferably, the error correcting code managing portion may further hold an intra-physical address offset, in the storage portion, of the second error correcting code corresponding to the predetermined plural pieces of unit data; and the error correcting portion may acquire the second error correcting code from the storage portion in accordance with the physical addresses and the intra-physical address offset of the second error correcting code.

As a result, there is offered an operation such that the predetermined second error correcting code is selected from the plural second error correcting codes (ECC) stored in the same physical addresses, thereby carrying out the error correction.

Preferably, the storage controller may further include: an error correcting code generating portion configured to generate the second error correcting code with respect to the data stored in a range of the logical addresses specified by a data holding characteristics reinforcement command when the data holding characteristics reinforcement command is received; and an entry managing portion configured to newly ensure an entry in which a correspondence relationship with the corresponding second error correcting code is held with respect to the data stored in the range of the logical addresses specified by the data holding characteristics reinforcement command in the error correcting code managing portion when the data holding characteristics reinforcement command is received, and register a correspondence relationship between the newly ensured entry and the specified logical addresses in the address managing portion.

As a result, there is offered an operation such that the data holding characteristics reinforcing processing is executed with the data holding characteristics reinforcement command as a trigger.

Preferably, the entry managing portion may release the entry in which the correspondence relationship with the corresponding second error correcting code is held with respect to the data stored in the range of the logical addresses specified in the data holding characteristics reinforcement releasing command in the error correcting code managing portion when the data holding characteristics reinforcement releasing command is received, and may delete a correspondence relationship between the released entry and the specified logical addresses in the address managing portion.

As a result, there is offered an operation such that the data holding characteristics reinforcement releasing processing is executed with the data holding characteristics reinforcement releasing command as a trigger.

Preferably, the error correcting code managing portion may hold the number of unit data corresponding to the second error correcting code every entry; and the entry managing portion may target at an entry in which the number of unit data represents zero when the entry is newly ensured.

As a result, there is offered an operation such that an empty entry in the error correcting code managing portion is utilized when the data holding characteristics are newly reinforced.

Preferably, the error correcting code managing portion may hold the number of unit data corresponding to the second error correcting code every entry; and the entry managing portion may target at an entry in which the number of unit data is smaller than a predetermined number when the entry is newly ensured.

As a result, there is offered an operation such that the entry in which there are one or more empty physical addresses of the object data in the error correcting code managing portion is utilized when the data holding characteristics are newly reinforced.

Preferably, the address managing portion may hold time finally accessed with respect to the logical addresses as final access time, in which the storage controller may further include: an error correcting code generating portion configured to generate the second error correcting code with respect to the data stored in the logical addresses when a predetermined period of time elapses from the final access time; and an entry managing portion configured to newly ensure an entry in which a correspondence relationship with the corresponding second error correcting code is held with respect to the data stored in the logical addresses in the error correcting code managing portion when a predetermined period of time elapses from the final access time, and register a correspondence relationship between the newly ensured entry and the specified logical addresses in the address managing portion.

As a result, there is offered an operation such that the data which is not rewritten for a long time is subjected to the data holding characteristics as reinforcement since it is feared that such data fades away.

Preferably, in this case, the entry managing portion may release the entry in which the correspondence relationship with the corresponding second error correcting code is held with respect to the data stored in the logical addresses in the error correcting code managing portion when the second error correcting code is stored for a lapse of predetermined period of time from the final access time, and may delete a correspondence relationship between the released entry and the specified logical addresses in the address managing portion.

As a result, there is offered an operation such that since the possibility that the data having the high access frequency fades away is low, the data holding characteristics reinforcement is released.

According to another embodiment of the present disclosure, there is provided a storage device including: a unit data storing portion configured to store therein plural pieces of unit data with data and a first error correcting code of the data as unit data; an error correcting code storing portion configured to store therein a second error correcting code of predetermined plural pieces of unit data so as to correspond to the predetermined plural pieces of unit data in the plural pieces of unit data; an error correcting code managing portion configured to manage a correspondence relationship between the predetermined plural pieces of unit data, and the second error correcting code corresponding to the predetermined plural pieces of unit data every entry; an address managing portion configured to manage a correspondence relationship between logical addresses and the entries in the error correcting code managing portion; and an error correcting portion configured to acquire the entry, in the error correcting code managing portion, corresponding to the logical address as an object of read from the address managing portion, thereby carrying out error correction based on the predetermined plural pieces of unit data managed in the entry concerned, and the second error correcting code.

As a result, there is offered an operation such that the error correction is carried out with the second error correcting code corresponding to arbitrary plural pieces of unit data on the physical address space in the storage device.

Preferably, each of the unit data storing portion and the error correcting code storing portion may be a non-volatile memory.

According to still another embodiment of the present disclosure, there is provided an information processing system including: a unit data storing portion configured to store therein plural pieces of unit data with data and a first error correcting code of the data as a unit; an error correcting code storing portion configured to store therein a second error correcting code of predetermined plural pieces of unit data so as to correspond to the predetermined plural pieces of unit data in the plural pieces of unit data; an error correcting code managing portion configured to manage a correspondence relationship between the predetermined plural pieces of unit data, and the second error correcting code corresponding to the predetermined plural pieces of unit data every entry; an address managing portion configured to manage a correspondence relationship between logical addresses and the entries in the error correcting code managing portion; an error correcting portion configured to acquire the entry, in the error correcting code managing portion, corresponding to the logical address as an object of read from the address managing portion, thereby carrying out error correction based on the predetermined plural pieces of unit data managed in the entry concerned, and the second error correcting code; and a host computer configured to issue a request to request an access to the unit data storing portion.

As a result, there is offered an operation such that the error correction is carried out with the second error correcting code corresponding to arbitrary plural pieces of unit data on a physical address space in the information processing system.

According to yet another embodiment of the present disclosure, there is provided a storage controlling method for use in a storage device including a unit data storing portion storing therein plural pieces of unit data with data and a first error correcting code of the data as a unit; an error correcting code storing portion storing therein a second error correcting code of the predetermined plural pieces of unit data so as to correspond to the predetermined plural pieces of unit data in the plural pieces of unit data; an error correcting code managing portion managing a correspondence relationship between the predetermined plural pieces of unit data, and the second error correcting code corresponding to the predetermined plural pieces of unit data every entry; and an address managing portion managing a correspondence relationship between logical addresses and the entries in the error correcting code managing portion, the storage controlling method including: acquiring the entry, in the error correcting code managing portion, corresponding to the logical address as an object of read from the address managing portion; and carrying out error correction based on the predetermined plural pieces of unit data managed in the acquired entry, and the second error correcting code.

With the related art described in Japanese Patent Laid-Open No. 2011-081776, by using the two kinds of error correcting codes, the long-term holding characteristics are improved, and the influence by increasing of the error correcting code is suppressed. In such related arts, it is necessary that when a change is generated only in part of the data becoming an object of the error correcting code, the error correcting code is recalculated after the entire data becoming the object of the error correcting code has been read out. In particular, when the plural kinds of error correcting codes are provided, since the data becoming the object of the error correcting code becomes large, a time necessary for the reading-out of the data, and the recalculation of the error correcting code becomes long. Therefore, repeating the recalculation of the error correcting code whenever part of the data is updated becomes a factor by which the remarkable performance reduction is caused and thus is distant.

In addition, it is further desirable to suppress recalculation of an error correcting code when a change is generated in part of data as an object of the error correcting code.

In order to attain the desire described above, according to a further embodiment of the present disclosure, there is provided a storage controller and a storage controlling method. The storage controller includes: an address managing portion configured to manage a correspondence relationship between logical addresses and physical addresses in a first or third storage area of a memory with respect to plural pieces of data when the plural pieces of data and an error correcting code corresponding to the plural pieces of data are stored in the first storage area of the memory, the error correction code is stored in a second storage area of the memory so as to correspond to each predetermined number of the plural pieces of data, and appendant data for any one of the plural pieces of data, and an error correcting code for the appendant data are stored in the third storage area of the memory; a control portion configured to append the appendant data and an error correcting code for the appendant data to the third storage area with data related to a write request as the appendant data without carrying out rewrite for the first storage area and the storage area when a physical address corresponding to a logical address related to the write request corresponds to the first storage area, and register the physical address in the third storage area to which the appendant data and the error correcting code for the appendant data are appended in the address managing portion; and an error correction processing portion configured to carry out error correction in the appendant data in the third storage area with the appendant data in the third storage area and the error correcting code for the appendant data when the physical address corresponding to the logical address related to a read request corresponds to the third storage area, and carry out error correction in the first storage area with the predetermined number of the plural pieces of data containing therein the data in the first storage area, and the error correcting code in the second storage area when the physical address corresponding to the logical address related to the read request does not correspond to the third storage area.

As a result, there is offered an operation such that the recalculation of the error correcting code is made unnecessary when part of the data becoming an object of the error correcting code is updated.

Preferably, the control portion may overwrite the appendant data to the first storage area before the appendance with respect to the appendant data at a predetermined timing; and the error correction processing portion may generate the error correcting code from a predetermined number of the plural pieces of data containing therein the data overwritten at the predetermined timing, and may store the error correcting code concerned in the second storage area.

According to an even further embodiment of the present disclosure, there is provided a storage device and a controlling method of the same. The storage device includes: a memory configured to store plural pieces of data and an error correcting code for the plural pieces of data in a first storage area, store the error correcting code in a second storage area so as to correspond to each predetermined number of the plural pieces of data, and store appendant data for any one of the plural pieces of data, and an error correcting code for the appendant data in a third storage area; an address managing portion configured to manage a correspondence relationship between logical addresses and physical addresses in the first or third storage area with respect to the plural pieces of data; a control portion configured to append the appendant data and an error correcting code for the appendant data to the third storage area with data related to a write request as the appendant data without carrying out rewrite for the first storage area and the storage area when a physical address corresponding to the logical address related to the write request corresponds to the first storage area, and register the physical address in the third storage area to which the appendant data and the error correcting code for the appendant data are appended in the address managing portion; and an error correction processing portion configured to carry out error correction in the appendant data in the third storage area with the appendant data in the third storage area and the error correcting code for the appendant data when the physical address corresponding to the logical address related to a read request corresponds to the third storage area, and carry out error correction in the first storage area with the predetermined number of the plural pieces of data containing therein the data in the first storage area, and the error correcting code in the second storage area when the physical address corresponding to the logical address related to the read request does not correspond to the third storage area.

As a result, there is offered an operation such that the recalculation of the error correcting code is made unnecessary when part of the data becoming the object of the error correcting code is updated in the memory.

Preferably, the memory may store the first storage area in a flash memory, and may storage the third storage area in a non-volatile RAM.

As a result, there is offered an operation such that the memory access is speeded up.

According to still further embodiment of the present disclosure, there is provided an information processing system and a controlling method of the same. The information processing system includes: a memory configured to store plural pieces of data and an error correcting code for the plural pieces of data in a first storage area, storing the error correcting code in a second storage area so as to correspond to each predetermined number of the plural pieces of data, and store appendant data for any one of the plural pieces of data, and an error correcting code for the appendant data in a third storage area; an address managing portion configured to manage a correspondence relationship between logical addresses and physical addresses in the first or third storage area with respect to the plural pieces of data; a control portion configured to append the appendant data and an error correcting code for the appendant data to the third storage area with data related to a write request as the appendant data without carrying out rewrite for the first storage area and the storage area when a physical address corresponding to the logical address related to the write request corresponds to the first storage area, and register the physical address in the third storage area to which the appendant data and the error correcting code for the appendant data are appended in the address managing portion; an error correction processing portion configured to carry out error correction in the appendant data in the third storage area with the appendant data in the third storage area and the error correcting code for the appendant data when the physical address corresponding to the logical address related to a read request corresponds to the third storage area, and carry out error correction in the first storage area with the predetermined number of the plural pieces of data containing therein the data in the first storage area, and the error correcting code in the second storage area when the physical address corresponding to the logical address related to the read request does not correspond to the third storage area; and a host computer configured to issue either the read request or the write request to the memory.

As a result, there is offered an operation such that the recalculation of the error correcting code is made unnecessary when part of the data becoming the object of the error correcting code is updated in the memory in accordance with the instruction issued from the host computer.

As set forth hereinabove, according to an embodiment of the present disclosure, there is offered an excellent effect such that the data holding characteristics can be reinforced without being aware of the disposition on the physical address space.

BRIEF DESCRIPTION OF THE DRAWINGS

FIG. 4 is a diagram showing a structure of an address mapping table in the information processing system according to the first embodiment of the present disclosure;

FIG. 5 is a diagram showing a structure of a second ECC managing table in the information processing system according to the first embodiment of the present disclosure;

FIG. 9 is a diagram showing a first numerical example of the address mapping table in the first embodiment of the present disclosure;

FIG. 10 is a diagram showing a second numerical example of the address mapping table in the first embodiment of the present disclosure;

FIG. 11 is a diagram showing a first numerical example of the second ECC managing table in the first embodiment of the present disclosure;

FIG. 12 is a diagram showing a second numerical example of the second ECC managing table in the first embodiment of the present disclosure;

FIG. 15 is a diagram showing a third numerical example of the address mapping table in the first embodiment of the present disclosure;

FIG. 16 is a diagram showing a modified change (second ECC intra-physical address offset) of the second ECC managing table in the first embodiment of the present disclosure;

FIG. 17 is a diagram showing a numerical example before update of a modified change (irrelevant data on logical addresses) of the address mapping table in the first embodiment of the present disclosure;

FIG. 18 is a diagram showing a numerical example before the update of a modified change (irrelevant data on logical addresses) of the second ECC managing table in the first embodiment of the present disclosure;

FIG. 19 is a diagram showing a numerical example after the update of the modified change (irrelevant data on the logical addresses) of the address mapping table in the first embodiment of the present disclosure;

FIG. 20 is a diagram showing a numerical example after the update of the modified change (irrelevant data on the logical addresses) of the address mapping table in the first embodiment of the present disclosure;

FIG. 21 is a diagram showing a numerical example of a modified change (final access time) of the address mapping table in the first embodiment of the present disclosure;

FIG. 23 is a diagram showing a numerical example of a modified change (plural logical addresses) of the address mapping table in the first embodiment of the present disclosure;

FIG. 24 is a diagram showing a numerical example of a modified change (plural logical addresses) of the second ECC managing table in the first embodiment of the present disclosure;

FIG. 29 is a diagram showing a structure of an address mapping table of an address managing portion in the information processing system according to the second embodiment of the present disclosure;

FIG. 34 is a diagram showing a structure of an address mapping table in the information processing system according to the third embodiment of the present disclosure;

DETAILED DESCRIPTION OF THE PREFERRED EMBODIMENTS

Embodiments of the present disclosure will be described in detail hereinafter with reference to the accompanying drawings. It is noted that the description will be given below in accordance with the following order.

1. First Embodiment
2. Modified Change of First Embodiment
3. Second Embodiment (the case where second ECC storage area positions are fixed)
4. Third Embodiment (the case where second ECC storage area positions are made variable)
5. Modified Change of Third Embodiment

1. First Embodiment

[Configuration of Information Processing System]

Figure 1:
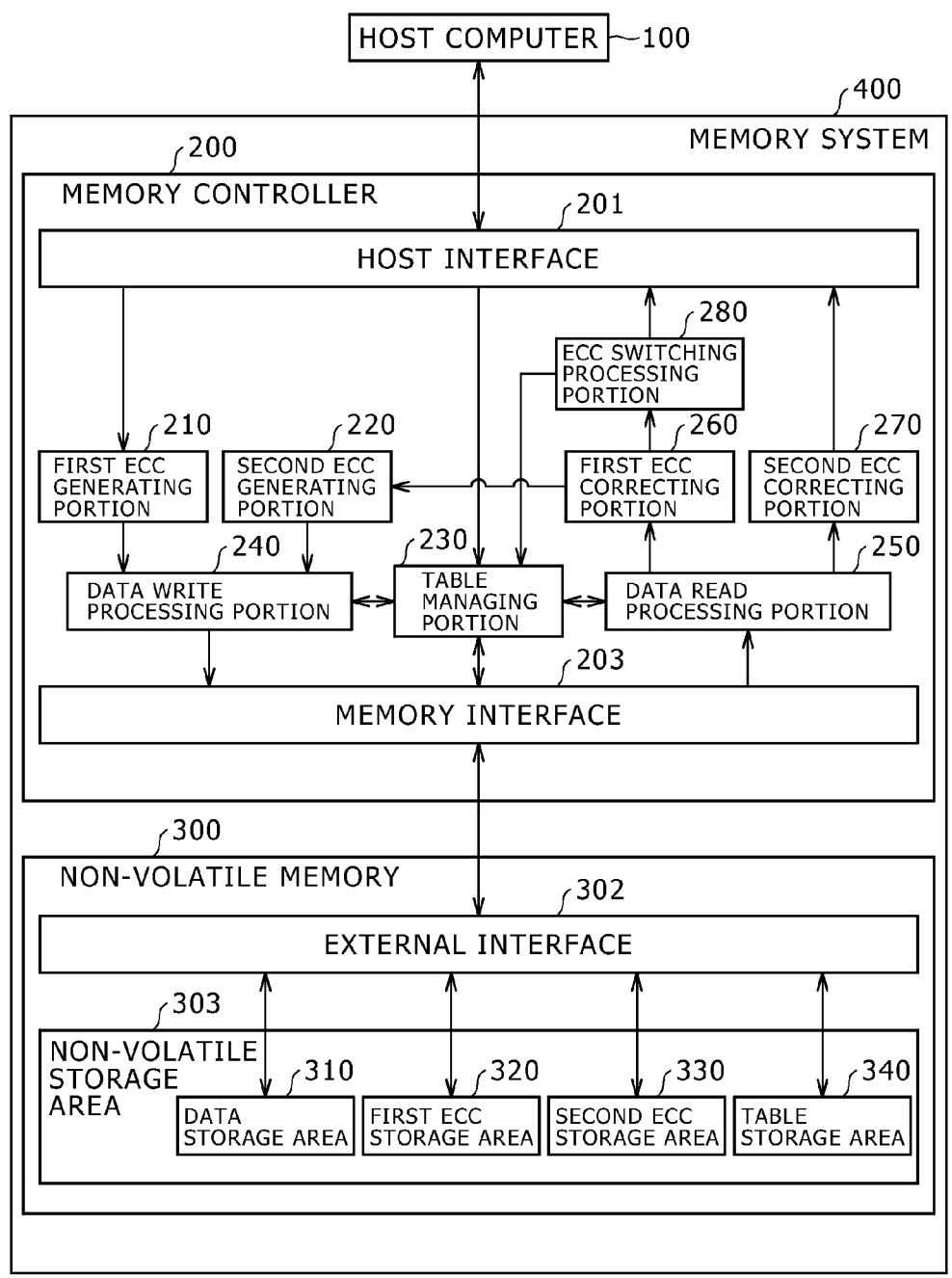
FIG. 1 is a block diagram showing a configuration of an information processing system according to a first embodiment of the present disclosure.

FIG. 1 is a block diagram showing a configuration of an information processing system according to a first embodiment of the present disclosure. The information processing system includes a host computer 100 and a memory system 400. The host computer 100 issues a request (command) such as a read command or a write command to the memory system 400, and receives a response to the request (command) from the memory system 400.

The memory system 400 reads out data by receiving the read command issued thereto from the host computer 100. In addition, the memory system 400 writes data by receiving the write command issued thereto from the host computer 100. In addition, the memory system 400 gives an Error Correcting Code (ECC) for reinforcing data holding characteristics by receiving a data holding characteristics reinforcement command issued thereto from the host computer 100.

In the case of the read command, both of a head logical address as an object of read and a data size are specified as parameters by the host computer 100. In the case of the write command, both of a head logical address as an object of write and a data size are specified as parameters by the host computer 100, and the data as an object of write is transmitted. Also, in the case of the data holding characteristics reinforcement command, both of a head address as an object of the data holding characteristics reinforcement and a data size of logical addresses are specified as parameters by the host computer 100.

The memory system 400 includes a non-volatile memory 300 and a memory controller 200. The non-volatile memory 300 includes an external interface 302 for connection to the memory controller 200, and a non-volatile storage area 303. The non-volatile storage area 303 includes a data storage area 310, a first ECC storage area 320, a second ECC storage area 330, and a table storage area 340. The contents which are stored in the data storage area 310, the first ECC storage area 320, the second ECC storage area 330, and the table storage area 340, correspondingly, will be described later.

The memory controller 200 is a controller for controlling the non-volatile memory 300. The memory controller 200 includes a first ECC generating portion 210, a second ECC generating portion 220, a table managing portion 230, and a data write processing portion 240. In addition, the memory controller 200 includes a data read processing portion 250, a first ECC correcting portion 260, a second ECC correcting portion 270, and an ECC switching processing portion 280. Also, the memory controller 200 includes a host interface 201 for connection to the host computer 100, and a memory interface 203 for connection to the non-volatile memory 300.

The first ECC generating portion 210 generates an error correcting code (first ECC) which is added to the data received in accordance with the write command issued from the host computer 100. The second ECC generating portion 220 generates an error correcting code (second ECC) which is used to reinforce the data holding characteristics. The table managing portion 230 serves to manage an address mapping table, a second ECC managing table, and the like which will be described later. The data write processing portion 240 executes processing for writing data to the non-volatile memory 300. The data read processing portion 250 executes processing for reading data from the non-volatile memory 300. The first ECC correcting portion 260 carries out error detection and correction of data by using the first ECC. The second ECC correcting portion 270 carries out error detection and correction of data by using the second ECC. The ECC switching processing portion 280 executes switching processing for carrying out error detection and correction of data by using the second ECC when it may be impossible to carry out the error correction by using the first ECC.

It is noted that the second ECC correcting portion 270 is an example of an error correcting portion described in the appended claims. In addition, the second ECC generating portion 220 is an example of an error correcting code generating portion described in the appended claims. In addition, the table managing portion 230 is an example of an entry managing portion described in the appended claims. In addition, each of the data storage area 310 and the first ECC storage area 320 is an example of a unit data storing portion described in the appended claims. Also, the second ECC storage area 330 is an example of an error correcting code storing portion described in the appended claims.

[Storage Form of Non-Volatile Storage Area 303]

Figure 2:
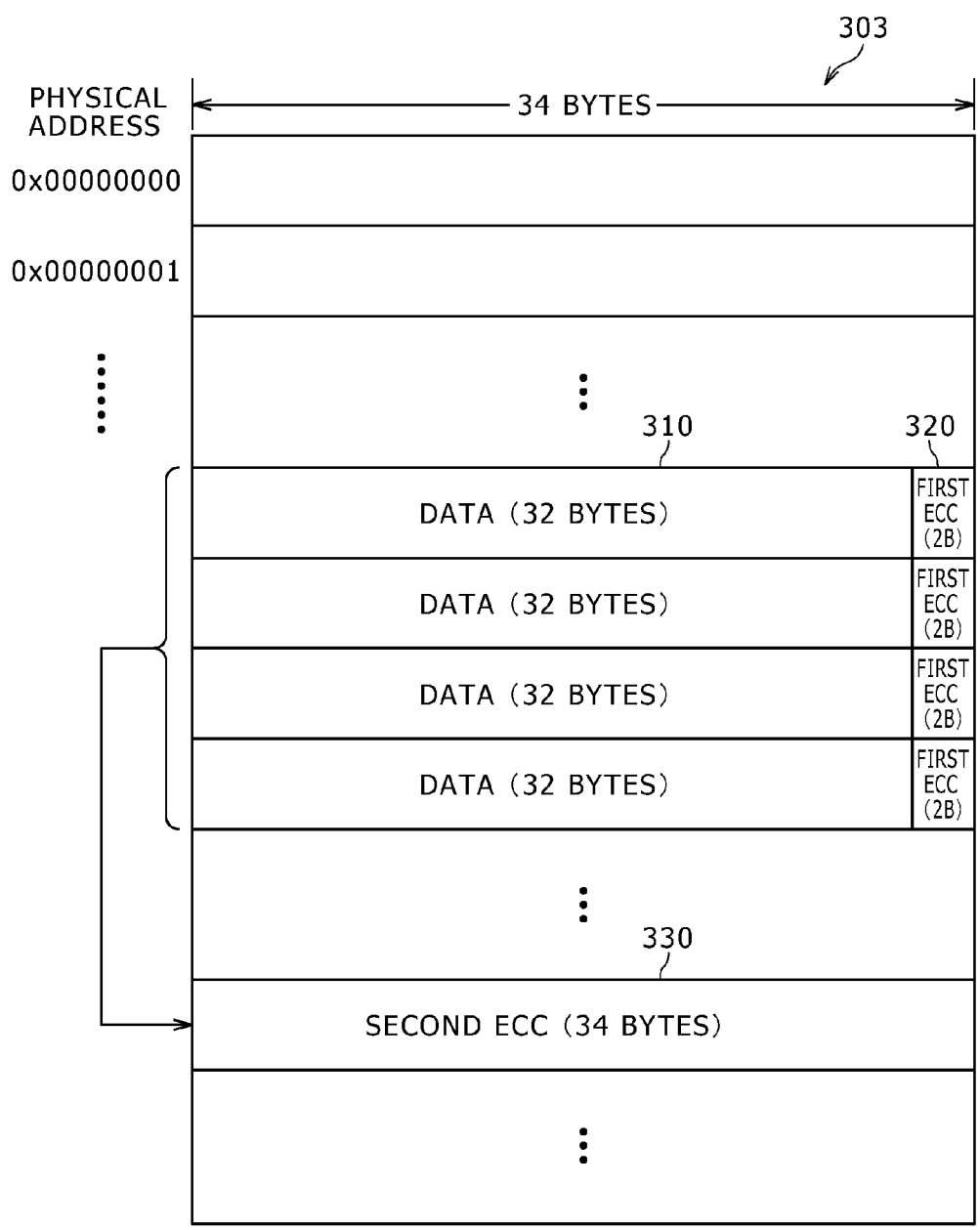
FIG. 2 is a diagram showing storage contents of a non-volatile storage area in the information processing system according to the first embodiment of the present disclosure.

FIG. 2 is a diagram showing storage contents of the non-volatile storage area 303 in the information processing system of the first embodiment. It is supposed that the non-volatile storage area 303, for example, can read and write data with 34 bytes as a unit data, and a physical address is allocated every 34 bytes.

The unit data having 34 bytes, for example, is composed of data having 32 bytes, and an error correcting code (first ECC) having 2 bytes for the data having 32 bytes. That is to say, the first ECC having 2 bytes is given to the data having 32 bytes in the data storage area 310, and the resulting unit data of 34 bytes is stored in the first ECC storage area 320. It is noted that in general, Expression (1) holds:

$$A+B \leq N \tag{1}$$

where N is bytes representing a unit data width of the non-volatile area 303, A is bytes representing a data size thereof, and B is bytes representing a size of the given first ECC.

In addition thereto, it is supposed that, for example, another error correcting code (second ECC) having 34 bytes is given four pieces of unit data. The second ECC is stored in the second ECC storage area 330. The unit data becoming an object of giving of the second ECC may be stored in discontinuous physical addresses on the physical address space. It is noted that in general, Expression (2) holds:

$$C \leq N \tag{2}$$

where C is bytes representing a size of the given second ECC.

Storage addresses, on the non-volatile storage area 303, of these pieces of unit data and the second ECC are managed by tables which will be described below.

It is noted that in this case, in particular, the non-volatile memory is preferably applied to a non-volatile random access memory (NVRAM: Non-Volatile RAM) to which a high-speed random access can be carried out in a small unit. The NVRAM, for example, includes a Phase-Change RAM (PCRAM), a Magneto-resistive RAM (MRAM), and a Resistance RAM (ReRAM). In addition, the non-volatile memory can also be applied to a flash memory.

Figure 3:
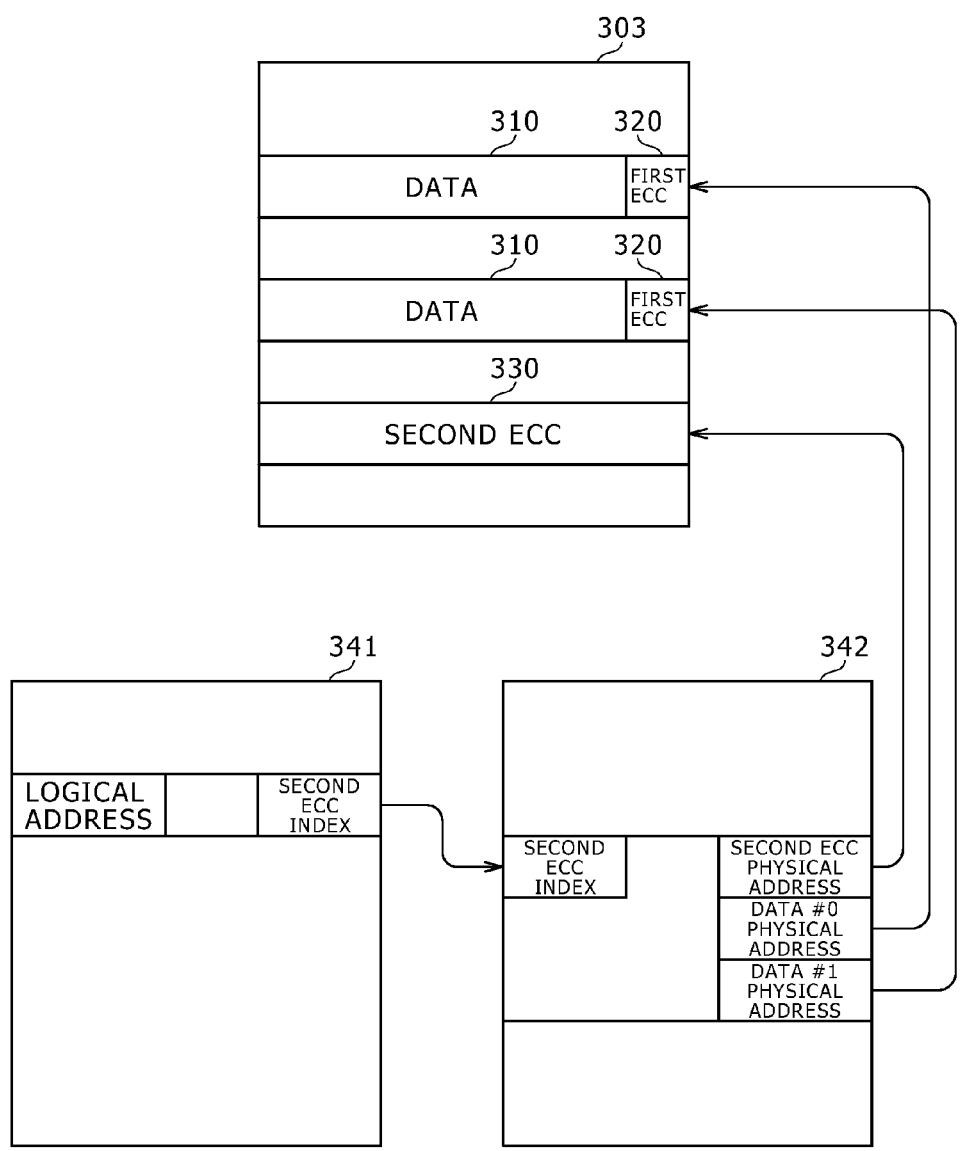
FIG. 3 is a diagram showing a management form for the non-volatile storage area in the information processing system according to the first embodiment of the present disclosure.

FIG. 3 is a diagram showing a management form of the non-volatile storage area 303 in the information processing system of the first embodiment. The storage addresses, on the non-volatile storage area 303, of the unit data and the second ECC are managed by both of an address mapping table 341 and a second ECC managing table 342.

The address mapping table 341 is a table for managing a correspondence relationship between the logical addresses and the physical addresses. In this case, the address mapping table 341 holds indices of the second ECC managing table 342 corresponding to the logical addresses. It is noted that the address mapping table 341 is an example of an address managing portion described in the appended claims.

The second ECC managing table 342 is a table for managing the second ECC. In this case, the second ECC managing table 342 holds therein the physical addresses of the second ECC and the physical addresses, of the unit data, corresponding to the second ECC every entry. The indices (second ECC indices) are given to the entries, correspondingly. It is noted that the second ECC managing table 342 is an example of an error correcting code managing portion described in the appended claims.

The address mapping table 341 and the second ECC managing table 342 are both stored in the table storage area 340.

[Structure of Address Mapping Table]

FIG. 4 is a diagram showing a structure of the address mapping table 341 in the information processing system of the first embodiment. The address mapping table 341 holds therein the logical addresses, the physical addresses, the data flags, the second ECC flags, and the second ECC indices such that the logical addresses, the physical addresses, the data flags, the second ECC flags, and the second ECC indices are associated with one another.

The logical addresses are addresses in the non-volatile storage area 303 specified in the host computer 100. The physical addresses are physical addresses in the non-volatile storage area 303. It is noted that in this case, each of the logical addresses and the physical addresses is represented by a method of describing a hexadecimal number beginning with "0x."

The data flag is a flag representing whether or not both of the data and the first ECC are stored in the corresponding physical addresses, correspondingly. When the data flag represents "True," the data flag represents that both of the data and the first ECC are written to the corresponding physical addresses, correspondingly. On the other hand, when the data flag represents "False," the data flag represents that none of the data and the first ECC is written to the corresponding physical addresses. The data which is read out from the physical address in which the data flag represents "False" becomes an initial value in the memory. It is noted that in the case of the NAND flash, all of the bits become "1" in the initial value in the memory.

The second ECC flag is a flag representing whether or not the second ECC is given to the data stored in the corresponding physical address. When the second ECC flag represents "True," the second ECC flag represents that the second ECC is given to the data stored in the corresponding physical address to reinforce the data holding characteristics. On the other hand, when the second ECC flag represents "False," the second ECC flag represents that no second ECC is given to the data stored in the corresponding physical address.

The second ECC index is a valid value when the second ECC flag represents "True," and the second ECC indices given to the entries of the second managing table 342, correspondingly, are held. In the case shown in FIG. 4, "$z_i$" is held as the second ECC index in each of the entries 710, 711, 712, and 713 of the address mapping table 341.

[Structure of Second ECC Managing Table]

FIG. 5 is a diagram showing a structure of the second ECC managing table 342 in the information processing system of the first embodiment. In the second ECC managing table 342, the second ECC index, the number of data, the second ECC physical address, and the physical addresses of 0-th to third data are held in each of the entries.

The second ECC index serves to hold an index used to identify the entry of the second ECC managing table 342. A value of the second ECC index is held in the corresponding entry of the address mapping table 341, whereby the address mapping table 341 and the second ECC managing table 342 are associated with each other.

The number of data represents the number of data contained in the corresponding entry.

The second ECC physical address is used to hold therein the physical address in which the second ECC of the data contained in the corresponding entry is stored.

The physical addresses of 0-th to third pieces of data are used to hold therein the physical addresses of the data contained in the corresponding entry in order. Of the physical addresses of 0-th to third pieces of data, only the physical address(es) corresponding to the number of which is represented by the number of data described above is(are) valid. In this case, since in the entry in which the second ECC index is "001," the number of data represents "2," only the two physical addresses of 0-th and first pieces of data are valid. In addition, since in the entry in which the second ECC index is "000," the number of data represents "0," all of the physical addresses of the 0-th to third pieces of data are invalid.

[Processing Procedure of Write Processing]

Figure 6:
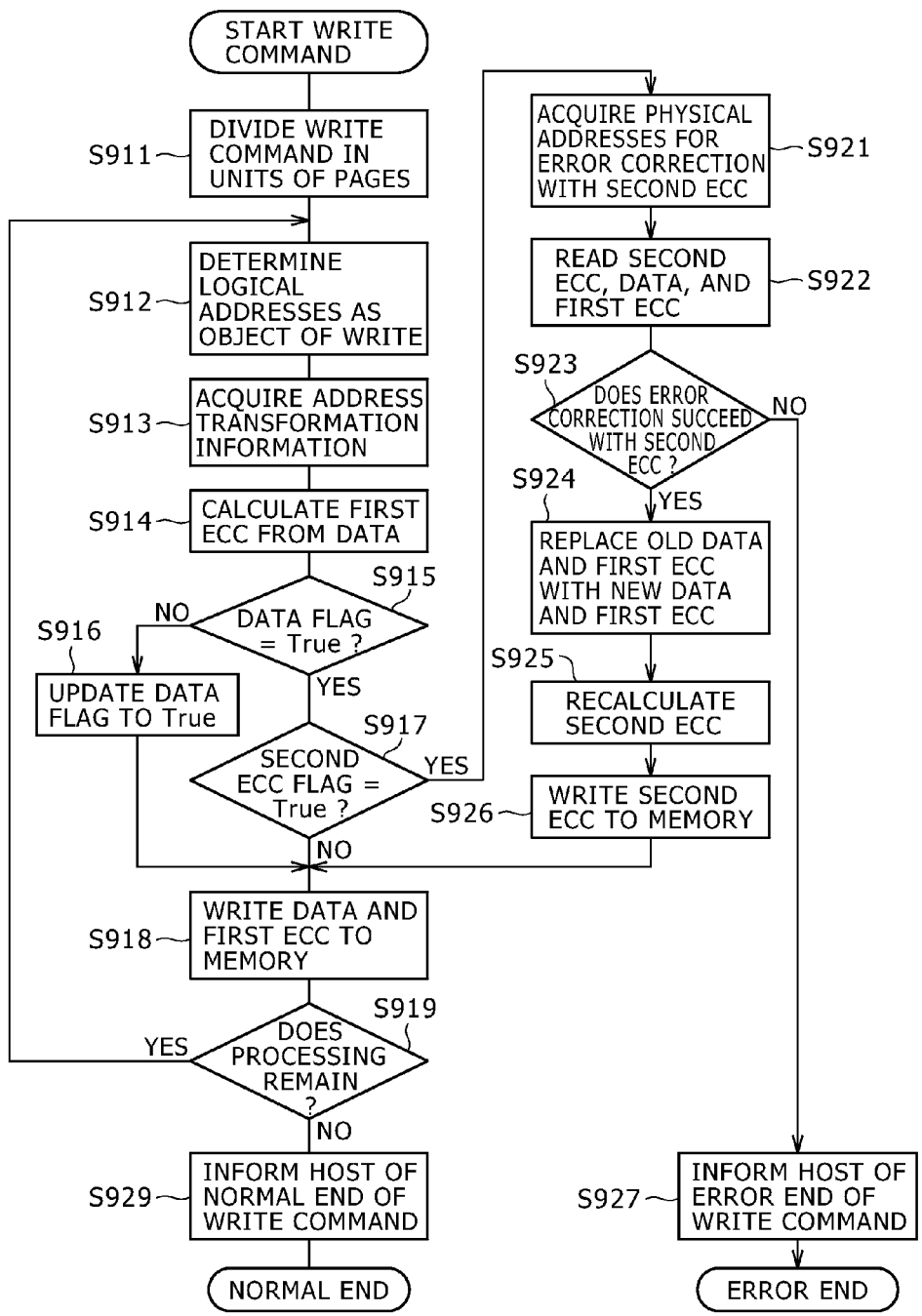
FIG. 6 is a flow chart explaining a processing procedure of write processing in the information processing system according to the first embodiment of the present disclosure.

FIG. 6 is a flow chart explaining a processing procedure of write processing in the information processing system of the first embodiment of the present disclosure. The memory system 400 receives the write command and the write data from the host computer 400 through the host interface 201. The write command has a head logical address as an object of write and the data size as parameters. The data size described herein is represented in the form of a numerical value with an area specified by the logical address as a unit. For example, in the case where "2" is specified as the data size in the memory system in which a size of the area specified by the logical address is 32 bytes, the size of the data which is received from the host computer 100 to be written becomes 32×2=64 bytes.

The memory controller 200 divides the write command in units of the logical addresses based on the head logical address as the object of the write and the data size which are received as the parameters of the write command (Step S911). One logical address is executed in one processing, and the size of the data to be written becomes the size of the area specified by the unit logical address. For example, when "$x_{i1}$" and "1" are specified as the head logical address as the object of the write, and the data size, respectively, one piece of processing is executed. In addition, when "$x_{i1}$" and "2" are specified as the head logical address as the object of the write, and the data size, respectively, the processing is divided into two pieces of processing.

Also, the logical addresses becoming the object of the write processing are determined (step S912). The logical addresses each becoming the object are determined from the head logical address as the object of the write in order. When "$x_{i1}$" and "2" are specified as the head logical address as the object of the write, and the data size, respectively, the logical address with which the processing is firstly executed is determined as "$x_{i1}$." Also, the logical address which becomes the object next time is determined as "$x_{i1}+1$."

Also, address transformation information corresponding to the logical addresses each being the object is acquired from the address mapping table 341 (Step S913). The address transformation information is the physical address, the data flag, the second ECC flag, and the second ECC index which have been described with reference to FIG. 4. For example, in the case shown in FIG. 4, when the logical address becoming the object is "$x_{i1}$," "$y_{i1}$," "True," "True," and "$z_i$" are acquired as the physical address, the data flag, the second ECC flag, and the second ECC index, respectively.

Also, the first ECC is calculated from the data received from the host computer 100 (Step S914). The size of the data used for calculation of the first ECC is the size (for example, 32 bytes) of the area specified by 1 logical address.

When the data flag acquired in processing in Step S913 represents "False" (Step S915: No), the data is written in this write processing. Thus, the data flag of the entry concerned is updated to "True" (Step S916). After that, the operation proceeds to processing in Step S918. On the other hand, when the data flag acquired in the processing in Step S913 represents "True" (Step S915: Yes) and when the second ECC flag represents "True" (Step S917: Yes), predetermined pieces of processing in and after the processing in Step S921 are executed. In the case other than that case, the operation proceeds to processing in Step S918.

Physical address information with which the error correction is carried out by using the second ECC corresponding to the data is acquired in terms of processing when the second ECC flag represents "True" (Step S921). The physical address information is the number of data, the second ECC physical address, and the physical addresses of 0-th to third pieces of data which are managed by the second ECC managing table 342 described above. The physical address information acquired herein is acquired from the entry, of the second ECC managing table 342, which has a value agreeing with the second ECC index acquired in the processing in Step S913.

For example, there is supposed the case where the address mapping table 341 holds therein the values shown in FIG. 4, and the second ECC managing table 342 holds therein the values shown in FIG. 5. The physical address information acquired when write is generated in the logical address "$x_{i1}$" is acquired from the entry, of the second ECC managing table 342, in which the second ECC index becomes "$z_i$." That is to say, the number of data becomes "4," the second ECC physical address becomes "$e_i$," the physical address of the 0-th piece of data becomes "$y_{i0}$," the physical address of the first piece of data becomes "$y_{i1}$," the physical address of the second piece of data becomes "$y_{i2}$," and the physical address of the third piece of data becomes "$y_{i3}$."

Also, the second ECC, the data, and the first ECC are read out from the non-volatile storage area 303 based on the physical address information acquired in the processing in Step S921 (Step S922). For example, there is supposed that the case where the second ECC physical address, the number of data, and the physical addresses of the 0-th to third pieces of data which are acquired from the second ECC managing table 342 are "$e_i$," "4," and "$y_{i0}$," "$y_{i1}$," "$y_{i2}$," and "$y_{i3}$," respectively. In this case, the second ECC is read out from the physical address "$e_i$," and the data and the first ECC are read out from the physical addresses "$y_{i0}$," "$y_{i1}$," "$y_{i2}$," and "$y_{i3}$."

The error correction for the data and the first ECC is carried out by using the second ECC read out in the processing in Step S922, and the processing procedure branches depending on success and failure of the carrying-out of the error correction (Step S923). At this time, when the number of data acquired in the processing in Step S921 is smaller than "4," with respect to the lacking data, after the padding is carried out with the initial value of the non-volatile memory 300, the error correction is carried out.

When the error correction using the second ECC succeeds (Step S923: Yes), predetermined pieces of processing in and after processing in Step S924 are executed. On the other hand, when the error correction using the second ECC fails (Step S923: No), the host computer 100 is informed of error end of the write command (Step S927). After the host computer 100 is informed of the error end of the write command, the write command becomes the error end.

When the error correction succeeds in the processing in Step S923, the data and the first ECC which are stored in the physical addresses concerned are replaced with the data received from the host computer 100, and the first ECC calculated in the processing in Step S914, respectively (Step S924). For example, there is supposed the case where write is generated in the logical address "$x_{i1}$" when the address mapping table 341 holds therein the values shown in FIG. 4, and the second ECC managing table 342 holds therein the values shown in FIG. 5. In this case, the data and the first ECC which are stored in the physical address "$y_{i1}$" of the first piece of data are replaced with the data received from the host computer 100, and the first ECC calculated from the data concerned, respectively.

Next, with regard to the data and the first ECC with which the data and the first ECC stored in the physical address are replaced, respectively, in the processing in Step S924, the second ECC thereof is calculated (Step S925). For example, there is supposed the case where when the address mapping table 341 holds therein the values shown in FIG. 4, and the second ECC managing table 342 holds therein the values shown in FIG. 5, write is generated in the logical address "$x_{i1}$." In this case, the data read out from the physical address "$y_{i0}$," and the first ECC both become the 0-th piece of data, the data read out from the physical address "$y_{i2}$" and the first ECC both become the second piece of data, and the data read out from the physical address "$y_{i3}$" and the first ECC both become the third piece of data. In addition, the data received from the host computer 100, and the first ECC calculated from the data concerned both become the first piece of data. The 0-th to third pieces of data are coupled to one another, thereby calculating the second ECC.

The second ECC which is calculated in such a manner is written to the physical address of the second ECC which is acquired in the processing in Step S921 (Step S926). When the write of the second ECC has been completed, predetermined pieces of processing in and after the processing in Step S918 are executed.

After completion of the processing in Step S916, S917 or S926, the data and the first ECC calculated in the processing in Step S914 are both written to the non-volatile storage area 303 (Step S918). The physical address as the object of write is the physical address acquired in the processing in Step S913.

Also, it is determined whether or not all of the pieces of processing obtained through the division in the processing in Step S911 have been ended (Step S919). When it is determined in Step S919 that the processing remains (Step S919: Yes), predetermined pieces of the processing in and after the processing in Step S912 are repetitively executed. On the other hand, when it is determined in Step S919 that all of the pieces of processing have been ended (Step S919: No), the host computer 100 is informed of the effect that the write command has been normally executed (Step S929). After the information of that effect to the host computer 100 has been ended, the processing of the write command concerned is normally ended.

[Processing Procedure of Read Processing]

Figure 7:
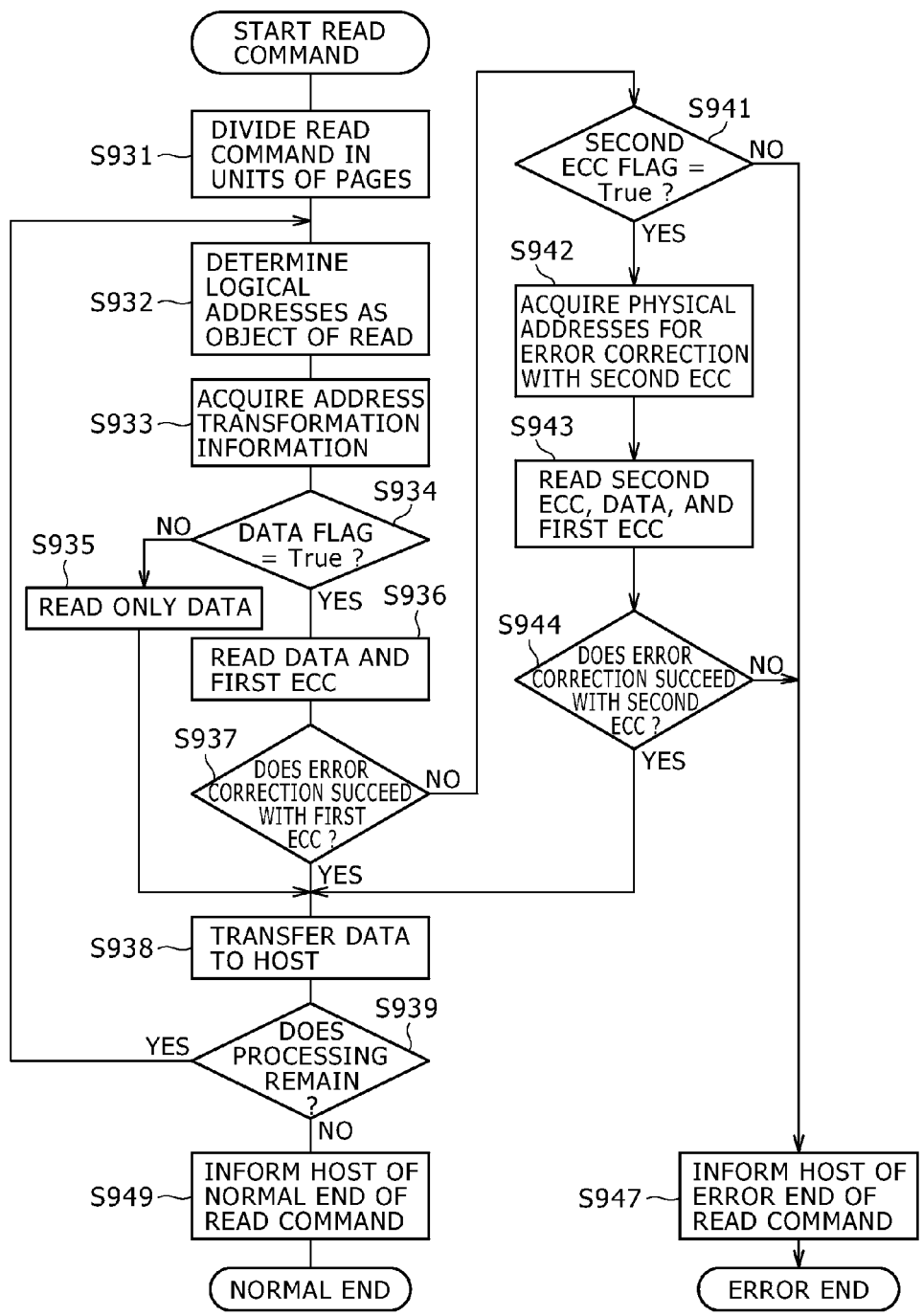
FIG. 7 is a flow chart explaining a processing procedure of read processing in the information processing system according to the first embodiment of the present disclosure.

FIG. 7 is a flow chart showing a processing procedure of the read processing in the information processing system according to the first embodiment of the present disclosure. The memory system 400 receives a read command from the host computer 100 through the host interface 201. The read command has a head logical address as an object of read, and a data size as parameters. The data size is expressed in the form of a numerical value with an area specified by the logical address as a unit similarly to the case of the write command.

The memory controller 200 divides the processing in units of the logical addresses based on the head logical address as the object of the read, and the data size which were received as the parameters of the read command (Step S931). One logical address is subjected to the execution in one piece of the processing, and the size of the data to be read out becomes a size of an area specified with the unit logical address. For example, when "$x_{i1}$" is specified as the head logical address as the object of the read, and "1" is specified as the data size, the processing is divided into one piece of processing. Also, when "$x_{i1}$" is specified as the head logical address as the object of the read, and "2" is specified as the data size, the processing is divided into two pieces of processing.

Also, the logical addresses each becoming the object of the read are determined (Step S932). The logical addresses each becoming the object of the read are determined from the head logical address as the object of the read in order. When "$x_{i1}$" is specified as the head logical address as the object of the read, and "2" is specified as the data size, the logical address with which the processing is firstly executed is determined as "$x_{i1}$." Also, the logical address which becomes the object next time is determined as "$x_{i1}+1$."

Also, the address transformation information corresponding to the logical address becoming the object is acquired from the address mapping table 341 (Step S933). The address transformation information is the physical address, the data flag, the second ECC flag, and the second ECC index which were described with reference to FIG. 4. For example, in the case shown in FIG. 4, when the logical address becoming the object is "$x_{i1}$," "$y_{i1}$," "True," "True," and "$z_i$" are acquired as the physical address, the data flag, the second ECC flag, and the second ECC index, respectively.

When the data flag acquired in the processing in Step S933 represents "False" (Step S934: No), only the physical address acquired in the processing in Step S933 is read out (Step S935). At this time, the value thus read out is the initial value in the non-volatile memory 300. After completion of the read of the data, processing in Step S938 is executed.

On the other hand, when the data flag represents "True" (Step S934: Yes), the data and the first ECC are both read out from the physical address acquired in the processing in Step S933 (Step S936). Also, the error correction for the data is carried out by using the first ECC thus read out, and the processing branches depending on success and failure of the error correction for the data (Step S937). That is to say, when the error correction succeeds (Step S937: Yes), processing in Step S938 is executed, while the error correction fails (Step S937: No), predetermined pieces of processing in and after processing in Step S941 are executed.

When the error correction using the first ECC fails (Step S937: No), the processing branches depending on the value of the second ECC flag acquired in the processing in Step S933 (Step S941). That is to say, when the second ECC flag represents "False" (Step S941: No), since it may be impossible to carry out the further error correction, the host computer 100 is informed of the error end of the read command (Step S947). After the information of the error end of the read command to the host computer 100, the read command concerned becomes the error end.

On the other hand, when the second ECC flag represents "True" (Step S941: Yes), the physical address information with which the error correction is carried out by using the second ECC corresponding to the data is acquired (Step S942). The physical address information is the number of data, the second ECC physical address, and the physical addresses of the 0-th to third pieces of data which are all managed by the second ECC managing table 342 described above. The physical address information acquired herein is acquired from the entry of the second ECC managing table 342 having a value agreeing with the second ECC index acquired in the processing in Step S913.

For example, there is supposed the case where the address mapping table 341 holds therein the values shown in FIG. 4, and the second ECC managing table 342 holds therein the values shown in FIG. 5. The physical address information acquired when the write is generated in the logical address "$x_{i1}$" is acquired from the entry of the second ECC managing table 342 in which the second ECC index becomes "$z_i$." That is to say, the number of data becomes "4," the second ECC physical address becomes "$e_i$," the physical address of the 0-th piece of data becomes "$y_{i0}$," the physical address of the first piece of data becomes "$y_{i1}$," the physical address of the second piece of data becomes "$y_{i2}$," and the physical address of the third piece of data becomes "$y_{i3}$."

Also, the second ECC, the data, and the first ECC are all read out from the non-volatile storage area 303 based on the physical address information acquired in the processing in Step S942 (Step S943). For example, there is supposed the case where the second ECC physical address, the number of data, and the physical addresses of the 0-th to third pieces of data which are all acquired from the second ECC managing table 342 are "$e_i$," "4," and "$y_{i0}$," "$y_{i1}$," "$y_{i2}$," and "$y_{i3}$" respectively. In this case, the second ECC is read out from the physical address "$e_i$," and the data and the first ECC are read out from the physical addresses "$y_{i0}$," "$y_{i2}$," and "$y_{i3}$." However, since the first piece of data stored in the physical address "$y_{i1}$" is previously read out in the processing in Step S936, the data read can be omitted herein.

Also, the error correction for the data and the first ECC which have been read out in the processing in Step S943 is carried out by using the second ECC read out in the processing in Step S943, and the processing branches depending on success and failure of the error correction for the data and the first ECC (Step S944). At this time, when the number of data acquired in the processing in Step S942 is smaller than "4," with respect to the lacking data, after the padding is carried out with the initial value of the non-volatile memory 300, the error correction is carried out.

When the error correction using the second ECC succeeds (Step S944: Yes), predetermined pieces of processing in and after processing in Step S938 are executed. On the other hand, when the error correction using the second ECC fails (Step S944: No), the host computer 100 is informed of error end of the write command (Step S947). After the host computer 100 is informed of error end of the read command, the read command becomes the error end.

After completion of the processing in Step S935, S937 or S944, the data for which the error correction processing has succeeded by using either the first ECC or the second ECC is transferred to the host computer 100 (Step S938).

Also, it is determined whether or not all of the pieces of processing obtained through the division in the processing in Step S931 have been ended (Step S939). When it is determined in Step S939 that the processing remains (Step S939: Yes), predetermined pieces of the processing in and after the processing in Step S932 are repetitively executed. On the other hand, when it is determined in Step S939 that all of the pieces of processing have been ended (Step S939: No), the host computer 100 is informed of the effect that the read command has been normally executed (Step S949). After the information of that effect to the host computer 100 has been ended, the processing of the read command concerned is normally ended.

[Processing Procedure of Data Holding Characteristics Reinforcing Processing]

Figure 8:
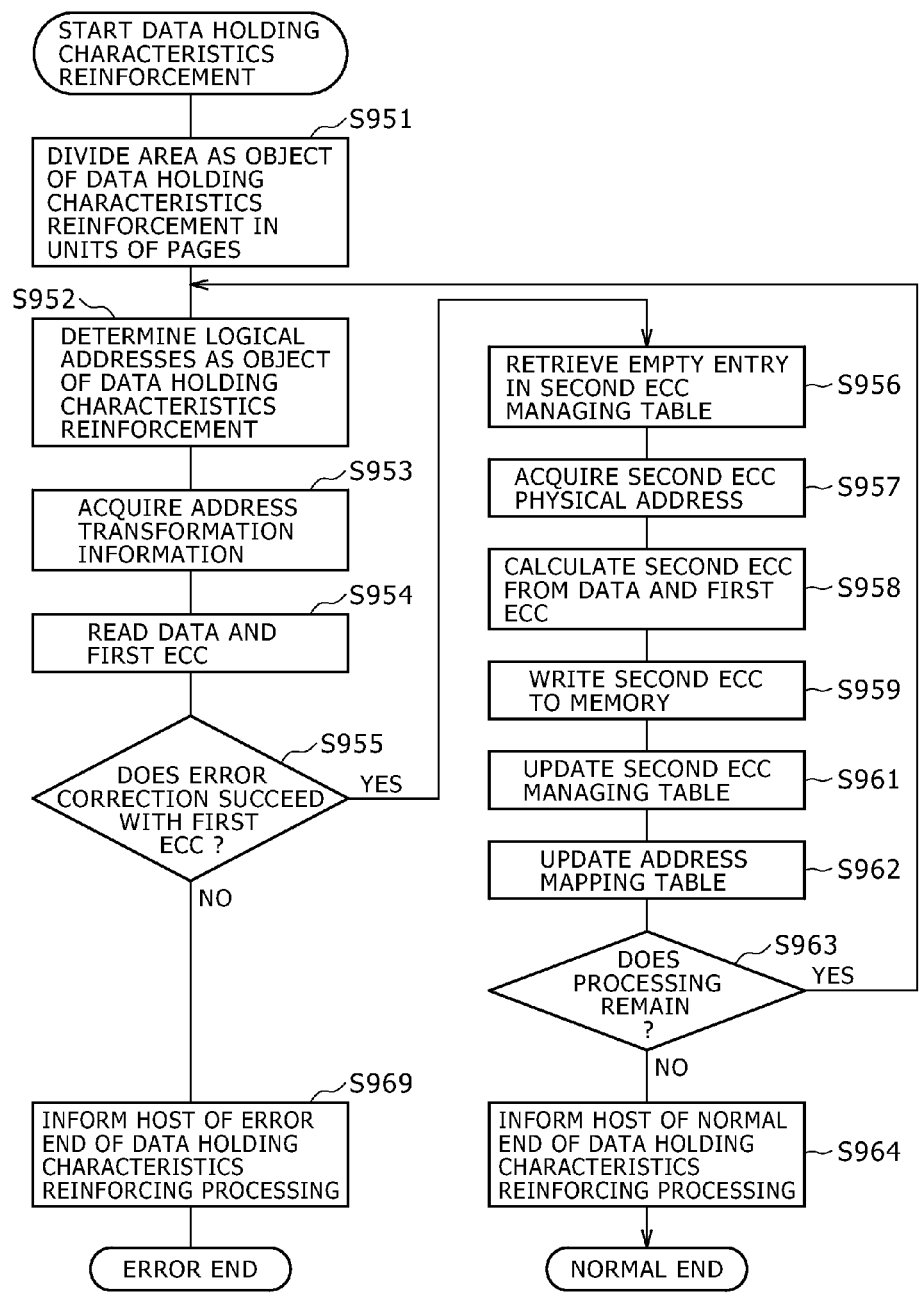
FIG. 8 is a flow chart explaining a processing procedure of data holding characteristics reinforcing processing in the information processing system according to the first embodiment of the present disclosure.

FIG. 8 is a flow chart explaining a processing procedure of data holding characteristics reinforcing processing in the information processing system according to the first embodiment of the present disclosure. The memory system 400 receives the data holding characteristics reinforcement command from the host computer 100 through the host interface 201. The data holding characteristics reinforcement command has a head logical address as an object of data holding characteristics reinforcement and a data size as parameters. The data size is represented in the form of a numerical value with an area specified by the logical address as a unit similarly to the case of the write command.

The memory controller 200 divides the processing in units of the logical addresses based on a head logical address as an object of the data holding characteristics reinforcement and a data size which are received as the parameters of data holding characteristics reinforcement command (Step S951). The data size giving the second ECC is subjected to execution in one piece of processing. In this case, four logical addresses are set as one unit. However, when a value specified by the data size is not divided by "4," the processing is executed every four logical addresses from the head logical address, and the number of logical address which is smaller than four is finally processed as one unit. For example, when "4" is specified as the data size, the processing for the four logical addresses is executed once. Also, when "10" is specified as the data size, the processing for the four logical addresses is executed twice, and the processing for the two logical addresses is executed once in the final processing.

Also, the logical addresses each becoming an object of the data holding characteristics reinforcement are determined (Step S952). The logical addresses each becoming the object of the data holding characteristics reinforcement are determined in units obtained through the division in the processing in Step S951 from the head logical address as the object of the data holding characteristics reinforcement.

Also, address transformation information corresponding to the logical addresses for one unit becoming the object is acquired from the address mapping table 341 (Step S953). The address transformation information is the physical address, the data flag, the second ECC flag, and the second ECC index which were all described with reference to FIG. 4. The physical addresses, data flags, second ECC flags, and second ECC indices for up to four logical addresses are acquired in this processing.

For example, the case shown in FIG. 9 is supposed in terms of the values in the address mapping table 341. When the logical addresses each becoming an object of the processing are four logical addresses from "$x_j$," "$y_{j0}$," "True," and "False" are acquired as the physical address in the logical address "$x_j$," the value of the data flag, and the value of the second ECC flag, respectively. In addition, "$y_{j1}$," "False," and "False" are acquired as the physical address in the logical address "$x_j+1$," the value of the data flag, and the value of the second ECC flag, respectively. In addition, "$y_{j2}$," "True," and "False" are acquired as the physical address in the logical address "$x_j+2$," the value of the data flag, and the value of the second ECC flag, respectively. Also, "$y_{j3}$," "True," and "False" are acquired as the physical address in the logical address "$x_j+3$," the value of the data flag, and the value of the second ECC flag, respectively. On the other hand, when the logical address becoming an object of the processing is one logical addresses from "$x_j+4$," "$y_{j4}$," "False," and "False" are acquired as the physical address in the logical address "$x_j+4$," the value of the data flag, and the value of the second ECC flag, respectively.

It is noted that the value of the second ECC index acquired in this case becomes an invalid value because the second ECC flag represents "False."

Both of the data and the first ECC are read out from the physical addresses, acquired in the processing in Step S953, in the non-volatile storage area 303 (Step S954). Both of the data and the first ECC which are read out from the physical addresses in each of which the data flag acquired in the processing in Step S953 represents "False" become an initial value in the memory. For example, the case shown in FIG. 10 is supposed in terms of the values in the address mapping table 341.

When the logical addresses each becoming the object of the processing are four logical addresses from "$x_j$," the data and the first ECC are read out from the physical addresses "$y_{j0}$," "$y_{j2}$," and "$y_{j3}$." On the other hand, when the logical address becoming the object of the processing is one logical address from "$x_j+4$," the data and the first ECC are read out from the physical address "$y_{j4}$." At this time, since the data flag corresponding to the physical address "$y_{j4}$" represents "False," the data read out from the physical address "$y_{j4}$" becomes an initial value of the non-volatile memory 300.

The error correction for the data is carried out by using the first ECC read out in the processing in Step S954, and the processing procedure branches depending on success and failure of the error correction for the data (Step S955). The error correction is carried out only for the data read out from the physical addresses in each of which the data flag acquired in the processing in Step S953 represents "True." The error correction for the data read out from the physical addresses in each of which the data flag acquired in the processing in Step S953 represents "False" is treated as success. When the error correction for all of the pieces of data succeeds, the operation proceeds to processing in Step S956, and in any of the cases other than this case, the operation proceeds to processing in Step S969.

When the error correction for the data using the first ECC fails (Step S955: No), the host computer 100 is informed of the error end of the data holding characteristics reinforcement command (Step S969). After completion of the information to the host computer 100, the data holding characteristics reinforcement command becomes the error end.

On the other hand, when the error correction for the data using the first ECC succeeds (Step S955: Yes), retrieval of the empty entry in the second ECC managing table 342 is carried out (Step S956). During the retrieval of the empty entry in the second ECC managing table 342, the entry in which the number of data represents "0" in the second ECC managing table 342 is retrieved, and a value of the second ECC index in the entry is acquired.

Also, the second ECC physical address is acquired in the entry retrieved in the processing in Step S956 (Step S957).

Also, the data and the values of the first ECC which are read out in the processing in Step S954 are coupled to each other in ascending order of the logical addresses, thereby calculating the second ECC (Step S958). In the processing for the logical addresses the number of which is smaller than four, with regard to the data having the lacking size, and the first ECC, the padding is carried out with the initial value in the non-volatile memory 300.

For example, the case shown in FIG. 9 is supposed in terms of the values in the address mapping table 341. When the logical addresses each becoming an object of the processing are four logical addresses from "$x_j$," the data and the first ECC are read out from the physical addresses "$y_{j0}$," "$y_{j1}$", "$y_{j2}$," and "$y_{j3}$." At this time, since the data flag corresponding to the physical address "$y_{j1}$" represents "False," the data and the first ECC which are both read out from the physical address "$y_{j1}$" become an initial value of the non-volatile memory 300. The predetermined pieces of data thus read out are coupled to one another in the order of the data in the physical address "$y_{j0}$," the first ECC, the data in the physical address "$y_{j1}$," the first ECC, the data in the physical address "$y_{j2}$," the first ECC, the data in the physical address "$y_{j3}$," and the first ECC, thereby calculating the second ECC.

On the other hand, when the logical address with which the processing is executed is one logical address from "$x_j+4$," the data and the first ECC are read out from the physical address "$y_{j4}$," and the data read out from the subsequent three physical addresses is subjected to the padding with the initial value in the non-volatile memory 300, thereby calculating the second ECC. In this case, all of pieces of data become the initial value in the non-volatile memory 300.

The second ECC calculated in the processing in Step S958 is written to the physical address acquired in the processing in Step S957 (Step S959).

Also, the number of data, and the values of the physical addresses of the 0-th to third pieces of data are updated in the entry retrieved in the processing in Step S956 (Step S961). The number of physical addresses in which the data used when the second ECC is calculated is stored is set in the number of data. The coupled data, and the physical address of the head data of the first ECC are set in the physical address of the 0-th piece of data. Also, the data and the physical address of the first ECC are set in the physical addresses of the first to third pieces of data in the coupling order.

For example, there are supposed the case of having the values shown in FIG. 9 as the values in the address mapping table 341, and the case of having the values shown in FIG. 11 as the values in the second ECC managing table 342. Values of the entry after update when the logical addresses each becoming the object of the processing are four logical addresses from "$x_j$," and the second ECC index acquired in the processing in Step S956 is "$z_{j0}$" are shown in an upper portion of FIG. 12. On the other hand, values of the entry after update when the logical address becoming the object of the processing is one logical address from "$x_j+4$," and the second ECC index acquired in the processing in Step S956 is "$z_{j4}$" are shown in a lower portion of FIG. 12.

Also, of the values in the address mapping table 341, the values of the second ECC flag and the second ECC index are updated, thereby updating the contents of the non-volatile memory 300 (Step S962). At the same time, "True" is set in the second ECC, and the second ECC index acquired in the processing in Step S956 is set in the second ECC index.

For example, there are supposed the case of having the values shown in FIG. 9 as the values in the address mapping table 341, and the case of having the values shown in FIG. 11 as the values in the second ECC managing table 342. Values of the address mapping table 341 after update when the logical addresses each becoming the object of the processing are four logical addresses from "$x_j$," and the second ECC index acquired in the processing in Step S956 is "$z_{j0}$" are shown in the entries 730 to 733 of FIG. 10. On the other hand, values of the address mapping table 341 after the update when the logical address becoming the object of the processing is one logical address from "$x_j+4$," and the second ECC index acquired in the processing in Step S956 is "$z_{j4}$" are shown in the entry 734 of FIG. 10.

Also, it is determined whether or not all of the pieces of processing obtained through the division in the processing in Step S951 have been ended (Step S963). When it is determined in Step S963 that the processing remains (Step S963: Yes), predetermined pieces of the processing in and after the processing in Step S952 are repetitively executed. On the other hand, when it is determined in Step S963 that all of the pieces of processing have been ended (Step S963: No), the host computer 100 is informed of the effect that the data holding characteristics reinforcement command has been normally executed (Step S964). After the information of that effect to the host computer 100 has been ended, the processing of the data holding characteristics reinforcement command concerned is normally ended.

[Processing Procedure of Release of Data Holding Characteristics Reinforcing Processing]

Figure 13:
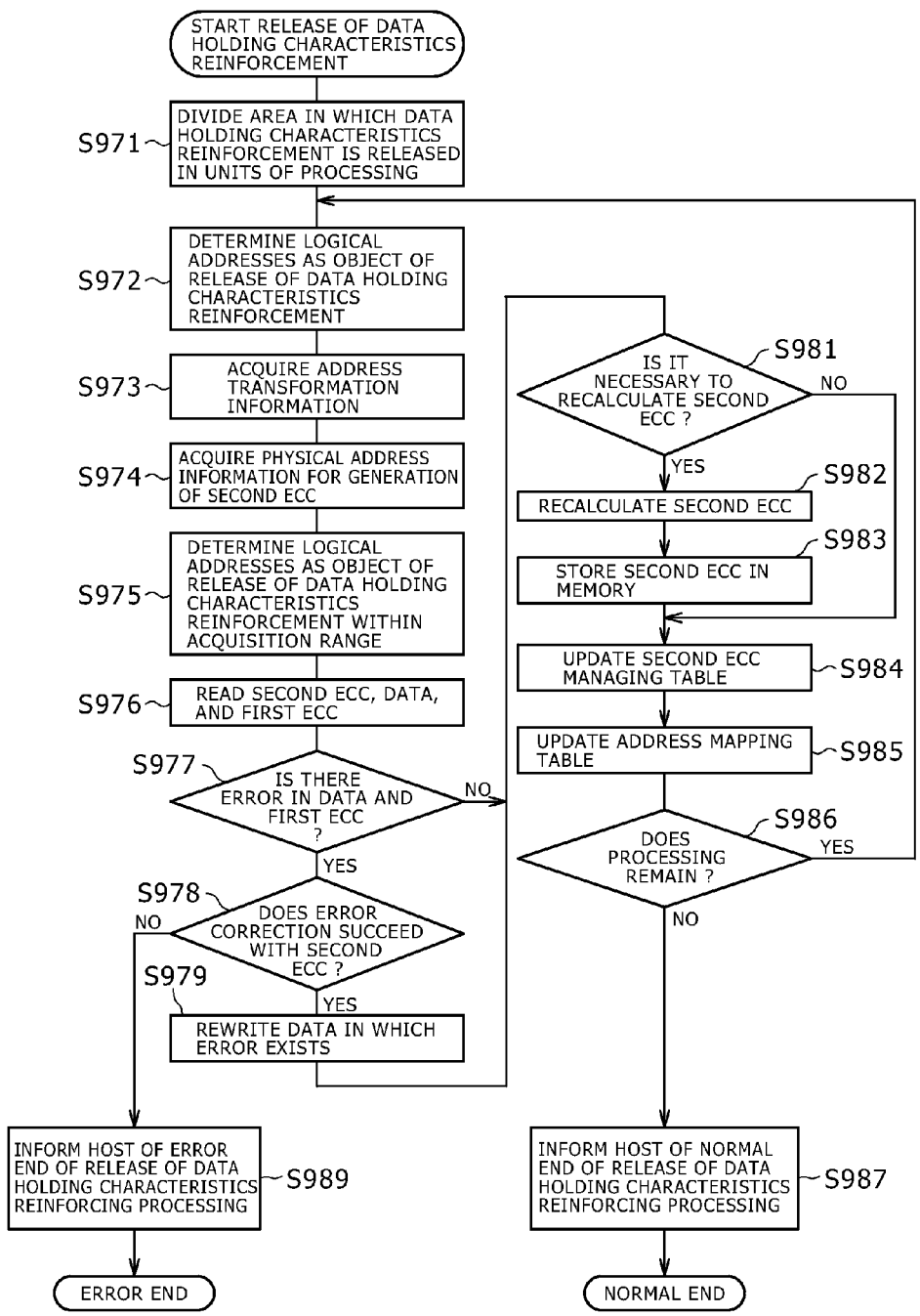
FIG. 13 is a flow chart explaining a processing procedure of data holding characteristics reinforcement releasing processing in the first embodiment of the present disclosure.

FIG. 13 is a flow chart explaining a processing procedure of release of data holding characteristics reinforcing processing in the information processing system according to the first embodiment of the present disclosure. The memory system 400 receives the data holding characteristics reinforcement releasing command from the host computer 100 through the host interface 201. The data holding characteristics reinforcement releasing command has a head logical address as an object of release of data holding characteristics reinforcement and a data size as parameters. The data size is represented in the form of a numerical value with an area specified by the logical address as a unit similarly to the case of the write command.

The memory controller 200 divides the processing in units of the logical addresses based on a head logical address as an object of release of the data holding characteristics reinforcement and a data size which are received as parameters of the data holding characteristics reinforcement releasing command (Step S971). The operation starts on the assumption that the processing for the one logical address is subjected to the execution in one piece of processing. However, when it is discriminated that for effectiveness of the processing, plural logical addresses can be released at the same time, the processing for plural logical addresses is executed in one piece of processing. Details will be described in corresponding portions in the following description.

Also, the logical address becoming an object of release of the data holding characteristics reinforcement is determined (Step S972). The logical address with which the processing is started is one logical address which is obtained through the division from the head in the processing in Step S971, and is also a logical address with which no releasing processing is executed.

Also, the address transformation information corresponding to the logical address becoming the object is acquired from the address mapping table 341 (Step S973). The address transformation information is the physical address, the data flag, the second ECC flag, and the second ECC index which were described with reference to FIG. 4.

For example, there is supposed the case of having the values, shown in FIG. 10, as the values of the address mapping table 341. When the logical address as the object of the processing is "$x_j$," "$y_{j0}$," "True," "True," and "$z_{j0}$" are acquired as the physical address of the logical address "$x_j$," the value of the data flag, the value of the second ECC flag, and the value of the second ECC index, respectively. On the other hand, when the logical address as the object of the processing is one logical address from "$x_j+4$," "$y_{j4}$," "False," and "True" are acquired as the physical address of the logical address "$x_j+4$," the value of the data flag, and the value of the second ECC flag, respectively. In addition, "$z_{j4}$" is acquired as the value of the second ECC index.

Also, there is acquired the physical address information for calculation of the second ECC given to the data stored in the physical address acquired in the processing in Step S973 (Step S974). The physical address information for calculation of the second ECC is the number of data, the second ECC physical address, and the physical addresses of the 0-th to third pieces of data which are all managed in the second ECC managing table 342. The physical address information is acquired from the entry of the second ECC managing table 342 having the value agreeing with the second ECC index acquired in the processing in Step S973.

For example, there is supposed the case where the address mapping table 341 holds therein the values shown in FIG. 10, and the second ECC managing table 342 holds therein the values shown in FIG. 12. The physical address information acquired when the logical address "$x_j$" is the object of the processing is acquired from the entry of the second ECC managing table 342 in which the second ECC index becomes "$z_{j0}$." That is to say, the number of data becomes "4," the second ECC physical address becomes "$e_{j0}$," the physical address of the 0-th piece of data becomes "$y_{j0}$," the physical address of the first piece of data becomes "$y_{j1}$," the physical address of the second piece of data becomes "$y_{j2}$," and the physical address of the third piece of data becomes "$y_{j0}$."

Also, the logical addresses are determined in which the data holding characteristics reinforcement is released in the physical addresses of the 0-th to third pieces of data which were acquired in the processing in Step S974 (Step S975). That is to say, when the physical addresses corresponding to the physical addresses corresponding to the logical addresses specified with the data holding characteristics reinforcement releasing command exist in the physical addresses of the 0-th to third pieces of data which were acquired in the processing in Step S974, such physical addresses are determined as the physical addresses in which the data holding characteristics reinforcement is released at the same time this time.

For example, there is supposed the case where when the address mapping table 341 holds therein the values shown in FIG. 10, and the second ECC managing table 342 holds therein the values shown in FIG. 12, the three logical addresses from the logical address "$x_j$" are specified as the range with the data holding characteristics reinforcement releasing command. At this time, when the logical address as the object of the processing is determined as "$x_j$" in the processing in Step S972, in processing in Step S975, the logical addresses "$x_{j+1}$" and "$x_{j+2}$" are determined as the logical addresses in which the release of the data holding characteristics is carried out concurrently with the execution of the processing for the logical address "$x_j$."

Also, the second ECC, the data, and the first ECC are read out from the non-volatile storage area 303 based on the physical address information acquired in the processing in Step S974 (Step S976). For example, there is supposed the case where the address mapping table 341 holds therein the values shown in FIG. 10, and the second ECC managing table 342 holds therein the values shown in FIG. 12. When the logical addresses "$x_j$," "$x_{j+1}$," and "$x_{j+2}$" each becoming the object of release of the data holding characteristics reinforcement are determined in the processing in Step S975, the second ECC is read out from the physical address "$e_{j0}$." In addition, the 0-th to third pieces of data are read out from the physical addresses "$y_{j0}$" to "$y_{j3}$," respectively. At the same time, each of the 0-th to third pieces of data is composed of the data and the first ECC.

Also, the error detecting processing for the data and the first ECC is executed by using the second ECC which was read out in the processing in Step S976, and the processing branches depending on success and failure of the error detecting processing for the data and the first ECC (Step S977). That is to say, when the error is detected, predetermined pieces of processing in and after processing in Step S978 are executed. On the other hand, when no error is detected, predetermined pieces of processing in and after processing in Step S981 are executed. It is noted that when the number of data acquired in the processing in Step S974 is smaller than "4," with regard to the lacking data, the padding is carried out with the initial value in the non-volatile memory 300, thereby carrying out the error detection.

When the error is detected (Step S977: Yes), the error correction processing is executed by using the second ECC read out in the processing in Step S976, and the processing branches depending on success and failure of the error correction processing (Step S978). That is to say, when the error correction succeeds with respect to all of pieces of data, and the first ECC, predetermined pieces of processing in and after processing in Step S979 are executed, while when the error correction processing fails with respect to all of pieces of data, and the first ECC, processing in Step S989 is executed. It is noted that when the number of data acquired in the processing in Step S974 is smaller than "4," with regard to the lacking data, the padding is carried out with the initial value in the non-volatile memory 300, thereby carrying out the error detection.

When the error correction processing using the second ECC succeeds (Step S978: Yes), the data and the first ECC in which the error is generated are rewritten as the data and the first ECC in which the error is corrected (Step S979). For the data and the first ECC which are rewritten in this processing, the data and the first ECC which are corrected in the processing in Step S978 each become an object of the rewrite irrespective of whether or not the logical addresses concerned are the logical addresses in which the reinforcement of the data holding characteristics is released.

In the case where even when the second ECC is used, the error correction processing does not succeed (Step S978: No), the host computer 100 is informed of the error end of the data holding characteristics reinforcement releasing command (Step S989). After completion of the information to the host computer 100, the data holding characteristics reinforcement releasing command becomes the error end.

After completion of the processing either in Step S977 (No) or in Step S979, it is determined whether or not it is necessary to recalculate the second ECC (Step S981). That is to say, it is determined whether or not any of the physical addresses corresponding to the logical addresses other than the logical addresses each becoming the object of the release of the data holding characteristics reinforcement which were determined in the processing in Step S975 exists in the second ECC physical address information acquired in the processing in Step S974. When it is determined in the processing in Step S981 that any of the physical addresses corresponding to the logical addresses other than the logical addresses each becoming the object of the release of the data holding characteristics reinforcement exists (Step S981: Yes), the second ECC is recalculated (Step S982) and is then stored in the second ECC storage area 330 of the non-volatile storage area 303 (Step S983). In this case, when the error was detected in the processing in Step S977, the second ECC is calculated from the data and the first ECC in which the error correction is previously carried out. On the other hand, when the error was not detected in the processing in Step S977, the second ECC is calculated from both of the data and the first ECC just read out.

For example, there is supposed the case where the address mapping table 341 holds therein the values shown in FIG. 10, and the second ECC managing table 342 holds therein the values shown in FIG. 12. At this time, when the logical addresses "$x_j$," "$x_{j+1}$," and "$x_{j+2}$" each becoming the object of the release of the data holding characteristics reinforcement are determined in the processing in Step S975, the logical address which does not become the object of the release of the data holding characteristics reinforcement is "$x_{j+3}$." The data which is used to calculate the second ECC in the processing in Step S982 is read out from the physical address "$y_{j3}$" to become the data and the first ECC in which the error correction is previously carried out. A portion whose data size is smaller than the data size necessary for calculation of the second ECC is subjected to the padding with the initial value in the memory. It is noted that the physical address in which the second ECC is stored in the processing in Step S983 is the second ECC physical address acquired in the processing in Step S974.

Figure 14:
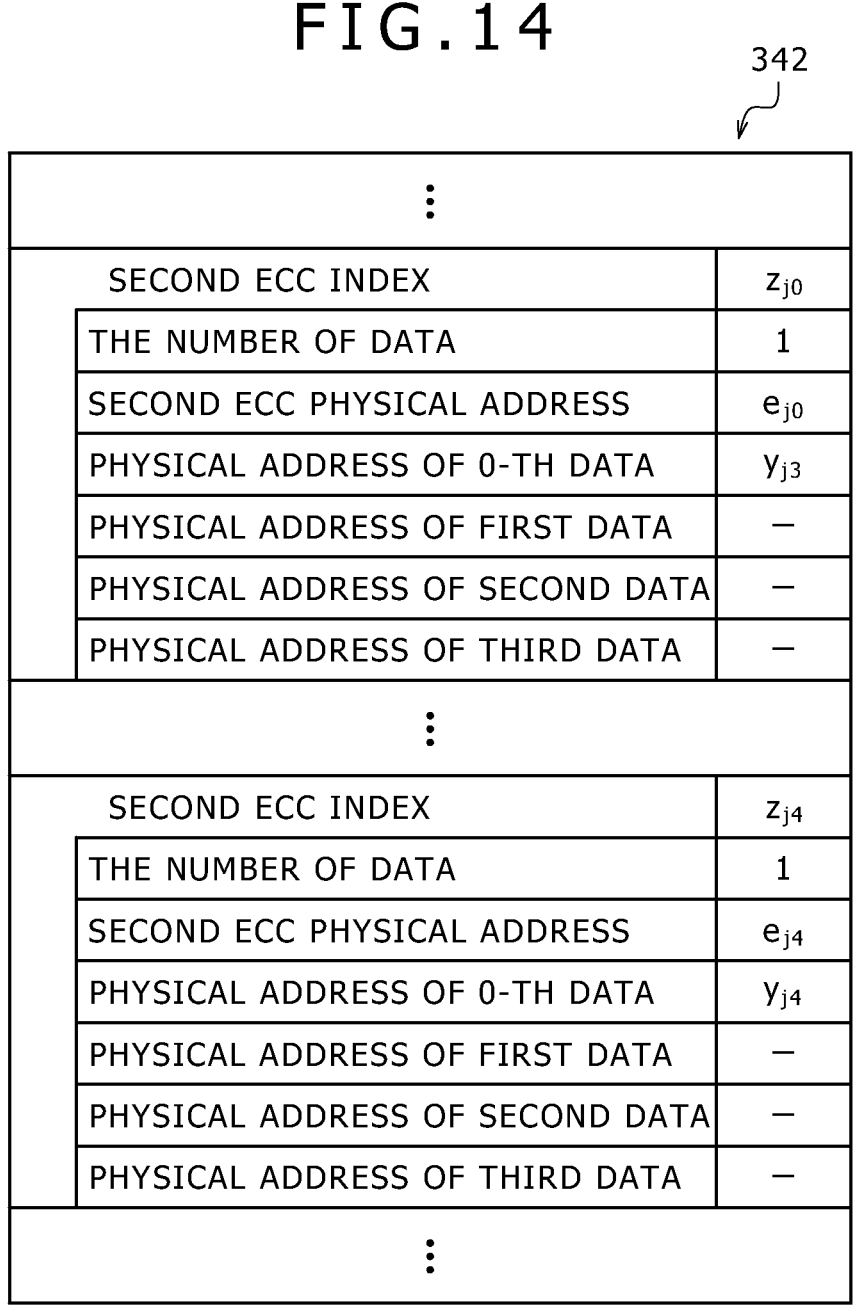
FIG. 14 is a diagram showing a third numerical example of the second ECC managing table in the first embodiment of the present disclosure.

After completion of the processing either in Step S981 (No) or in Step S983, the physical address information acquired in the processing in Step S974 is updated, and the second ECC managing table 342 is stored in the table storage area 340 of the non-volatile storage area 303 (Step S984). For example, there is supposed the case where the address mapping table 341 holds therein the values shown in FIG. 10, and the second ECC managing table 342 holds therein the values shown in FIG. 12. At this time, when the logical addresses "$x_j$," "$x_{j+1}$," and "$x_{j+2}$" each becoming the object of the release of the data holding characteristics reinforcement are determined in the processing in Step S975, the number of data of the second ECC physical address information is updated to "1," and the physical address of the 0-th piece of data is updated to "$y_{j3}$." Each of the physical addresses of the 0-th to third pieces of data are each treated as an invalid value because the number of data is "1." The contents of the second ECC managing table 342 after completion of the update in this case are shown in an upper portion of FIG. 14.

Also, the second ECC flag of the logical address in which the data holding characteristics reinforcement is released is set to "False" in the address mapping table 341 (Step S985). For example, there is supposed the case where the address mapping table 341 holds therein the values shown in FIG. 10, and the second ECC managing table 342 holds therein the values shown in FIG. 12. At this time, when the logical addresses "$x_j$," "$x_{j+1}$," and "$x_{j+2}$" each becoming the object of the release of the data holding characteristics reinforcement are determined in the processing in Step S975, the second ECC flag corresponding to the logical addresses "$x_j$," "$x_{j+1}$," and "$x_{j+2}$" is set to "False." The second ECC index of the logical addresses in which the second ECC flag is set to "False" is treated as an invalid value. The address mapping table 341 after completion of the update in this case is shown in the entries 740, 741, and 742.

Also, it is determined whether or not the predetermined pieces of processing obtained through the division in the processing in Step S971 have been all ended (Step S986). When it is determined in the processing in Step S986 that the processing remains (Step S986: Yes), the predetermined pieces of processing in and after the processing in Step S972 are repetitively executed. On the other hand, when the predetermined pieces of processing obtained through the division in the processing in Step S971 have been all ended (Step S986: No), the host computer 100 is informed of the effect that the data holding characteristics reinforcement releasing command has been normally executed (Step S987). After completion of the information of the effect to the host computer 100, the processing for the data holding characteristics reinforcement releasing command becomes the normal end.

Effect of First Embodiment

As described above, according to the first embodiment of the present disclosure, the second ECC and the physical addresses as the object data thereof are managed in the second ECC managing table 342, whereby the holding characteristics of the data can be reinforced without being aware of the disposition on the physical address space.

<2. Modified Change of First Embodiment>
[Application to Non-Volatile Memory not Unaccompanied by Overwrite]

Although the first embodiment of the present disclosure has been described on the assumption that the overwrite of the data can be carried out in the non-volatile memory 300, for example, a memory unable to carry out the overwrite also exists like a NAND flash memory. In the case of the memory unable to carry out the overwrite, it is necessary to execute processing for erasing data before the data is written to the non-volatile memory. With regard to any of respects other than this respect, it is possible to adopt the same technique as that in the first embodiment described above. Thus, it is possible to manage both of the data written to the discontinuous addresses, and the physical address of the second ECC added thereto.

[Case where Plural Second ECCs are Stored in the Same Physical Address]

Although in the first embodiment described above, one second ECC is stored in the area of one physical address, the present disclosure is by no means limited thereto, and thus plural second ECCs can also be stored in the same physical address. In this case, as shown in FIG. 16, an intra-second ECC physical address offset is newly held in the second ECC managing table 342. Also, the intra-second ECC physical address offset represents which of the positions in the second ECC physical addresses the second ECC of the entry concerned is stored in. As a result, the structure can be made such that plural second ECCs are stored in the same physical address. It is noted that when the pieces of data are managed with the logical addresses, it is unnecessary to introduce the intra-second ECC physical address offset. However, according to this modified change of the first embodiment, there is offered an advantage such that the pieces of data are managed with the physical addresses, whereby individual pieces of address transformation are made unnecessary, thereby making it possible to carry out the access at the high speed.

Note that, in general, Expression (3) holds:

$$n \times C \leq N \quad (3)$$

where N is bytes of a unit data width of the non-volatile storage area 303, and C is bytes of a size of a second ECC given. Also, n falling in the range of Expression (3) is the number of second ECCs in the same physical address. At this time, the intra-second ECC physical address offset, i, is an integer number fulfilling Expression (4):

$$0 \leq i \leq (n-1) \quad (4)$$

[Case where Second ECC is Generated in Combination with Irrelevant Data on Logical Addresses]

Although in the first embodiment described above, the second ECC is generated by coupling plural pieces of data which are continuous on the logical address space, the present disclosure is by no means limited thereto and thus the second ECC may also be generated in combination with the irrelevant data on the logical addresses. In this case, a method of retrieving an empty entry during the data holding characteristics reinforcing processing is influenced. That is to say, in the first embodiment described above, when the physical address in which the second ECC is stored is determined, the empty entry is retrieved in the processing in Step S956. In this case, however, it is only necessary to retrieve the empty in which one or more vacancies exist in the physical addresses each becoming the object data.

For example, there is supposed the case where when the address mapping table 341 holds therein the values shown in FIG. 17, and the second ECC managing table 342 holds therein the values shown in FIG. 18, "$x_j$" and "5" are respectively specified as the head logical address and the data size in accordance with the data holding characteristics reinforcement command. At this time, with regard to the logical addresses "$x_j$," "$x_j+1$," "$x_j+2$," and "$x_j+3$," the processing for reinforcing the data holding characteristics is executed by utilizing the same technique as that in the first embodiment described above. Also, with regard to the logical address "$x_j+4$," the entry in which one or more vacancies exist in the physical addresses each becoming the object data is retrieved in the processing in Step S956 (refer to FIG. 8). In a word, it is only necessary to retrieve the entry in which the number of data is equal to or smaller than "3." In this case, in the case of the second ECC managing table 342 shown in FIG. 18, an entry having a second ECC index "$z_{h0}$" is also adapted to the retrieval conditions.

In addition, in the processing in Step S958 (refer to FIG. 8), both of data and a first ECC which are stored in a physical address "$y_{h0}$" shown in FIG. 18 are read out when the second ECC in the logical address "$x_j+4$" is calculated. Also, data and a first ECC which have been read out from a physical address "$y_{j4}+4$" corresponding to the logical address "$x_j+4$" and are then subjected to the error correction are coupled to each other, thereby carrying out a calculation of a second ECC.

An example of the address mapping table 341 after having been updated in such a manner is shown in FIG. 19. Also, an example of the second ECC managing table 342 is shown in FIG. 20.

[Case where Data Holding Characteristics Reinforcing Processing is Executed with Elapse of Access Time as Trigger]

Although in the first embodiment described above, the reinforcement of the data holding characteristics and the release thereof are carried out in accordance with the respective commands issued from the host computer 100, the trigger of the data holding characteristics reinforcement and the like is by no means limited thereto. For example, a timer may be provided within the memory controller 200 and the memory controller 200 may spontaneously carry out the data holding characteristics reinforcement and the release thereof. In this case, the finally accessed time (final access time) is managed every logical address which is accessed in accordance with the read command or the write command issued from the host computer 100. The final access time is updated by execution of the read command or the write command.

FIG. 21 shows an example of the address mapping table 341 having the final access time as a parameter. When a time which has elapsed from the final access time is longer than a predetermined time, and the second ECC flag represents "False," the memory controller 200 spontaneously executes the data holding characteristics reinforcing processing. In addition, when the time which has elapsed from the final access time is not longer than the predetermined time, and the second ECC flag represents "True," the memory controller 200 may spontaneously execute release of the data holding characteristics reinforcing processing.

[Case where Plural Logical Address Correspond to Area Specified by One Physical Address]

Figure 22:
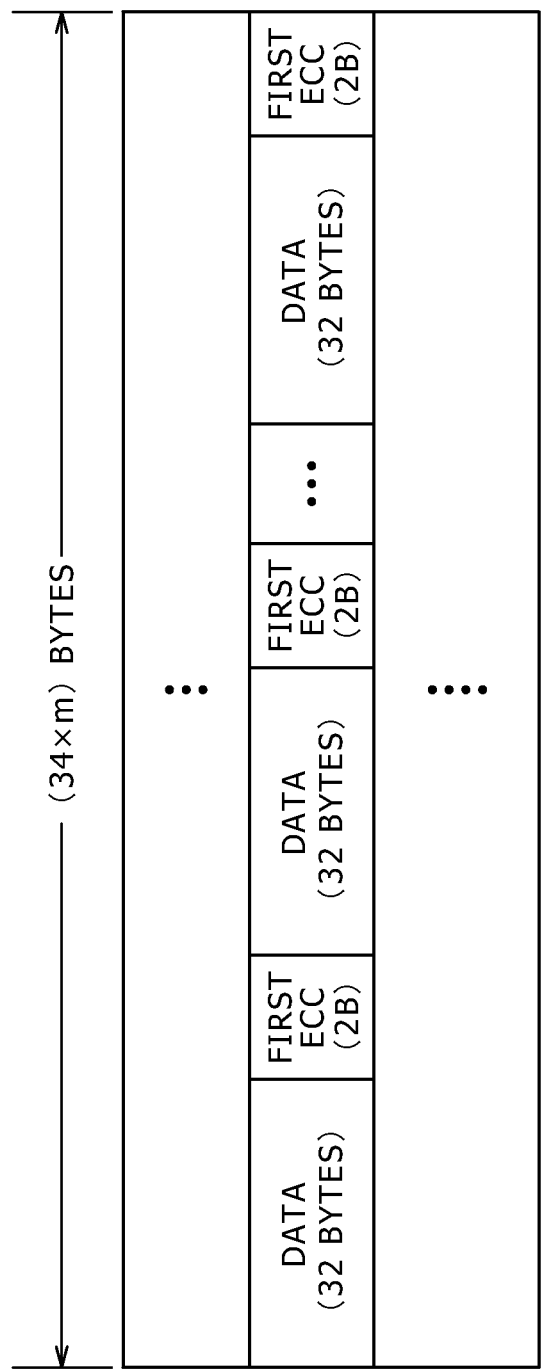
FIG. 22 is a diagram showing storage contents of a modified change (plural logical addresses) of the non-volatile storage area in the first embodiment of the present disclosure.

Although in the first embodiment described above, the data having the size specified by one logical address is stored in the area specified by one physical address, the present disclosure is by no means limited thereto. For example, data having a size specified by plural logical addresses may also be stored in an area specified by one physical address. FIG. 22 shows an example in which m sets of data and first ECCs are stored in a memory in which the data having the size specified by plural logical addresses can be stored in the area specified by one physical address.

In this case, for specifying a position where the data and the first ECC are stored, not only the physical address, but also an intra-physical address offset are both required. FIG. 23 shows an example of the address mapping table 341 when the intra-physical address offset is introduced, and FIG. 24 shows an example of the second ECC managing table 342 when the intra-physical address offset is introduced.

It is noted that such examples are preferably applied to a non-volatile memory, especially, a flash memory responding to a data access with a large size as a unit. A typical example of the flash memory includes a NAND type flash memory. In addition, such examples can also be applied to an NVRAM.

[Application to NVM Express]

A description will now be given with respect to an application example to "NVM Express" as an application example of the first embodiment described above. "The NVM Express" means an interface, for Solid State Drive (SSD) utilizing a flash memory, which is drawn up by the Non-Volatile Memory Host Controller Interface (NVMHCI) working group.

Firstly, when in a Dataset Management Command, a value of an Access Frequency falls in an "Infrequent writes and infrequent reads to the LBA range," the data holding characteristics reinforcing processing is executed. Also, when the value of the Access Frequency falls in the "Frequent writes and frequent reads to the LBA range, the release of the data holding characteristics reinforcement is carried out. It is noted that the Dataset Management Command is a command in accordance with which a device optimizes the recorded data.

In addition, when in a Read Command, the value of the Access Frequency falls in the "Infrequent writes and infrequent reads to the LBA range," the data holding characteristics reinforcing processing is executed after execution of the read processing. Also, when the value of the Access Frequency falls in the "Frequent writes and frequent reads to the LBA range," the release of the data holding characteristics reinforcement is carried out after execution of the read processing.

In addition, when in a Write Command, the value of the Access Frequency falls in the "Infrequent writes and infrequent reads to the LBA range," the data holding characteristics reinforcing processing is carried out after execution of the write processing. Also, when the value of the Access Frequency falls in the "Frequent writes and frequent reads to the LBA range," the release of the data holding characteristics reinforcement is executed after execution of the write processing.

As a result, the first embodiment of the present disclosure can be applied to "NVM Express."

3. Second Embodiment

[Configuration of Information Processing System]

Figure 25:
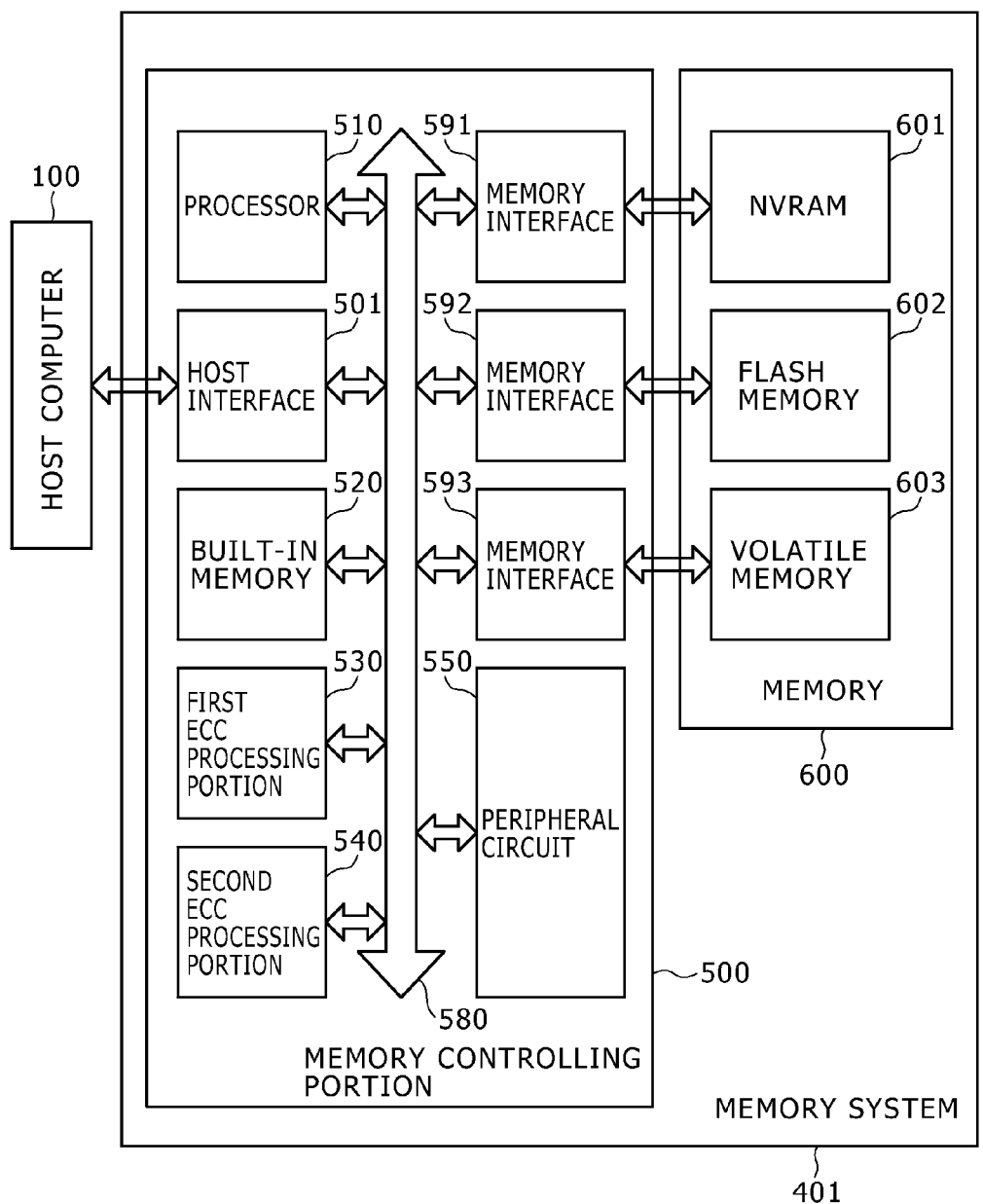
FIG. 25 is a block diagram showing a configuration of an information processing system according to a second embodiment of the present disclosure.

FIG. 25 is a block diagram showing a configuration of an information processing system according to a second embodiment of the present disclosure. The information processing system according to the second embodiment of the present disclosure includes a host computer 100, a memory 600, and a memory controlling portion 500. The memory controlling portion 500 and the memory 600 compose a memory system 401. The host computer 100 issues a request to request the memory system 401 to read or write data.

The memory 600 includes a non-volatile memory in addition to a normal volatile memory 603. The non-volatile memory is roughly classified into a flash memory 602 responding to a data access with a large size as a unit, and a Non-Volatile Random Access Memory (NVRAM) 601 to which a high-speed random access can be carried out with a small unit. Here, a typical example of the flash memory 602 includes a NAND type flash memory. On the other hand, an example of the NVRAM 601 includes a PCRAM, an MRAM, a ReRAM, and the like. The volatile memory 603 is used as a working area, and is also used to store therein data for management. In addition, the volatile memory 603 can be used as a cache memory as well. The volatile memory 603 can be realized by a DRAM, an SRAM or the like. The data stored in the volatile memory 603 may be held either in the NVRAM 601 or in the flash memory 602 as may be necessary in preparation for power source discontinuity, and may be reutilized when the power source is turned ON next time.

The memory controlling portion 500 includes a processor 510, a built-in memory 520, a first ECC processing portion 530, a second ECC processing portion 540, a peripheral circuit 550, a host interface 501, and memory interfaces 591 to 593. The processor 510, the built-in memory 520, the first ECC processing portion 530, the second ECC processing portion 540, the peripheral circuit 550, the host interface 501, and the memory interfaces 591 to 593 are connected to one another through a bus 580.

The processor 510 is a processing unit for interpreting and executing a control command issued from the host computer 100. The processor 510 executes a program by using a storage area in the built-in memory 520 as a program storage area and a work area.

The built-in memory 520 is a memory including a built-in ROM and a built-in RAM (both not shown). The program either may be stored in the built-in ROM or may be transferred from the memory 600 to the built-in RAM in a phase of activation. The built-in RAM is used in various use applications such as temporal storage of the work area or the data for management.

The first ECC processing portion 530 is used to generate the first ECC as an Error Correcting Code (ECC) which is added so as to correspond to the pieces of data, and to carry out the error correction using the first ECC concerned. The second ECC processing portion 540 is used to generate the second ECC which is added so as to correspond to a data group into which plural sets of data and first ECC are collected, and to carry out the error correction using the first ECC. Each of the first ECC processing portion 530 and the second ECC processing portion 540 either may be realized in the form of the hardware or may be realized in the form of the software by executing the program in the processor 510.

The peripheral circuit 550 is a peripheral circuit of the processor 510 and, for example, includes a built-in timer, a General-Purpose Input/Output (GPIO), and the like.

The host interface 501 is an interface through which the interaction is carried out with the host computer 100. The memory system 401 is connected to the host computer 100 through the host interface 501. Also, the memory system 401 receives a control command in accordance with which the memory 600 is controlled, and is controlled in accordance with the control command to be operated as the memory system. A Serial ATA (SATA), a Peripheral Component Interconnect (PCI), Express, an Embedded Multi Media Card (eMMC), a Universal Serial Bus (USB) or the like, for example, can be utilized as the host interface 501.

The memory interface 590 is an interface through which the interaction is carried out with the NVRAM 601. The memory interface 592 is an interface through which the interaction is carried out with the flash memory 602. Also, the memory interface 593 is an interface through which the interaction is carried out with the volatile memory 603.

The memory system 401 writes data to the memory 600 in accordance with a write command, and reads data from the memory 600 in accordance with a read command. Each of the write command and the read command specifies the head logical address in which the object data exists, and the data size as parameters. When the memory system 401 has received the data on the write command, the first ECC is added to the data concerned and the resulting data is added to be written to the non-volatile memory (either the NVRAM 601 or the flash memory 602).

The size of the written data may reach a given size or data to which no access is made for a given time may be detected by using the built-in timer in the peripheral circuit 550, whereby the generation and write of the second ECC may be carried out independently of the instruction issued from the host computer 100. Alternatively, the second ECC may be generated to be written to the non-volatile memory in accordance with the instruction, such as the data holding characteristics reinforcement command, which is issued from the host computer 100.

The data to which the second ECC is applied either may be plural pieces of data in which the physical addresses are continuous or may be plural pieces of data in which the physical addresses are discontinuous. In the following description, the case where the physical addresses are continuous is supposed in the second embodiment of the present disclosure, and the case where the physical addresses are discontinuous is supposed in a third embodiment of the present disclosure.

Figure 26:
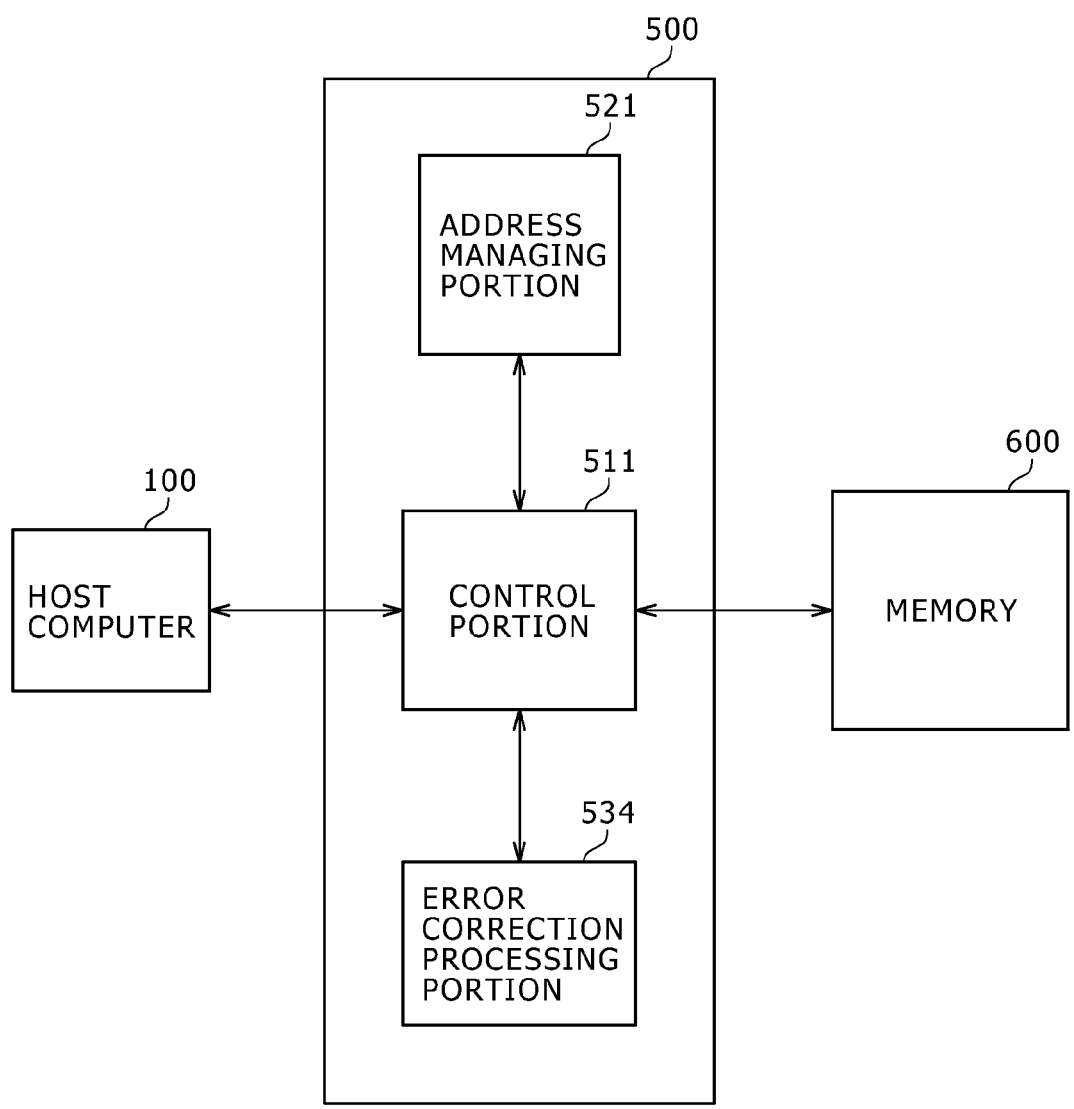
FIG. 26 is a block diagram showing a functional configuration of the information processing system according to the second embodiment of the present disclosure.

FIG. 26 is a block diagram showing a functional configuration of the information processing system according to the second embodiment of the present disclosure. In this case, as described above, there is shown a situation in which the host computer 100 and the memory 600 are connected to each other through the memory controlling portion 500. Also, a control portion 511, an address managing portion 521, and an error correction processing portion 534 are shown in terms of a function of the memory controlling portion 500.

The address managing portion 521 manages a correspondence relationship between the logical addresses in the memory 600 used in the host computer 100, and the physical addresses in the memory 600. In addition, the address managing portion 521 further manages the second ECC flag representing whether or not the second ECC is generated with respect to the data contained in the logical addresses. Also, the address managing portion 521 further manages the physical addresses before the appendant when the appendant is carried out for the data contained in the logical address concerned. The address managing portion 521, for example, is held as the address mapping table in the built-in memory 520.

The error correction processing portion 534 either generates the error correcting code with respect to the data stored in the memory 600, or carries out the error correction based on the error correcting code. That is to say, the error correction processing portion 534 generates the first ECC of the write data in a phase of write, and also generates the second ECC with respect to plural pieces of data containing therein the write data concerned. In addition, the error correction processing portion 534 carries out the error correction based on both of the read data and the first ECC thereof in a phase of read, and carries out the error correction based on both of plural pieces of data containing therein the read data, and the second ECC thereof when the correction fails. However, when the error correction is accompanied by the appendant, as will be described later, the error correction becomes the exceptional processing contents. The error correction processing portion 534 corresponds to both of the first ECC processing portion 530 and the second ECC processing portion 540.

The control portion 511 controls the interaction between the host computer 100 and the memory 600. That is to say, the control portion 511 reads out the data from the memory 600 in accordance with a read request made from the host computer 100, and returns the data thus read out to the host computer 100. In addition, the control portion 511 writes the write data from the host computer 100 to the memory 600 in accordance with the write request made from the host computer 100. The control portion 511 executes processing for transforming the logical addresses to the physical addresses during the read or write operation by referring to the address mapping table of the address managing portion 521. Although it is supposed that the control portion 511 is realized in the form of the function of the processor 510, the present disclosure is by no means limited thereto and thus the control portion 511 may also be realized by a hardware circuit.

[Storage Area within Memory 600]

Figure 27:
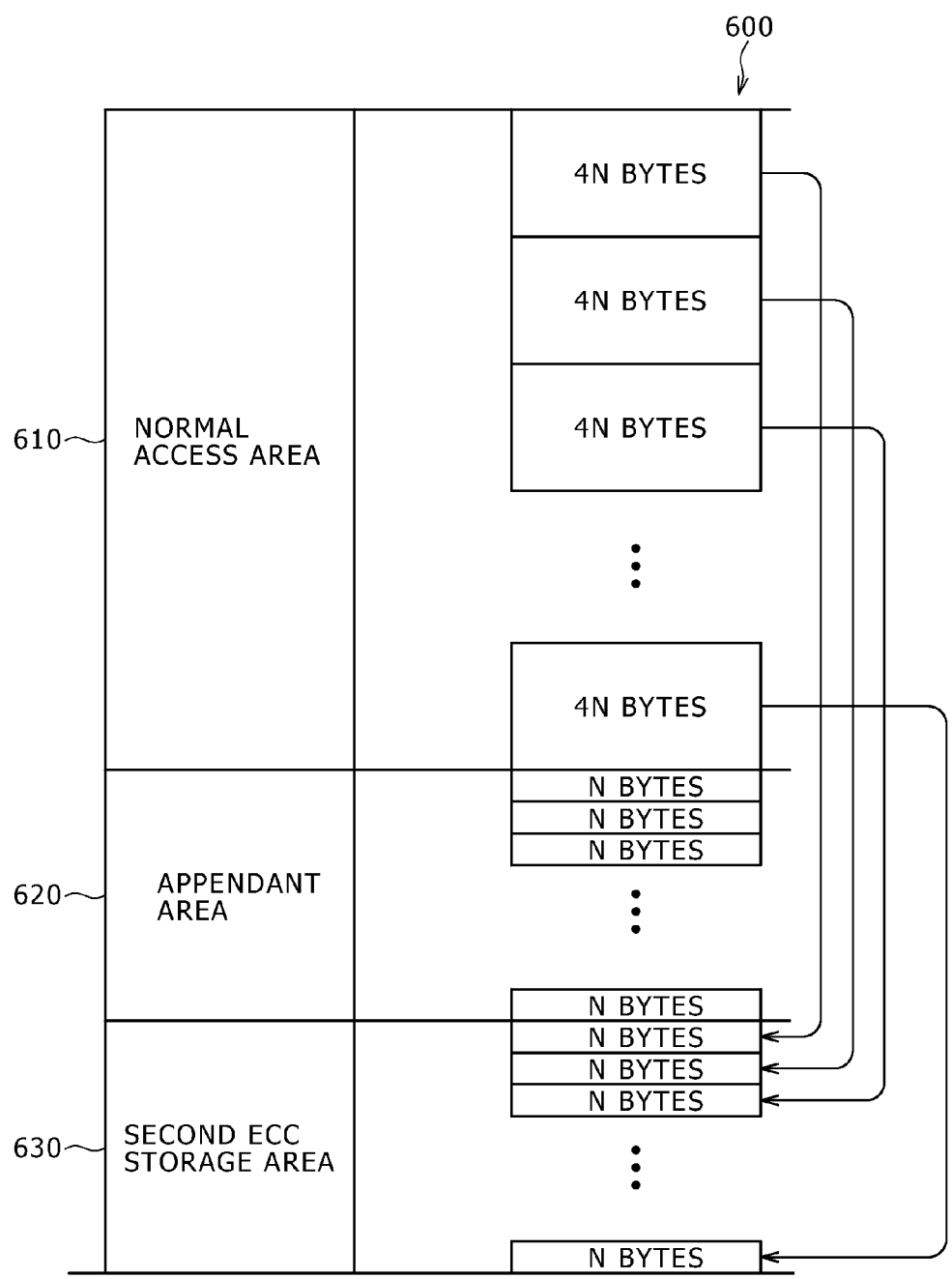
FIG. 27 is a diagram showing partition of a storage area within a memory in the information processing system according to the second embodiment of the present disclosure.

FIG. 27 is a diagram showing a partition of the storage area within the memory 600 in the information processing system according to the second embodiment of the present disclosure. The storage area within the memory 600 is roughly classified into three areas: a normal access area 610; an appendant area 620; and a second ECC storage area 630.

The normal access area 610 is a normal data area becoming an object of a direct access from the host computer 100. In the normal access area 610, for example, the first ECC having 2 bytes is added to the data having 32 bytes. The data and the first ECC either may be stored physically adjacent to each other or may be stored in positions, respectively, which are distant from each other. In this case, the data into which one data and the first ECC thereof are collected is treated as unit data having N bytes, and 4N byte data into which four pieces of unit data are collected is treated as a generation unit of the second ECC. However, the present disclosure is by no means limited thereto and thus all it takes is that the generation unit of the second ECC is the integral multiple of the unit data. It is noted that the normal access area 610 is an example of a first storage area described in the appended claims.

The appendant area 620 is an area in which the overwrite is not carried out to the data in the normal access area 610 and the data is specially stored as the appendant data in the appendant area 620. In the appendant area 620 as well, the data and the first ECC either may be stored physically adjacent to each other or may be stored in positions, respectively, which are distant from each other. In this case, the first ECC is added to one piece of appendant data and the resulting data is stored as the N byte data in the appendant area 620. When the appendant is carried out for the appendant area 620, the physical address of the address managing portion 521 comes to specify the address in the appendant area 620. It is noted that the appendant area 620 is an example of a third storage area described in the appended claims.

The second ECC storage area 630 is a storage area in which the second ECC corresponding to the data stored in the normal access area 610 is stored. In this case, the second ECC having N bytes is generated for the data having 4N bytes in the normal access area 610 and is then stored in the second ECC storage area 630. It is noted that the second ECC storage area 630 is an example of a second storage area described in the appended claims.

The appendant area 620 and the second ECC storage area 630 may be both stored in the same kind of memory as that of normal access area 610. However, for the purpose of executing aggregation processing which will be described later at a high speed, the appendant area 620 and the second ECC storage area 630 may also be both stored in another type of memory. As far as a combination concerned, for example, it is expected that the normal access area 610 is stored in the flash memory 602, and both of the appendant area 620 and the second ECC storage area 630 are stored in the higher-speed NVRAM 601.

Figure 28:
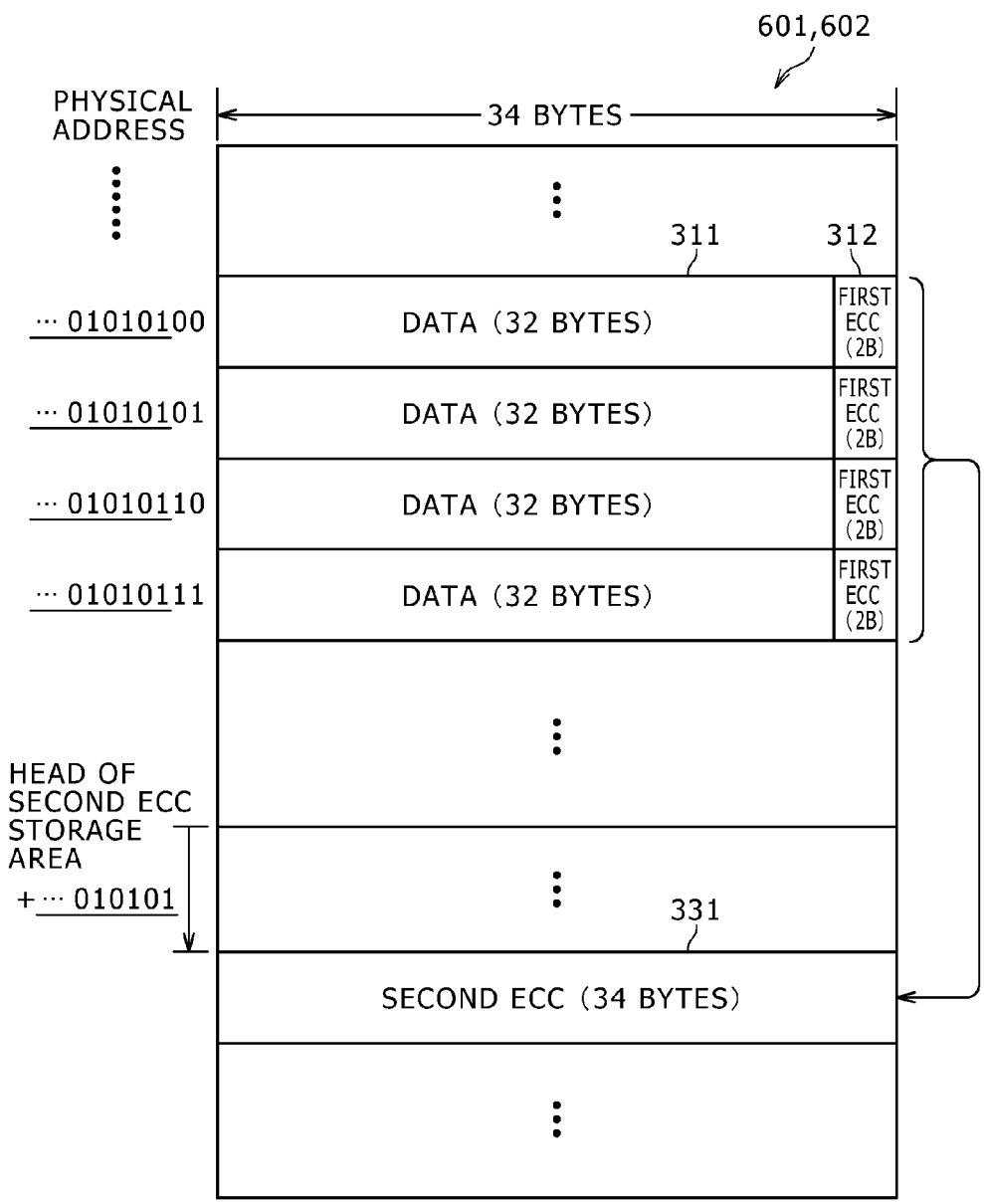
FIG. 28 is a diagram showing a relationship between data in a normal access area, and storage positions of second ECCs in a second ECC storage area in the information processing system according to the second embodiment of the present disclosure.

FIG. 28 is a diagram showing a relationship between the data in the normal access area 610 and the positions where the second ECCs are stored, respectively, in the second ECC storage area 630 in the second embodiment of the present disclosure. As described above, it is supposed that the data can be read out and written from and to the normal access area 610 of either the NVRAM 601 or the flash memory 602 with 34 bytes as unit data and thus the physical address is allocated to the normal access area 610 of either the NVRAM 601 or the flash memory 602 every 34 bytes.

The unit data having 32 bytes, for example, is composed of data 311 having 32 bytes, and the first ECC 312 of the data concerned. That is to say, the first ECC having 2 bytes is added to the data having 32 bytes in the normal access area 610. It is noted that in general, Expression (5) holds:

$$A+B \leq N \quad (5)$$

where N is bytes of the unit data width of the normal access area 610, A is bytes of the data size, and B is bytes of the size of the given first ECC.

In addition, for example, it is supposed that the second ECC 331 having 34 bytes is given to the four pieces of unit data. The second ECC 331 having 34 bytes is stored in the second ECC storage area 630. It is noted that in general, Expression (6) holds:

$$C \leq N \quad (6)$$

where C is bytes of the size of the given second ECC.

In the second embodiment of the present disclosure, it is supposed that the storage positions of the second ECCs 331 in the second ECC storage area 630 are uniquely fixed from the physical addresses in the normal access area 610. For example, four pieces of unit data in which the last 2 bits of the physical addresses which are expressed by the binary notation are "00," "01," "10," and "11," respectively, and other physical address portions agree with one another correspond to one second ECC. Also, a portion except for the last 2 bits in the physical address is treated as an offset and under this condition, a position where the value of the offset is added from the head of the second ECC storage area 630 becomes the storage position of the second ECC 331. That is to say, the storage position of the second ECC 331 in the second ECC storage area 630 is uniquely fixed from the physical address of the data in the normal access area 610.

[Address Mapping Table]

FIG. 29 is a diagram showing a structure of the address mapping table of the address managing portion 521 in the information processing system according to the second embodiment of the present disclosure.

The address managing portion 521 stores the logical addresses, the physical addresses, the second ECC flags, and the old physical addresses such that the logical addresses, the physical addresses, the second ECC flags, and the old physical addresses are made to correspond to one another with respect to the pieces of unit data. The logical address is the logical address which is used in the host computer 100. The physical address is the physical address of the unit data in the memory 600.

The second ECC flag is the flag representing whether or not the second ECC corresponding to the unit data is stored in the second ECC storage area 630. For example, when the second ECC corresponding to the unit data is stored in the second ECC storage area 630, the second ECC flag represents "True." On the other hand, when the second ECC corresponding to the unit data is not stored in the second ECC storage area 630, the second ECC flag represents "False." When the second ECC is stored, the storage position of the second ECC 331 in the second ECC storage area 630, as described above, is uniquely fixed from the physical address of the data in the normal access area 610.

When the data corresponding to the logical address is appended to the appendant area 620, the old physical address represents the physical address, of the data before the appendant, in the normal access address area 610. As a result, the storage position of the unit data before the appendant can be specified to be utilized for the regeneration of the second ECC.

[Processing Procedure of Write Processing]

Figure 30:
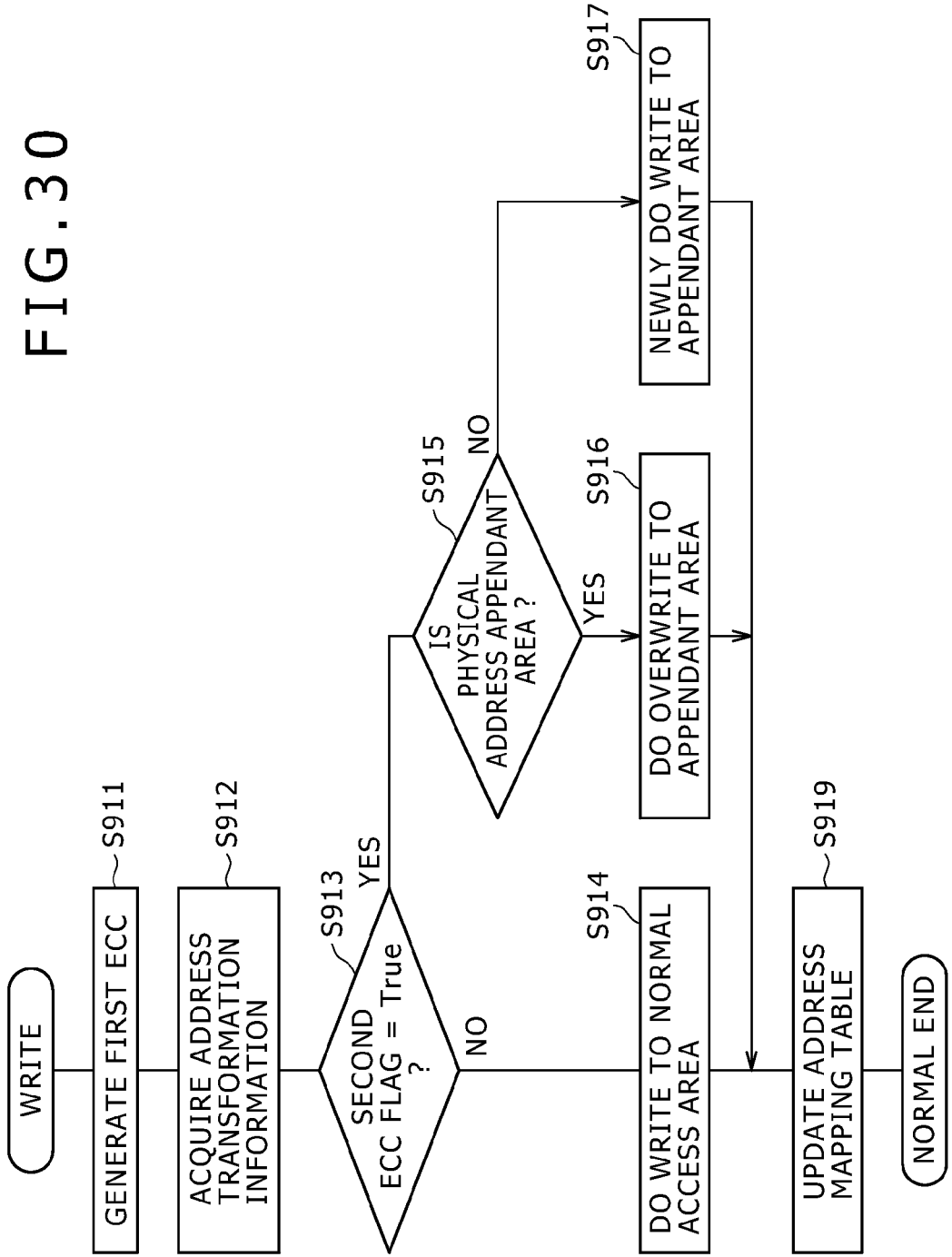
FIG. 30 is a flow chart explaining a processing procedure of write processing in the information processing system according to the second embodiment of the present disclosure.

FIG. 30 is a flow chart explaining a processing procedure of write processing in the second embodiment of the present disclosure. When the memory controlling portion 500 has received the write command from the host computer 100, the memory controlling portion 500 starts the write processing. The write command contains therein the logical addresses each becoming an object of write. In addition, the write command is followed by write data. The error correction processing portion 534 generates the first ECC for the write data (Step S911).

The control portion 511 acquires the address transformation information by referring to the address mapping table of the address managing portion 521 based on the logical address(es) of the write command (Step S912). The address transformation information is information composed of the logical addresses, the physical addresses, the second ECC flags, and the old physical addresses which are previously described with reference to FIG. 29. Here, when the second ECC flag represents "False" (that is, no second ECC is given) (Step S913: No), both of the write data and the first ECC are written to the normal access area 610 (Step S914). At this time, if the normal access area 610, for example, is composed of a non-volatile memory to which the overwrite can be carried out like a ReRAM, a PCRAM or an MRAM, then, the overwrite can be carried out to the area of the data before the update. On the other hand, if the normal access area 610, for example, is composed of a non-volatile memory which is of a type unable to carry out the overwrite like a NAND flash memory, the appendant may be carried out to the appendant area 620. When the appendant is carried out to the appendant area 620, the physical address as a destination of the appendant is registered in the address managing portion 521, thereby updating the contents of the address mapping table (Step S919).

Since the second ECC flag represents "True" (that is, the second ECC is given) (step S913: Yes), the appendant is carried out to the appendant area 620 for the purpose of preventing the second ECC from becoming unable to be utilized after completion of the write processing. In this case, when in the address transformation information, the physical address represents the appendant area 620 (Step S915: Yes), since it is proved that the appendant is previously carried out, the overwrite is carried out to the physical address of the appendant area 620 (Step S916). However, at this time, the appendant may be further carried out to other area(s) of the appendant area 620. In this case, the physical address of the destination of the appendant is registered in the address managing portion 521, thereby updating the contents of the address mapping table (Step S919).

When in the address transformation information, the physical address does not represent the appendant area 620 (Step S915: No), the appendant is newly carried out to the appendant area 620 (Step S917). Also, the physical address of the destination of the appendant is registered in the address managing portion 521, thereby updating the contents of the address mapping table (Step S919).

For the purpose of continuously using the second ECC in the second ECC storage area 630 in such a manner, the old data is left in the normal access area 610 and the new data is appended to the appendant area 620. Although the appended portion is applied to only the first ECC, and no second ECC is given, the second ECC can be applied to a portion other than that appended portion together with the data which is left without being erased. Since the appended portion is a portion which is relatively, newly added and written as compared with any of other portions, it is expected that the possibility that a problem is caused is low because the appended portion is relatively excellent in data holding characteristics.

[Processing Procedure of Read Processing]

Figure 31:
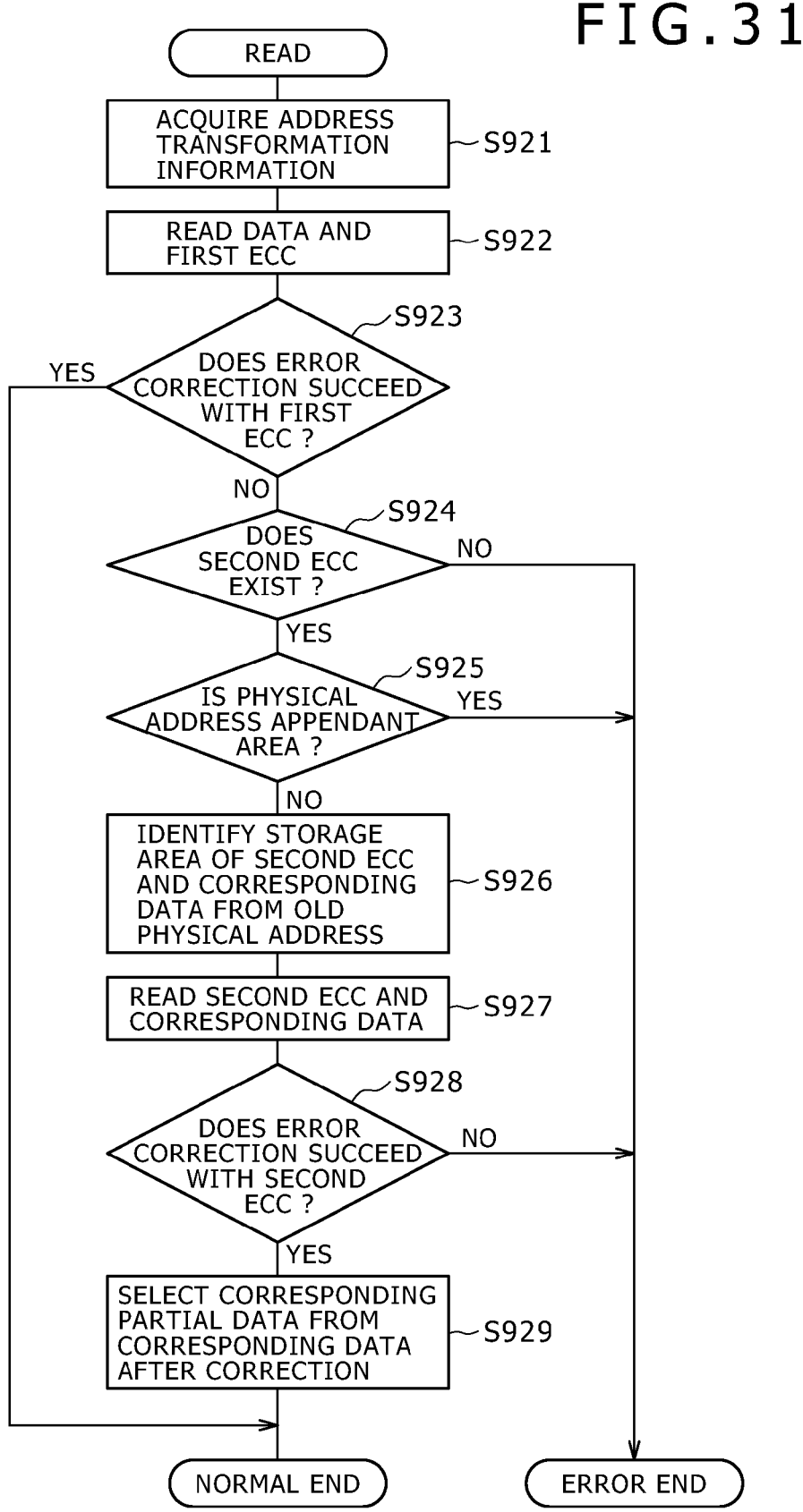
FIG. 31 is a flow chart explaining a processing procedure of read processing in the information processing system according to the second embodiment of the present disclosure.

FIG. 31 is a flow chart explaining a processing procedure of read processing in the information processing system according to the second embodiment of the present disclosure. When the memory controlling portion 500 has received the read command from the host computer 100, the memory controlling portion 500 starts the read processing. The read command contains therein the logical addresses each becoming an object of read.

The control portion 511 acquires the address transformation information by referring to the address mapping table of the address managing portion 521 based on the logical address(es) of the read command (Step S921). The address transformation information is information composed of the logical addresses, the physical addresses, the second ECC flags, and the old physical addresses which are previously described with reference to FIG. 29.

Also, the control portion 511 reads out the unit data from the memory 600 based on the physical address of the address transformation information (Step S922). The data as the object of the read, and the first ECC thereof are both contained in the unit data.

The error detection and correction are both carried out based on the data read out, and the first ECC. In this case, when no error is detected or the correction of the error detected succeeds (Step S923: Yes), this read processing normally ends. On the other hand, when the correction of the error which has been detected based on the first ECC fails (Step S923: No), the error correction based on the second ECC is tried. At this time, when the second ECC flag of the address transformation information represents "False" (Step S924: No), since it may be impossible to carry out the error correction based on the second ECC, this read processing becomes the error end. In addition, even when the second ECC flag of the address transformation information represents "True" (Step S925: Yes), if the physical address of the address transformation information corresponds to the appendant area 620 (Step S925: Yes), since it may be impossible to utilize the second ECC, the read processing becomes the error end. During the error end, the host computer 100 is informed of generation of the read error, thereby stopping the read processing.

When it is possible to utilize the second ECC, the data group (for example, the 4N byte data described above) becoming the object of the second ECC, and the storage area of the second ECC are both identified from the old physical address of the address transformation information (Step S926). As a result, the data group becoming the object of the second ECC is read out from the normal access area 610, and the corresponding second ECC is read out from the second ECC storage area 630 (Step S927). The error correction for the data group is carried out based on the second ECC thus read out. When the error correction for the data group succeeds (Step S928: Yes), the data as the object of the read is selected from the data group after completion of the correction (Step S929). On the other hand, when the error correction for the data group fails (Step S928: No), the read processing becomes the error end.

[Processing Procedure of Aggregation Processing]

The description given until now shows that write and read can be realized without recalculating the second ECC each time by partially updating the data due to the appendant. However, if the partial update of the data is repetitively carried out, the appended data, the data left for calculating the second ECC, and the information for the management are accumulated. As a result, the storage capacitance is consumed more than necessary. For the purpose of suppressing this, it is necessary to execute aggregation processing such that the old data is abandoned at a certain timing, the second ECC is recalculated, and the management information is updated. With regard to the timing at which the aggregation processing starts to be executed, the following various kinds of timings are expected.

Firstly, there is expected the time when the host computer 100 issues an explicit instruction to add the second ECC. This case is realized in accordance with the control command issued from the host computer 100. In addition, there is expected the time when a total sum of pieces of data appended reaches a predetermined size. Here, the predetermined size either may be a fixed size in the memory system 401, or may be a size which is specified as a parameter from the host computer 100. In addition, a predetermined size may be dynamically changed from a total use amount of the memory being used, including other factors.

As far as another timing concerned, there is expected the time when a given time has elapsed after completion of the appendant. The given time can be detected by a built-in timer or the like of the peripheral circuit 550. In addition, the aggregation processing may be executed when during the read, the correction becomes impossible based on the first ECC and thus the correction needs to be carried out based on the second ECC. As described above, it is expected that the aggregation processing is executed at the various kinds of timings.

Figure 32:
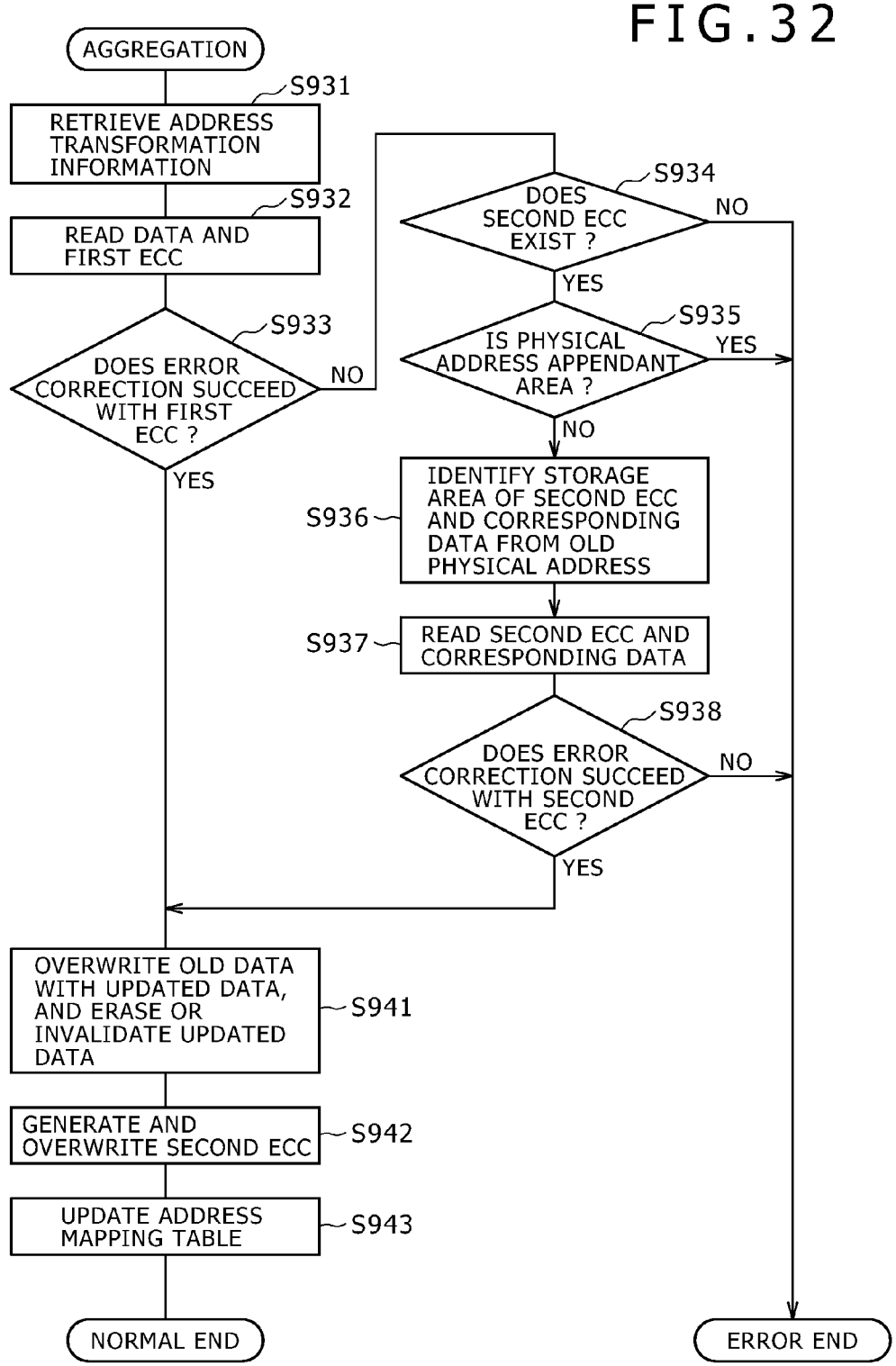
FIG. 32 is a flow chart explaining a processing procedure of aggregation processing in the information processing system according to the second embodiment of the present disclosure.

FIG. 32 is a flow chart explaining a processing procedure of the aggregation processing in the information processing system according to the second embodiment of the present disclosure. When the aggregation processing starts at the timing as described above, the control portion 511 retrieves the area in which the appendant is being carried out by referring to the address mapping table of the address managing portion 521 (Step S931). When in the address managing portion 521, the old physical address represents the valid value, this represents that the appendant is being carried out. Also, it is possible to identify the storage position of the data group (for example, the 4N byte data described above) becoming the object of the second ECC including the retrieved area, and the second ECC thereof.

Also, of the data group thus identified, the unit data to which no appendant is carried out is read out from the normal access area 610, and the appended unit data is read out from the appendant area 620 (Step S932). At this time, in the case where the error detection for the data based on the first ECC is carried out with respect to the unit data, and either no error is detected or the error correction based on the first ECC succeeds even when the error is detected (Step S933: Yes), the operation proceeds to processing in next Step S941.

On the other hand, when the error correction fails (Step S933: No), the error correction based on the second ECC is tried. At this time, when the second ECC flag of the address transformation information represents "False" (Step S934: No), since it may be impossible to carry out the error correction based on the second ECC, the aggregation processing becomes the error end. In addition, even in the case where the second ECC flag represents "True" (Step S934: Yes), when the physical address of the address transformation information corresponds to the appendant area 620 (Step S935: Yes), since it may be impossible to utilize the second ECC, the aggregation processing becomes the error end. During the error end, the host computer 100 is informed of the generation of the aggregation processing error, thereby stopping the aggregation processing.

When the second ECC is utilized, the storage area of the data group (for example, the 4N byte data described above) becoming the object of the second ECC, and the second ECC is identified from the old physical address of the address transformation information (Step S936). As a result, the data group becoming the object of the second ECC is read out from the normal access area 610, and the corresponding second ECC is read out from the second ECC storage area 630 (Step S937). Then, the error correction for the data group is carried out based on the second ECC thus read out. When the error correction for the data group succeeds (Step S938: Yes), the operation proceeds to processing in next Step S941. On the other hand, when the error correction for the data group fails (Step S938: No), the aggregation processing becomes the error end.

When the error correction based either on the first ECC or on the second ECC succeeds (Step S933 or S938: Yes), the old data area of the normal access area 610 is overwritten with the appended data in the appendant area 620 (Step S941). Also, the appended data in the appendant area 620 is either erased or invalidated, thereby releasing a used area of the appendant area 620. In addition, the second ECC is recalculated based on the data group becoming the object of the new second ECC stored in the normal access area 610 and is then overwritten to the second ECC storage area 630 (Step S942). In addition, along with this processing, the contents of the address mapping table of the address managing portion 521 are updated (Step S943).

As described above, according to the second embodiment of the present disclosure, when the update is generated in part of the data which is stored in the normal access area 610, and which becomes the object of the second ECC, the appendant can be carried out to the appendant area 620 while the second ECC is maintained in the fixed position of the second ECC storage area 630. As a result, the recalculation for the second ECC can be made unnecessary, and the error correction can be carried out based on the data before the update. In addition, although only the first ECC is used with respect to the appended data in the appendant area 620, since the appended data in the appendant area 620 is the data which has been relatively, newly written, it is expected that the case where the second ECC is required is rare.

4. Third Embodiment

[Configuration of Information Processing System]

Figure 33:
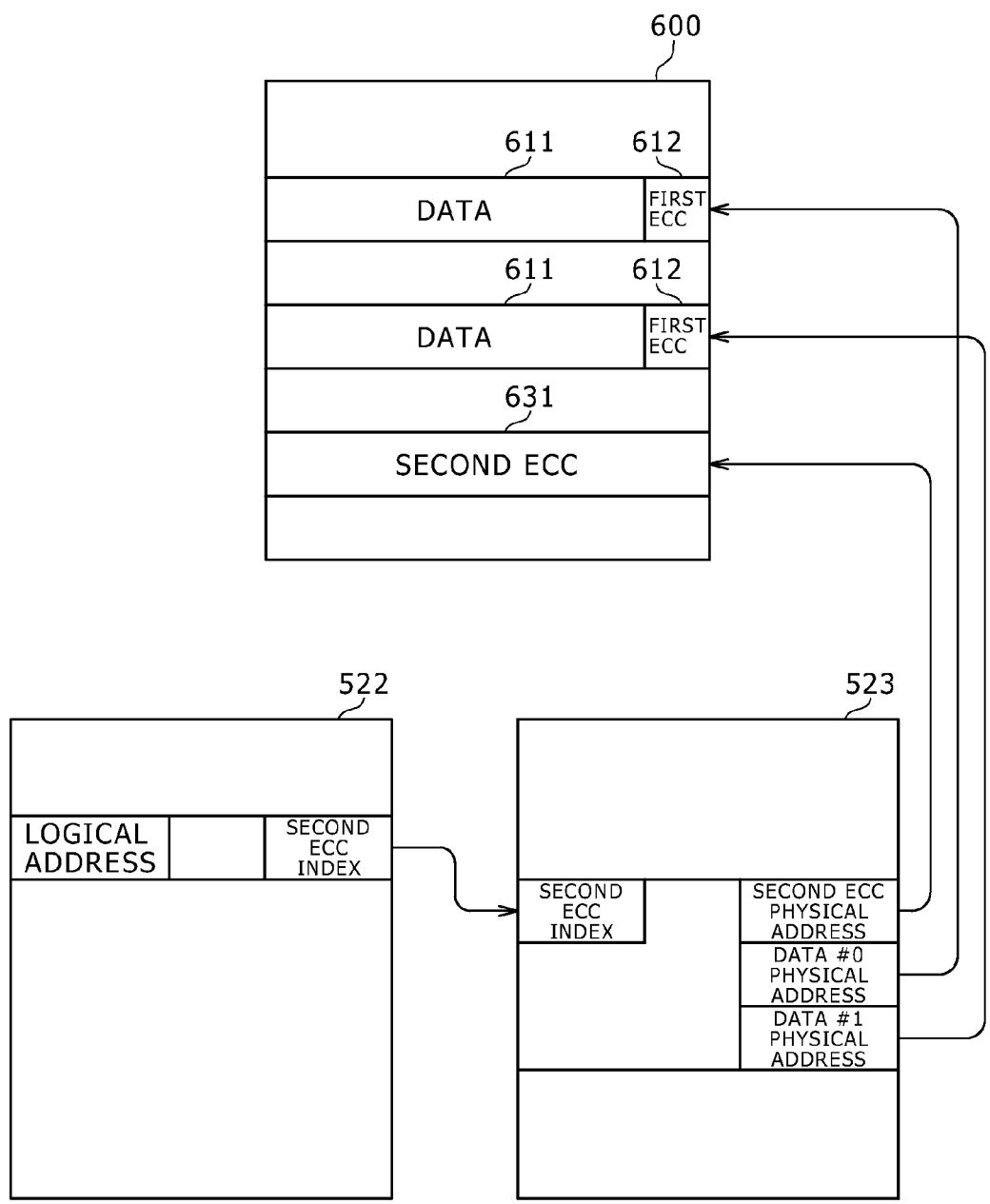
FIG. 33 is a diagram showing a management form of a memory in an information processing system according to a third embodiment of the present disclosure.

FIG. 33 is a block diagram showing a configuration of a memory 600 in an information processing system according to a third embodiment of the present disclosure. Although it is supposed in the second embodiment that the data group becoming the object of the second ECC, and the storage position of the second ECC show the fixed relationship, it is supposed in the third embodiment that the relationship between the data group and the storage position can be suitably set. It is noted that the configuration of the memory system as the supposition is the same as that in the second embodiment described with reference to FIGS. 25 and 26.

In this case as well, data which is obtained by adding the first ECC of the data 311 to the data 311 is treated as the unit data. The physical address of the unit data in the normal access area 610, and the physical address of the second ECC in the second ECC storage area 630 are both managed by the address mapping table 522 and the second ECC managing table 523. Both of the address mapping table 522 and the second ECC managing table 523 are stored in the address managing portion 521.

The address mapping table 522 is a table for managing a correspondence relationship between the logical addresses and the physical addresses. In this case, the address mapping table 522 holds therein indices of the second ECC managing table 523 corresponding to the logical addresses.

The second ECC managing table 523 is a table for managing the second ECCs. In this case, the second ECC managing table 523 holds therein the physical address of the second ECC, and the physical address of the unit data corresponding to the second ECC concerned every entry. Also, the indices (the second ECC indices) are given to the entries, respectively.

[Structure of Address Mapping Table]

FIG. 34 is a diagram showing a structure of an address mapping table 522 of the memory 600 in the information processing system according to the third embodiment of the present disclosure. The address mapping table 522 holds therein the logical addresses, the physical addresses, the data flags, the second ECC flags, and the second ECC indices such that the logical addresses, the physical addresses, the data flags, the second ECC flags, and the second ECC indices are associated with one another.

The logical address is an address in the memory 600 specified in the host computer 100. The physical address is a physical address in the memory 600. It is noted that in this case, each of the logical addresses and the physical addresses is represented by a method of describing a hexadecimal number beginning with "0x."

The data flag is a flag representing whether or not both of the data and the first ECC are stored in the corresponding physical address. When the data flag represents "True," the data flag represents that both of the data and the first ECC are written to the corresponding physical address. On the other hand, when the data flag represents "False," the data flag represents that none of the data and the first ECC is written to the corresponding physical address. The data which is read out from the physical address in which the data flag represents "False" becomes an initial value in the memory. It is noted that in the case of the NAND flash memory, all of the bits become "1" in the initial value in the memory.

The second ECC flag is a flag representing whether or not the second ECC is given to the data stored in the corresponding physical address. When the second ECC flag represents "True," the second ECC flag represents that the second ECC is given to the data stored in the corresponding physical address to reinforce the data holding characteristics. On the other hand, when the second ECC flag represents "False," the second ECC flag represents that no second ECC is given to the data stored in the corresponding physical address.

The second ECC index is a valid value when the second ECC flag represents "True," and the second ECC indices given to the entries of the second managing table 342, respectively, are held. In the case shown in FIG. 34, "$Z_i$" is held as the second ECC index in each of the entries 710, 711, 712, and 713 of the address mapping table 341.

[Structure of Second ECC Managing Table]

Figure 35:
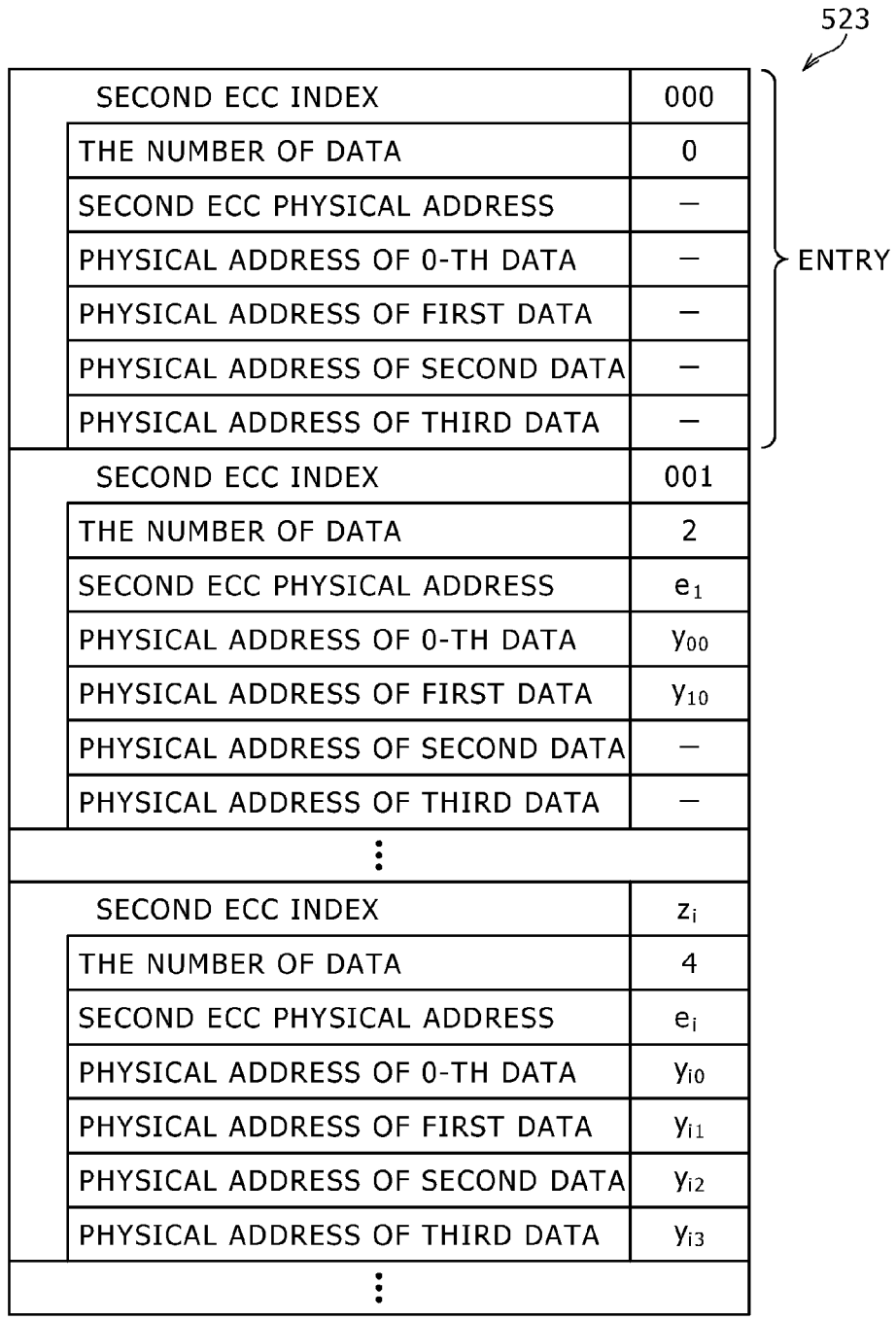
FIG. 35 is a diagram showing a structure of a second ECC managing table in the information processing system according to the third embodiment of the present disclosure.

FIG. 35 is a diagram showing a structure of the second ECC managing table 523 of the memory 600 in the information processing system according to the third embodiment of the present disclosure. In the second ECC managing table 342, the second ECC index, the number of data, the second ECC physical address, and the physical addresses of 0-th to third pieces of data are held in each of the entries.

The second ECC index serves to hold an index used to identify the entry of the second ECC managing table 523. A value of the second ECC index is held in the corresponding entry of the address mapping table 522, whereby the address mapping table 522 and the second ECC managing table 523 are associated with each other.

The number of data represents the number of data contained in the corresponding entry.

The second ECC physical address is used to hold therein the physical address in which the second ECC of the data contained in the corresponding entry is stored.

The physical addresses of 0-th to third pieces of data are used to hold therein the physical addresses of the data contained in the corresponding entry in order. Of the physical addresses of 0-th to third pieces of data, only the physical address(es) corresponding to the number of which is represented by the number of data described above is(are) valid. In this case, since in the entry in which the second ECC index is "001," the number of data represents "2," only the two physical addresses of 0-th and first pieces of data are valid. In addition, since in the entry in which the second ECC index is "000," the number of data represents "0," all of the physical addresses of the 0-th to third pieces of data are invalid.

[Processing Procedure of Write Processing]

Figure 36:
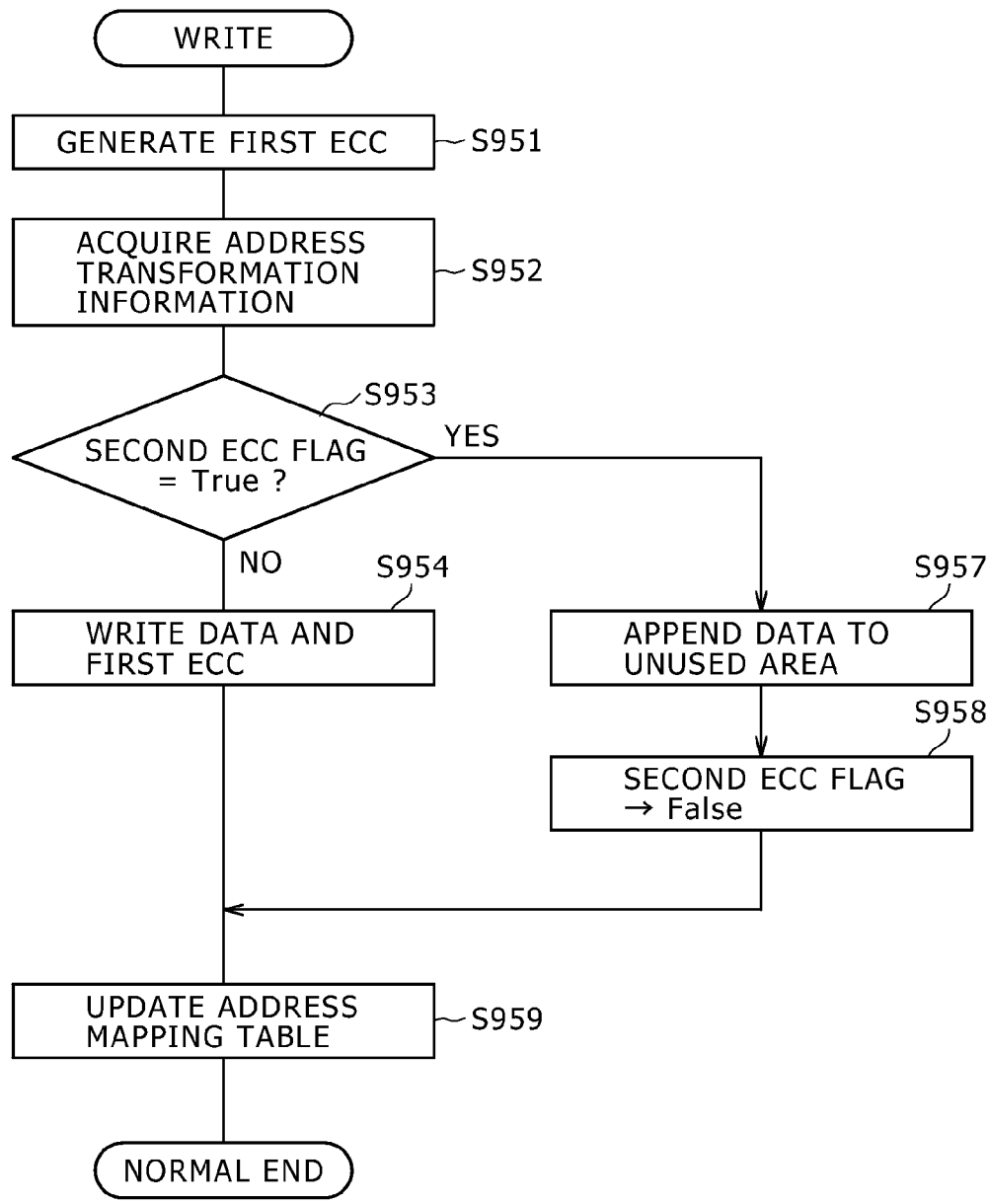
FIG. 36 is a flow chart explaining a processing procedure of write processing in the information processing system according to the third embodiment of the present disclosure.

FIG. 36 is a flow chart explaining a processing procedure of write processing in the information processing system according to the third embodiment of the present disclosure. When the memory controlling portion 500 has received the write command from the host computer 100, the memory controlling portion 500 starts the write processing. The write command contains therein the logical address as the object of the write. In addition, the write command is accompanied by the write data. The error correction processing portion 534 generates the first ECC for the write data (Step S951).

The control portion 511 acquires the address transformation information by referring to the address mapping table 522 of the address managing portion 521 based on the logical address of the write command (Step S952). The address transformation information is information composed of the logical addresses, the physical addresses, the data flags, the second ECC flags, and the second ECC indices which are previously described with reference to FIG. 34. Here, when the second ECC flag represents "False" (that is, no second ECC is given) (Step S953: No), both of the write data and the first ECC are written to the normal access area 610 (Step S954). At this time, if the normal access area 610, for example, is composed of a non-volatile memory to which the overwrite can be carried out like a ReRAM, a PCRAM or an MRAM, then, the overwrite can be carried out to the area of the data before the update. On the other hand, if the normal access area 610, for example, is composed of a non-volatile memory which is of a type unable to carry out the overwrite like a NAND flash memory, the appendant may be carried out to the appendant area 620. When the appendant may be carried out to the appendant area 620. When the appendant is carried out, the physical address of a destination of the appendant is registered in the address mapping table 522, thereby updating the contents of the address mapping table 522 (Step S959).

Since the second ECC flag represents "True" (that is, the second ECC is given) (Step S953: Yes), the new data is written together with the first ECC thereof to the memory 600 (Step S957). In this case, the new operation of the memory 600 in the third embodiment is different from that described above in that for the non-volatile memory as well to which the overwrite can be carried out, the appended write is carried out to another empty area. For the non-volatile memory which is of the type unable to carry out the overwrite like the NAND flash memory, likewise, the appendant is carried out to the empty area the data in which is previously erased. The reason for this is because the correction is carried out for the area which is given the second ECC flag based on the second ECC, and thus data before completion of the update is required. For this reason, the old data before completion of the update, and the first ECC and the second ECC thereof are all kept without carrying out the erase, the overwrite or the like.

Also, the physical address in the address mapping table 522 are updated to the physical address to which the data is newly appended as may be necessary. In addition, concurrently with this, the second ECC flag for the data newly written is set to "False" (Step S958). The reason for this is because the second ECC is not applied to the appended data. However, the second ECC indices are left as they are without being deleted. The address mapping table 522 is maintained such that the newest physical addresses are usually held (Step S959). As a result, the contradiction with the second ECC managing table 523 as will be described later can be detected from two pieces of information such that the second ECC flag represents "False," and the second ECC indices exist.

In the description given until now, none of special items is applied to the second ECC managing table 523. As a result, in the case where the error correction fails based on the first ECC when the remaining data which is not updated in the normal access area 610 to which the second ECC is applied is read out, the error correction can be carried out based on the information in the second ECC managing table 523. Even when a change is added to the data to which the second ECC is applied, the second ECC needs not to be recalculated due to addition of the change.

The second ECC is not given to the data which was later changed and appended. However, the data concerned is data which has been relatively, newly written as compared with the remaining data not updated, and thus it is expected that the reliability can be sufficiently secured even with only the first ECC.

It is noted that, for example, when the data to which the second ECC is applied is stored in the NAND flash memory, if the appended data is stored in the higher-speed ReRAM, it is possible to realize the speeding up of the aggregation processing.

[Processing Procedure of Read Processing]

Figure 37:
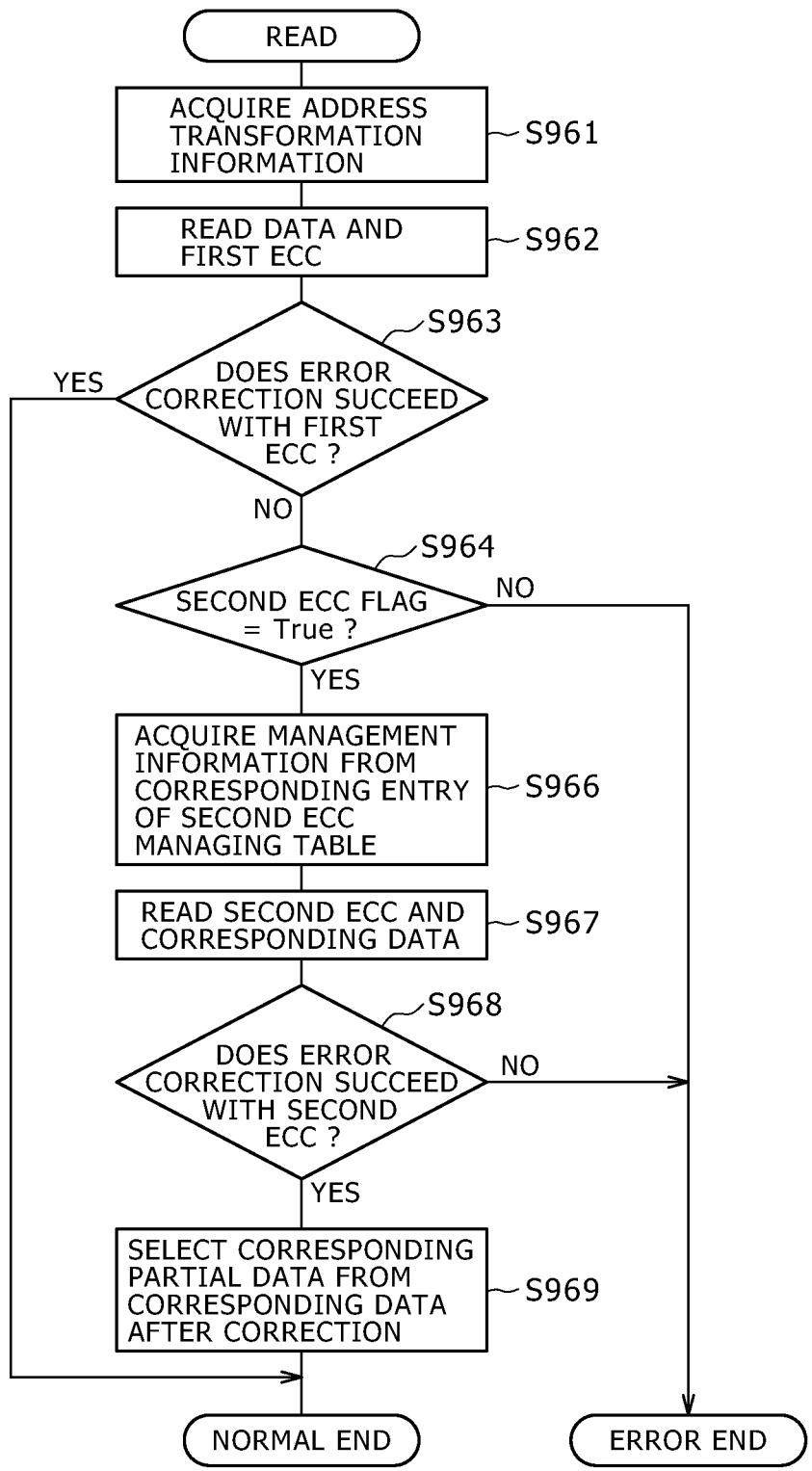
FIG. 37 is a flow chart explaining a processing procedure of read processing in the information processing system according to the third embodiment of the present disclosure.

FIG. 37 is a flow chart explaining a processing procedure of read processing in the information processing system according to the second embodiment of the present disclosure. When the memory controlling portion 500 has received the read command from the host computer 100, the memory controlling portion 500 starts the read processing. The read command contains therein the logical addresses each becoming an object of read.

The control portion 511 acquires the address transformation information by referring to the address mapping table 341 based on the logical address(es) of the write command (Step S961). The address transformation information is information composed of the logical addresses, the physical addresses, the data flags, the second ECC flags, and the second ECC indices which are previously described with reference to FIG. 34.

Also, the control portion 511 reads out the write data from the memory 600 based on the physical address of the address transformation information (Step S962). The data as the object of the read, and the first ECC thereof are both contained in the unit data.

The error detection and correction are both carried out based on the data read out, and the first ECC. In this case, when either no error is detected or the correction of the error detected succeeds (Step S963: Yes), this read processing normally ends. On the other hand, when the correction of the error which has been detected based on the second ECC fails (Step S963: No), the error correction based on the second ECC is tried. At this time, when the second ECC flag of the address transformation information represents "False" (Step S964: No), since it may be impossible to carry out the error correction based on the second ECC, this read processing becomes the error end. During the error end, the host computer 100 is informed of generation of the read error, thereby stopping the read processing.

On the other hand, when the second ECC flag represents "True" (step S964: Yes), the corresponding entry, of the second ECC managing table 523, which is specified by the second ECC index is not changed. Management information is acquired from the entry not changed (Step S966). The management information described herein is the number of data, the second ECC physical address, and the physical addresses of the 0-th to third pieces of data. The storage area of the data group (for example, the 4N byte data described above) becoming the object of the second ECC, and the second ECC is identified from the management information. As a result, the data group becoming the object of the second ECC is read out from the normal access area 610, and the corresponding second ECC is read out from the second ECC storage area 630 (Step S967).

The error correction is carried out based on the second ECC thus read out. When the error correction succeeds (Step S968: Yes), the data as the object of the read is selected from the data group after completion of the correction (Step S969). On the other hand, when the error correction fails (Step S968: No), the read processing becomes the error end.

[Processing Procedure of Aggregation Processing]

The description given until now shows that write and read can be realized without recalculating the second ECC on a case-by-case basis by partially updating the data due to the appendant. Additionally, it is unnecessary to add any of special items to the second ECC managing table 523, and how to use is devised, thereby making the efficient mounting possible. However, the third embodiment is identical to the second embodiment in that when the partial update of the data is repetitively carried out, it is necessary to execute the aggregation processing. In addition, the third embodiment is identical in timing at which the aggregation processing is started to the second embodiment.

Figure 38:
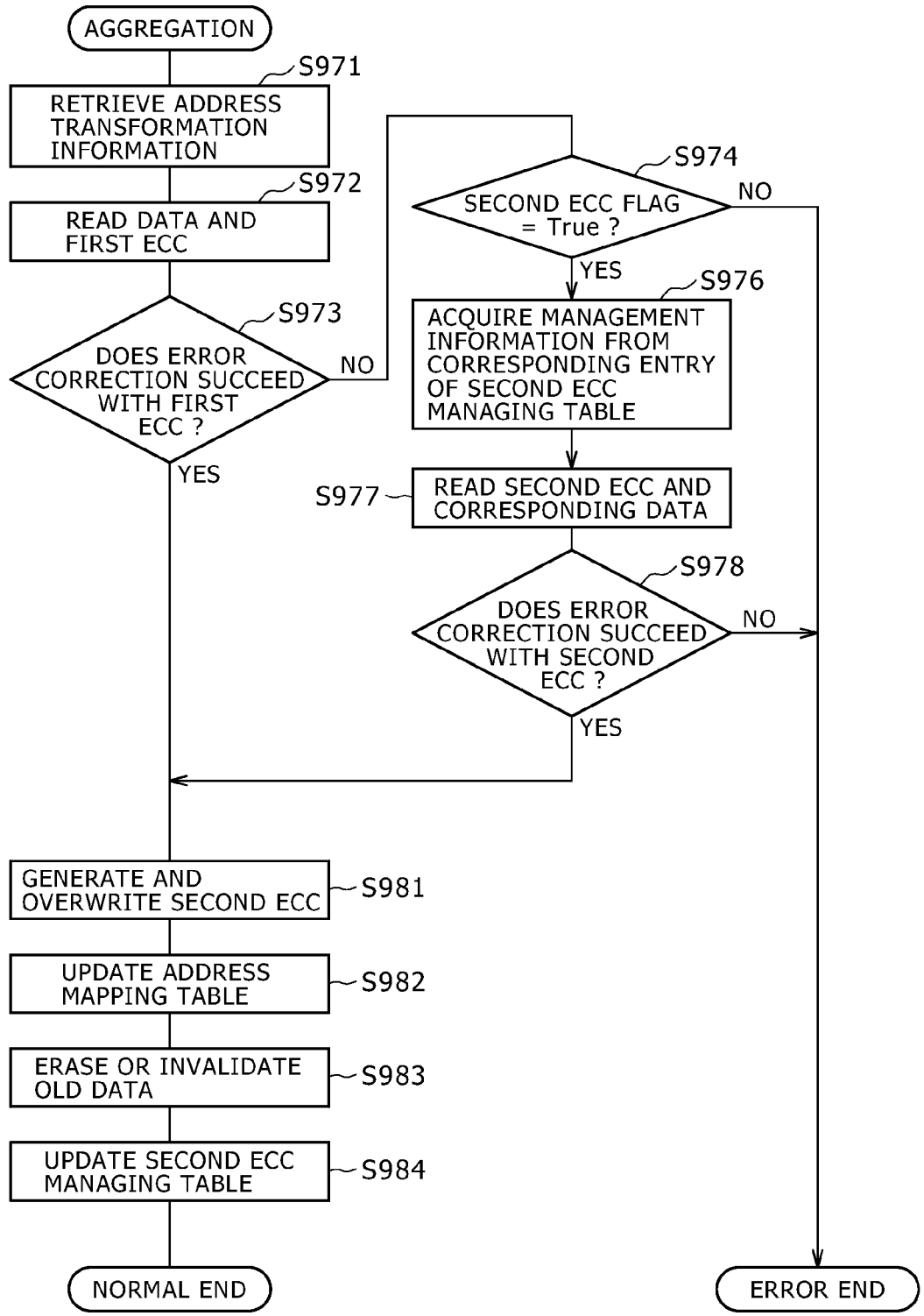
FIG. 38 is a flow chart explaining a processing procedure of aggregation processing in the information processing system according to the third embodiment of the present disclosure.

FIG. 38 is a flow chart explaining a processing procedure of the aggregation processing in the information processing system according to the third embodiment of the present disclosure. When the aggregation processing starts, the control portion 511 retrieves the area in which the appendant is being carried out by referring to the address mapping table 522 (Step S971). The entry such that in the address mapping table 522, the second ECC flag represents "False," and the second ECC index exists represents the area in which the appendant is being carried out, and becomes the object of the retrieval. Also, the physical addresses of the entry having the same second ECC index as that represented by the retrieved entry are collected, thereby acquiring a physical address list of the data group (for example, the 4N byte data described above) becoming the object of the second ECC.

The data group becoming the object of the second ECC is read out based on the physical addresses, of the data group becoming the object of the second ECC, which have been acquired in such a manner (Step S972). At this time, in the case where the error detection for the data based on the first ECC is carried out with respect to the unit data, and either no error is detected or the error correction based on the first ECC succeeds even when the error has been detected (Step S973: Yes), the operation proceeds to processing in next Step S981.

On the other hand, when the error correction fails (Step S973: No), the error correction based on the second ECC is tried. At this time, when the second ECC flag of the address transformation information represents "False" (Step S974: No), since it may be impossible to carry out the error correction based on the second ECC, the aggregation processing becomes the error end. During the error end, the host computer 100 is informed of the generation of the aggregation processing error, thereby stopping the processing.

In addition, when the second ECC flag represents "True" (Step S974: Yes), the management information on the second ECC managing table 523 represented by the second ECC index of the entry concerned is acquired (Step S976). Also, the data group becoming the object of the second ECC, and the second ECC corresponding thereto are both read out based on that management information (Step S977). The error correction for the data group is carried out based on the second ECC thus read out. When the error correction for the data group succeeds (Step S978: Yes), the operation proceeds to processing in next Step S981. On the other hand, when the error correction for the data group fails (Step S978: No), the aggregation processing becomes the error end.

When the error correction succeeds either based on the first ECC or based on the second ECC (Step S973 or S978: Yes), the second ECC is calculated based on the physical address list acquired in the processing in Step S971 (Step S981). The second ECC thus calculated is stored in the area represented by the second physical address of the management information. Also, in the address mapping table 522, the second ECC flag of the appended data is set to "True" (Step S982).

Next, the old data is erased, or the memory area of the old data is released to be able to be reutilized (Step S983). The physical address(es) which is(are) proved to be absent in the second ECC managing table 523 newly generated as a result of comparing the physical address in the second ECC managing table 523 newly generated and the physical address in the previous second ECC managing table 523 with each other becomes(become) an object of this processing.

Finally, the physical address list acquired in the processing in Step S971, and the physical addresses to which the new second ECC is written are registered as a new entry, and the old entry is deleted instead (Step S984). At this time, the old second ECC index may be reutilized. When the new second ECC index is given, it is necessary to update the second ECC index as well of the address mapping table 522.

It is noted that when the data to which the second ECC is applied is stored in the NAND flash memory, if the appended portion is stored in the NVRAM from/to which the data can be read out/written at the higher speed than that in the NAND flash memory, it is possible to realize the speeding up of the aggregation processing.

As has been described, according to the third embodiment of the present disclosure, when the update is generated in part of the data stored in the normal access area 610 becoming the object of the second ECC, the appendant can be carried out to the appendant area 620 while the second ECC is maintained in the variable position of the second ECC storage area 630.

5. Modified Change of Third Embodiment

[Cache of Data as Object of Second ECC]

When during the reading of the data, it may be impossible to carry out the error correction based on the first ECC and thus the error correction must be carried out based on the second ECC, the possibility that the data becoming the object of the second ECC is accessed again is high from the viewpoint of either the spatial locality or the temporal locality. Then, it is effective that after completion of the error correction based on the second ECC, the object data is cached in the higher-speed built-in memory 520 or volatile memory 603. As a result, the high-speed memory access can be realized as a whole.

[Preventive Rewrite]

When during the reading-out of the data, it may be impossible to carry out the error correction based on the first ECC and thus the error correction must be carried out based on the second ECC instead, it is thought that there is shown the sign that the holding characteristics of the data becoming the object of the second ECC is reduced. Then, while the error correction can be carried out based on the second ECC, it is effective that the data is preventively rewritten. During the rewrite, either the overwrite may be carried out to the same storage area, or the rewrite may be carried out to any other suitable empty area. It is noted that this technique is based on the same method of thinking as that called either Read Reclaim or Read Refresh.

It is noted that the embodiments described above merely show examples for embodying the present disclosure, and the matters in the embodiments and the matters specifying the present disclosure in the appended claims have the correspondence relationship. Likewise, the matters specifying the present disclosure in the appended claims, and the matters in the embodiments of the present disclosure to which the same names as those in the matters specifying the present disclosure in the appended claims are added have the correspondence relationship. However, the present disclosure is by no means limited to the embodiments described above, and can be embodied by making various changes in the embodiments without departing from the subject matter of the present disclosure.

In addition, the series of processing procedures described in the above embodiments may be grasped as a method having those series of procedures, or may be grasped either as a program in accordance with which a computer is caused to execute those series of procedures or as a recording medium for recording therein the program. A Compact Disk (CD), a MiniDisk (MD), a Digital Versatile Disk (DVD), a memory card, a Blu-ray Disk (registered trademark) or the like can be used as this recording medium.

It is noted that the present disclosure can also adopt the following constitutions.

(1) A storage controller including:

an error correcting code managing portion configured to manage a correspondence relationship between predetermined plural pieces of unit data, and a second error code corresponding to the predetermined plural pieces of unit data every entry when plural pieces of unit data are stored in a storage portion with data and a first error correcting code for the data as unit data and a second error correcting code for the predetermined plural pieces of unit data is stored in the storage portion so as to correspond to the predetermined plural pieces of unit data in the plural pieces of unit data;

an address managing portion configured to manage a correspondence relationship between logical addresses and the entries in the error correcting code managing portion; and an error correcting portion configured to acquire the entry in the error correction managing portion corresponding to the logical address as an object of read from the address managing portion, and carry out error correction based on the predetermined plural pieces of unit data managed in the entry concerned, and the second error correcting code.

(2) The storage controller described in the paragraph (1), in which the predetermined plural pieces of unit data are stored in discontinuous physical addresses in the storage portion.

(3) The storage controller described in the paragraph (1) or (2), in which the address managing portion manages an error correction flag representing whether or not the second error correcting code corresponding to the logical addresses is stored, and the error correcting portion carries out the error correction only when the error correction code flag represents an effect that the second error correcting code is stored.

(4) The storage controller described in any one of the paragraphs (1) to (3), in which the error correcting code managing portion regulates order of coupling the predetermined plural pieces of unit data; and the error correcting portion couples the predetermined plural pieces of unit data in accordance with the coupling order, thereby carrying out the error correction.

(5) The storage controller described in any one of the paragraphs (1) to (4), in which the error correcting code managing portion holds the physical addresses, in the storage portion, of the second error correcting code corresponding to the predetermined plural pieces of unit data; and the error correcting portion acquires the second error correcting code from the storage portion in accordance with the physical address of the second error correcting code.

(6) The storage controller described in the paragraph (5), in which the error correcting code managing portion further holds an intra-physical address offset, in the storage portion, of the second error correcting code corresponding to the predetermined plural pieces of unit data; and the error correcting portion acquires the second error correcting code from the storage portion in accordance with the physical addresses and the intra-physical address offset of the second error correcting code.

(7) The storage controller described in any one of the paragraphs (1) to (6), further including:

an error correcting code generating portion configured to generate the second error correcting code with respect to the data stored in a range of the logical addresses specified by a data holding characteristics reinforcement command when the data holding characteristics reinforcement command is received; and an entry managing portion configured to newly ensure an entry in which a correspondence relationship with the corresponding second error correcting code is held with respect to the data stored in the range of the logical addresses specified by the data holding characteristics reinforcement command in the error correcting code managing portion when the data holding characteristics reinforcement command is received, and register a correspondence relationship between the newly ensured entry and the specified logical addresses in the address managing portion.

(8) The storage controller described in the paragraph (7), in which the entry managing portion releases the entry in which the correspondence relationship with the corresponding second error correcting code is held with respect to the data stored in the range of the logical addresses specified in the data holding characteristics reinforcement releasing command in the error correcting code managing portion when the data holding characteristics reinforcement releasing command is received, and deletes a correspondence relationship between the released entry and the specified logical addresses in the address managing portion.

(9) The storage controller described in the paragraph (7), in which the error correcting code managing portion holds the number of unit data corresponding to the second error correcting code every entry; and the entry managing portion targets at an entry in which the number of unit data represents zero when the entry is newly ensured.

(10) The storage controller described in the paragraph (7), in which the error correcting code managing portion holds the number of unit data corresponding to the second error correcting code every entry; and the entry managing portion targets at an entry in which the number of unit data is smaller than a predetermined number when the entry is newly ensured.

(11) The storage controller described in any one of the paragraphs (1) to (10), in which the address managing portion holds time finally accessed with respect to the logical addresses as final access time, and in which the storage controller further includes:

an error correcting code generating portion configured to generate the second error correcting code with respect to the data stored in the logical addresses when a predetermined period of time elapses from the final access time; and an entry managing portion configured to newly ensure an entry in which a correspondence relationship with the corresponding second error correcting code is held with respect to the data stored in the logical addresses in the error correcting code managing portion when a predetermined period of time elapses from the final access time, and register a correspondence relationship between the newly ensured entry and the specified logical addresses in the address managing portion.

(12) The storage controller described in the paragraph (11), in which the entry managing portion releases the entry in which the correspondence relationship with the corresponding second error correcting code is held with respect to the data stored in the logical addresses in the error correcting code managing portion when the second error correcting code is stored for a lapse of predetermined period of time from the final access time, and deletes a correspondence relationship between the released entry and the specified logical addresses in the address managing portion.

(13) A storage device including:

a unit data storing portion configured to store therein plural pieces of unit data with data and a first error correcting code of the data as unit data;

an error correcting code storing portion configured to store therein a second error correcting code of predetermined plural pieces of unit data so as to correspond to the predetermined plural pieces of unit data in the plural pieces of unit data;

an error correcting code managing portion configured to manage a correspondence relationship between the predetermined plural pieces of unit data, and the second error correcting code corresponding to the predetermined plural pieces of unit data every entry;

an address managing portion configured to manage a correspondence relationship between logical addresses and the entries in the error correcting code managing portion; and an error correcting portion configured to acquire the entry, in the error correcting code managing portion, corresponding to the logical address as an object of read from the address managing portion, thereby carrying out error correction based on the predetermined plural pieces of unit data managed in the entry concerned, and the second error correcting code.

(14) The storage device described in the paragraph (13), in which each of the unit data storing portion and the error correcting code storing portion is a non-volatile memory.

(15) An information processing system including:

a unit data storing portion configured to store therein plural pieces of unit data with data and a first error correcting code of the data as a unit;

an error correcting code storing portion configured to store therein a second error correcting code of predetermined plural pieces of unit data so as to correspond to the predetermined plural pieces of unit data in the plural pieces of unit data;

an error correcting code managing portion configured to manage a correspondence relationship between the predetermined plural pieces of unit data, and the second error correcting code corresponding to the predetermined plural pieces of unit data every entry;

an address managing portion configured to manage a correspondence relationship between logical addresses and the entries in the error correcting code managing portion;

an error correcting portion configured to acquire the entry, in the error correcting code managing portion, corresponding to the logical address as an object of read from the address managing portion, thereby carrying out error correction based on the predetermined plural pieces of unit data managed in the entry concerned, and the second error correcting code; and a host computer configured to issue a request to request an access to the unit data storing portion.

(16) A storage controlling method for use in a storage device including a unit data storing portion storing therein plural pieces of unit data with data and a first error correcting code of the data as a unit, an error correcting code storing portion storing therein a second error correcting code of the predetermined plural pieces of unit data so as to correspond to the predetermined plural pieces of unit data in the plural pieces of unit data, an error correcting code managing portion managing a correspondence relationship between the predetermined plural pieces of unit data, and the second error correcting code corresponding to the predetermined plural pieces of unit data every entry, and an address managing portion managing a correspondence relationship between logical addresses and the entries in the error correcting code managing portion, the storage controlling method including:

acquiring the entry, in the error correcting code managing portion, corresponding to the logical address as an object of read from the address managing portion; and carrying out error correction based on the predetermined plural pieces of unit data managed in the acquired entry, and the second error correcting code.

(17) A storage controller including:

an address managing portion configured to manage a correspondence relationship between logical addresses and physical addresses in a first or third storage area of a memory with respect to plural pieces of data when the plural pieces of data and an error correcting code corresponding to the plural pieces of data are stored in the first storage area of the memory, the error correction code is stored in a second storage area of the memory so as to correspond to each predetermined number of the plural pieces of data, and appendant data for any one of the plural pieces of data, and an error correcting code for the appendant data are stored in the third storage area of the memory;

a control portion configured to append the appendant data and an error correcting code for the appendant data to the third storage area with data related to a write request as the appendant data without carrying out rewrite for the first storage area and the storage area when a physical address corresponding to a logical address related to the write request corresponds to the first storage area, and register the physical address in the third storage area to which the appendant data and the error correcting code for the appendant data are appended in the address managing portion; and an error correction processing portion configured to carry out error correction in the appendant data in the third storage area with the appendant data in the third storage area and the error correcting code for the appendant data when the physical address corresponding to the logical address related to a read request corresponds to the third storage area, and carry out error correction in the first storage area with the predetermined number of the plural pieces of data containing therein the data in the first storage area, and the error correcting code in the second storage area when the physical address corresponding to the logical address related to the read request does not correspond to the third storage area.

(18) The storage controller described in the paragraph (17), in which the control portion overwrites the appendant data to the first storage area before the appendant with respect to the appendant data at a predetermined timing; and the error correction processing portion generates the error correcting code from a predetermined number of the plural pieces of data containing therein the data overwritten at the predetermined timing, and stores the error correcting code concerned in the second storage area.

(19) A storage device including:

a memory configured to store plural pieces of data and an error correcting code for the plural pieces of data in a first storage area, store the error correcting code in a second storage area so as to correspond to each predetermined number of the plural pieces of data, and store appendant data for any one of the plural pieces of data, and an error correcting code for the appendant data in a third storage area;

an address managing portion configured to manage a correspondence relationship between logical addresses and physical addresses in the first or third storage area with respect to the plural pieces of data;

a control portion configured to append the appendant data and an error correcting code for the appendant data to the third storage area with data related to a write request as the appendant data without carrying out rewrite for the first storage area and the storage area when a physical address corresponding to the logical address related to the write request corresponds to the first storage area, and register the physical address in the third storage area to which the appendant data and the error correcting code for the appendant data are appended in the address managing portion; and an error correction processing portion configured to carry out error correction in the appendant data in the third storage area with the appendant data in the third storage area and the error correcting code for the appendant data when the physical address corresponding to the logical address related to a read request corresponds to the third storage area, and carry out error correction in the first storage area with the predetermined number of the plural pieces of data containing therein the data in the first storage area, and the error correcting code in the second storage area when the physical address corresponding to the logical address related to the read request does not correspond to the third storage area.

(20) The storage device described in the paragraph (19), in which the memory stores the first storage area in a flash memory, and stores the third storage area in a non-volatile RAM.

(21) An information processing system including:

a memory configured to store plural pieces of data and an error correcting code for the plural pieces of data in a first storage area, storing the error correcting code in a second storage area so as to correspond to each predetermined number of the plural pieces of data, and store appendant data for any one of the plural pieces of data, and an error correcting code for the appendant data in a third storage area;

an address managing portion configured to manage a correspondence relationship between logical addresses and physical addresses in the first or third storage area with respect to the plural pieces of data;

a control portion configured to append the appendant data and an error correcting code for the appendant data to the third storage area with data related to a write request as the appendant data without carrying out rewrite for the first storage area and the storage area when a physical address corresponding to the logical address related to the write request corresponds to the first storage area, and register the physical address in the third storage area to which the appendant data and the error correcting code for the appendant data are appended in the address managing portion;

an error correction processing portion configured to carry out error correction in the appendant data in the third storage area with the appendant data in the third storage area and the error correcting code for the appendant data when the physical address corresponding to the logical address related to a read request corresponds to the third storage area, and carry out error correction in the first storage area with the predetermined number of the plural pieces of data containing therein the data in the first storage area, and the error correcting code in the second storage area when the physical address corresponding to the logical address related to the read request does not correspond to the third storage area; and a host computer configured to issue either the read request or the write request to the memory.

(22) A storage controlling method including:
appending appendant data and an error correcting code for the appendant data to a third storage area with data related to a write request as the appendant data, and registering a physical address in the third storage area to which the appendant data and the error correcting code for the appendant data are appended in an address managing portion without carrying out rewrite for a first storage area and a second storage area when a physical address corresponding to a logical address related to a write request corresponds to a first storage area in a case where plural pieces of data and an error correcting code of the plural pieces of data are stored in the first storage area of a memory, an error correcting code is stored in a second storage area of the memory so as to correspond to each predetermined number of plural pieces of data, and appendant data for any of the plural pieces of data and an error correcting code for the appendant data are stored in the third storage area; and carrying out error correction in the appendant data in the third storage area with the appendant data in the third storage area, and an error correcting code for the appendant data when a physical address corresponding to the logical address related to a read request corresponds to the third storage area, and carrying out error correction in the first storage area with a predetermined number of plural pieces of data containing therein the data in the first storage area, and an error correcting code in the second storage area when the physical address corresponding to the logical address related to the read request does not correspond to the third storage area.

The present application contains subject matter related to that disclosed in Japanese Priority Patent Applications JP 2011-261091 and JP 2011-277777 filed in the Japan Patent Office on Nov. 30, 2011 and on Dec. 20, 2011, respectively, the entire contents of which are hereby incorporated by reference.

What is claimed is:

1. A storage controller for use with a storage device comprising, a unit data storing portion configured to store therein plural pieces of unit data with data and a first error correcting code of the data as unit data and an error correcting code storing portion configured to store therein a second error correcting code of predetermined plural pieces of unit data so as to correspond to the predetermined plural pieces of unit data in the plural pieces of unit data, the storage controller comprising:

an error correcting code managing portion having entries and being configured to manage a correspondence relationship between the predetermined plural pieces of unit data, and the second error code corresponding to the predetermined plural pieces of unit data;

an address managing portion configured to manage a correspondence relationship between logical addresses and the entries in said error correcting code managing portion; and an error correcting portion configured to acquire one of the entries in said error correction managing portion corresponding to the logical address as an object of read from said address managing portion, and carry out error correction based on the predetermined plural pieces of unit data managed in the entry concerned, and the second error correcting code.

2. The storage controller according to claim 1, wherein the predetermined plural pieces of unit data are stored in discontinuous physical addresses in said storage portion.

3. The storage controller according to claim 1, wherein said address managing portion manages an error correction flag representing whether or not the second error correcting code corresponding to the logical addresses is stored, and said error correcting portion carries out the error correction only when the error correction code flag represents an effect that the second error correcting code is stored.

4. The storage controller according to claim 1, wherein said error correcting code managing portion regulates order of coupling the predetermined plural pieces of unit data; and said error correcting portion couples the predetermined plural pieces of unit data in accordance with the coupling order, thereby carrying out the error correction.

5. The storage controller according to claim 1, wherein said error correcting code managing portion holds the physical addresses, in said storage portion, of the second error correcting code corresponding to the predetermined plural pieces of unit data; and said error correcting portion acquires the second error correcting code from said storage portion in accordance with the physical address of the second error correcting code.

6. The storage controller according to claim 5, wherein said error correcting code managing portion further holds an intra-physical address offset, in said storage portion, of the second error correcting code corresponding to the predetermined plural pieces of unit data; and said error correcting portion acquires the second error correcting code from said storage portion in accordance with the physical addresses and the intra-physical address offset of the second error correcting code.

7. The storage controller according to claim 1, further comprising:

an error correcting code generating portion configured to generate the second error correcting code with respect to the data stored in a range of the logical addresses specified by a data holding characteristics reinforcement command when the data holding characteristics reinforcement command is received; and an entry managing portion configured to newly ensure an entry in which a correspondence relationship with the corresponding second error correcting code is held with respect to the data stored in the range of the logical addresses specified by the data holding characteristics reinforcement command in said error correcting code managing portion when the data holding characteristics reinforcement command is received, and register a correspondence relationship between the newly ensured entry and the specified logical addresses in said address managing portion.

8. The storage controller according to claim 7, wherein said entry managing portion releases the entry in which the correspondence relationship with the corresponding second error correcting code is held with respect to the data stored in the range of the logical addresses specified in the data holding characteristics reinforcement releasing command in said error correcting code managing portion when the data holding characteristics reinforcement releasing command is received, and deletes a correspondence relationship between the released entry and the specified logical addresses in said address managing portion.

9. The storage controller according to claim 7, wherein said error correcting code managing portion holds the number of unit data corresponding to the second error correcting code every entry; and said entry managing portion targets at an entry in which the number of unit data represents zero when the entry is newly ensured.

10. The storage controller according to claim 7, wherein said error correcting code managing portion holds the number of unit data corresponding to the second error correcting code every entry; and
  said entry managing portion targets at an entry in which the number of unit data is smaller than a predetermined number when the entry is newly ensured.

11. The storage controller according to claim 1, wherein said address managing portion holds time finally accessed with respect to the logical addresses as final access time, and said storage controller further comprises:
  an error correcting code generating portion configured to generate the second error correcting code with respect to the data stored in the logical addresses when a predetermined period of time elapses from the final access time; and
  an entry managing portion configured to newly ensure an entry in which a correspondence relationship with the corresponding second error correcting code is held with respect to the data stored in the logical addresses in said error correcting code managing portion when a predetermined period of time elapses from the final access time, and register a correspondence relationship between the newly ensured entry and the specified logical addresses in said address managing portion.

12. The storage controller according to claim 11, wherein said entry managing portion releases the entry in which the correspondence relationship with the corresponding second error correcting code is held with respect to the data stored in the logical addresses in said error correcting code managing portion when the second error correcting code is stored for a lapse of predetermined period of time from the final access time, and deletes a correspondence relationship between the released entry and the specified logical addresses in said address managing portion.

13. A storage device, comprising:
  a unit data storing portion configured to store therein plural pieces of unit data with data and a first error correcting code of the data as unit data;
  an error correcting code storing portion configured to store therein a second error correcting code of predetermined plural pieces of unit data so as to correspond to the predetermined plural pieces of unit data in the plural pieces of unit data;
  an error correcting code managing portion having entries and being configured to manage a correspondence relationship between the predetermined plural pieces of unit data, and the second error correcting code corresponding to the predetermined plural pieces of unit data;
  an address managing portion configured to manage a correspondence relationship between logical addresses and the entries in said error correcting code managing portion; and
  an error correcting portion configured to acquire one of the entries in said error correcting code managing portion, corresponding to the logical address as an object of read from said address managing portion, thereby carrying out error correction based on the predetermined plural pieces of unit data managed in the entry concerned, and the second error correcting code.

14. The storage device according to claim 13, wherein each of said unit data storing portion and said error correcting code storing portion is a non-volatile memory.

15. An information processing system, comprising:
  a unit data storing portion configured to store therein plural pieces of unit data with data and a first error correcting code of the data as a unit;
  an error correcting code storing portion configured to store therein a second error correcting code of predetermined plural pieces of unit data so as to correspond to the predetermined plural pieces of unit data in the plural pieces of unit data;
  an error correcting code managing portion having entries and being configured to manage a correspondence relationship between the predetermined plural pieces of unit data, and the second error correcting code corresponding to the predetermined plural pieces of unit data;
  an address managing portion configured to manage a correspondence relationship between logical addresses and the entries in said error correcting code managing portion;
  an error correcting portion configured to acquire one of the entries in said error correcting code managing portion, corresponding to the logical address as an object of read from said address managing portion, thereby carrying out error correction based on the predetermined plural pieces of unit data managed in the entry concerned, and the second error correcting code; and
  a host computer configured to issue a request to request an access to said unit data storing portion.

16. A storage controlling method for use in a storage device including a unit data storing portion storing therein plural pieces of unit data with data and a first error correcting code of the data as a unit, an error correcting code storing portion storing therein a second error correcting code of the predetermined plural pieces of unit data so as to correspond to the predetermined plural pieces of unit data in the plural pieces of unit data, an error correcting code managing portion having entries and managing a correspondence relationship between the predetermined plural pieces of unit data, and the second error correcting code corresponding to the predetermined plural pieces of unit data, and an address managing portion managing a correspondence relationship between logical addresses and one of the entries in said error correcting code managing portion, said storage controlling method comprising:
  acquiring the entry, in said error correcting code managing portion, corresponding to the logical address as an object of read from said address managing portion; and
  carrying out error correction based on the predetermined plural pieces of unit data managed in the acquired entry, and the second error correcting code.

17. A storage controller, comprising:
  an address managing portion configured to manage a correspondence relationship between logical addresses and physical addresses in a first or third storage area of a memory with respect to plural pieces of data when the plural pieces of data and an error correcting code corresponding to the plural pieces of data are stored in said first storage area of said memory, the error correction code is stored in a second storage area of said memory so as to correspond to each predetermined number of the plural pieces of data, and appendant data for any one of the plural pieces of data, and an error correcting code for the appendant data are stored in said third storage area of said memory;
  a control portion configured to append the appendant data and an error correcting code for the appendant data to said third storage area with data related to a write request as the appendant data without carrying out rewrite for said first storage area and said storage area when a physical address corresponding to a logical address related to the write request corresponds to said first storage area, and register the physical address in said third storage area to which the appendant data and the error correcting code for the appendant data are appended in said address managing portion; and an error correction processing portion configured to carry out error correction in the appendant data in said third storage area with the appendant data in said third storage area and the error correcting code for the appendant data when the physical address corresponding to the logical address related to a read request corresponds to said third storage area, and carry out error correction in said first storage area with the predetermined number of the plural pieces of data containing therein the data in said first storage area, and the error correcting code in said second storage area when the physical address corresponding to the logical address related to the read request does not correspond to said third storage area.

18. The storage controller according to claim 17, wherein said control portion overwrites the appendant data to said first storage area before the appendance with respect to the appendant data at a predetermined timing; and said error correction processing portion generates the error correcting code from a predetermined number of the plural pieces of data containing therein the data overwritten at the predetermined timing, and stores the error correcting code concerned in said second storage area.

19. A storage device, comprising:

a memory configured to store plural pieces of data and an error correcting code for the plural pieces of data in a first storage area, store the error correcting code in a second storage area so as to correspond to each predetermined number of the plural pieces of data, and store appendant data for any one of the plural pieces of data, and an error correcting code for the appendant data in a third storage area;

an address managing portion configured to manage a correspondence relationship between logical addresses and physical addresses in said first or third storage area with respect to the plural pieces of data;

a control portion configured to append the appendant data and an error correcting code for the appendant data to said third storage area with data related to a write request as the appendant data without carrying out rewrite for said first storage area and said storage area when a physical address corresponds to the logical address related to the write request corresponding to said first storage area, and register the physical address in said third storage area to which the appendant data and the error correcting code for the appendant data are appended in said address managing portion; and an error correction processing portion configured to carry out error correction in the appendant data in said third storage area with the appendant data in said third storage area and the error correcting code for the appendant data when the physical address corresponding to the logical address related to a read request corresponds to said third storage area, and carry out error correction in said first storage area with the predetermined number of the plural pieces of data containing therein the data in said first storage area, and the error correcting code in said second storage area when the physical address corresponding to the logical address related to the read request does not correspond to said third storage area.

20. The storage device according to claim 19, wherein said memory stores said first storage area in a flash memory, and stores said third storage area in a non-volatile random access memory.

* * * * *